US 11,637,450 B2

United States Patent
Bhandarkar et al.

(10) Patent No.: US 11,637,450 B2
(45) Date of Patent: *Apr. 25, 2023

(54) DIGITAL DEMODULATION FOR WIRELESS POWER TRANSFER AND RELATED METHODS

(71) Applicant: Microchip Technology Incorporated, Chandler, AZ (US)

(72) Inventors: Santosh Bhandarkar, Chandler, AZ (US); Alex Dumais, Boise, ID (US)

(73) Assignee: Microchip Technology Incorporated, Chandler, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/647,431

(22) Filed: Jan. 7, 2022

(65) Prior Publication Data

US 2022/0131412 A1    Apr. 28, 2022

Related U.S. Application Data

(63) Continuation of application No. 16/843,697, filed on Apr. 8, 2020, now Pat. No. 11,223,232.
(Continued)

(51) Int. Cl.
*H02M 1/12* (2006.01)
*H02J 50/10* (2016.01)
(Continued)

(52) U.S. Cl.
CPC .............. *H02J 50/10* (2016.02); *H02J 50/12* (2016.02); *H02J 50/80* (2016.02); *H02M 1/08* (2013.01); *H02M 3/1582* (2013.01); *H02J 50/90* (2016.02)

(58) Field of Classification Search
CPC ............ H02J 50/12; H02J 50/80; H02J 50/90; H02M 3/1582; H02M 1/08; H02M 2001/0022; H02M 2001/0012
(Continued)

(56) References Cited

U.S. PATENT DOCUMENTS

| 5,705,919 A | 1/1998 | Wilcox |
| 7,990,120 B2 | 8/2011 | Leonard et al. |

(Continued)

FOREIGN PATENT DOCUMENTS

| CN | 106953520 A | 7/2017 |
| CN | 107565705 A | 1/2018 |

(Continued)

OTHER PUBLICATIONS

International Search Report for Internationl Application No. PCT/US2020/027296, dated Jul. 28, 2020, 4 pages.
(Continued)

*Primary Examiner* — Ryan Jager
(74) *Attorney, Agent, or Firm* — TraskBritt

(57) ABSTRACT

Various methods relate to digital demodulation for wireless power transmission. A method of operating a wireless power transmitter includes transmitting, with a transmitter coil of a wireless power transmitter, power to a receiver coil of a wireless power receiver. The method also includes sampling one or more electrical signals of the wireless power transmitter. The one or more electrical signals are modulated responsive to alteration of electrical conditions at the wireless power receiver. The method further includes digitally demodulating the sampled one or more electrical signals using a digital filter to obtain a communication from the wireless power receiver. The digital filter includes at least two low pass filter stages that each filter out a fundamental frequency used for the transmission of the power to the receiver coil.

18 Claims, 28 Drawing Sheets

Related U.S. Application Data

(60) Provisional application No. 62/854,031, filed on May 29, 2019.

(51) Int. Cl.
    *H02J 50/80*     (2016.01)
    *H02J 50/12*     (2016.01)
    *H02M 1/08*     (2006.01)
    *H02M 3/158*     (2006.01)
    *H02J 50/90*     (2016.01)

(58) Field of Classification Search
    USPC ............................................... 307/104
    See application file for complete search history.

(56) References Cited

U.S. PATENT DOCUMENTS

| | | | |
|---|---|---|---|
| 9,882,418 B2 | 1/2018 | Hsu | |
| 9,960,643 B2* | 5/2018 | Gao | H02J 7/025 |
| 2011/0254524 A1 | 10/2011 | Ishii | |
| 2011/0291606 A1* | 12/2011 | Lee | H02J 7/025 |
| | | | 320/101 |
| 2013/0094553 A1 | 4/2013 | Paek et al. | |
| 2014/0152248 A1 | 6/2014 | Yeh | |
| 2015/0042300 A1 | 2/2015 | Peker et al. | |
| 2015/0280559 A1 | 10/2015 | Vaidya et al. | |
| 2015/0357863 A1 | 12/2015 | Sadakata et al. | |
| 2016/0094081 A1 | 3/2016 | Lee et al. | |
| 2016/0336785 A1* | 11/2016 | Gao | H04B 5/0031 |
| 2017/0126074 A1 | 5/2017 | Muratov | |
| 2018/0006567 A1 | 1/2018 | Yu et al. | |
| 2018/0159352 A1* | 6/2018 | Pan | H02J 7/025 |
| 2018/0301985 A1 | 10/2018 | Kesarwani et al. | |
| 2018/0323648 A1 | 11/2018 | Joye et al. | |
| 2019/0052179 A1 | 2/2019 | Bhandarkar et al. | |
| 2019/0181697 A1* | 6/2019 | Malkin | H04B 5/0037 |
| 2019/0199204 A1 | 6/2019 | Bhandarkar et al. | |
| 2020/0381946 A1* | 12/2020 | Bhandarkar | H02M 3/1582 |
| 2020/0381947 A1* | 12/2020 | Bhandarkar | H02M 3/1582 |
| 2021/0099016 A1 | 4/2021 | Bhandarkar et al. | |

FOREIGN PATENT DOCUMENTS

| | | |
|---|---|---|
| CN | 108352724 A | 7/2018 |
| JP | 2009-118691 A | 5/2009 |
| WO | 2019/083924 A1 | 5/2019 |

OTHER PUBLICATIONS

International Search Report from International Application No. PCT/US2020/027285, dated Jul. 17, 2020, 5 pages.
International Written Opinion for International Application No. PCT/US2020/027296 dated Jul. 28, 2020, 8 pages.
International Written Opinion from International Application No. PCT/US2020/027285, dated Jul. 17, 2020, 9 pages.
Maxim Integrated Products, "40V, 600mA Buck Converters with Low-Quiescent-Current Linear Regulator Mode," MAX5096/MAX5097,19-0603; Rev 2, (Sep. 2007), 21 pages.
Micrel Inc., "8MHz Inductoriess Buck Regulator with LDO Standby Mode," MIC3385, M9999-051310-B, (May 2010), 14 pages.
Pajer et al., "Demodulation of Feedback Signal for Wireless Charging Systems According to the Qi Standard," 25th International Conference on Systems, Signals and Image Processing (IWSSIP), (2018), 5 pages.
Semiconductor Components Industries, "Dual Mode PWM/Linear Buck Converter," Publication Order No. NCP1501/D, Rev. 8, (Nov. 2010), 14 pages.
Wireless Power Consortium: "The Qi Wireless Power Transfer System Power Class 0 Specification—Parts 1 and 2: Interface Definitions—Version 1.2.3", Feb. 1, 2017, retrieved from internet on Jun. 27, 2018: URL: https://www.wirelesspowerconsortium.com/downloads/download-wireless-power-specification.html, 165 pages.
Chinese First Office Action for Chinese Application No. 202080039274.5, dated May 26, 2022, 18 pages with translation.
Chinese Second Office Action for Chinese Application No. 202080039274.5, dated Oct. 28, 2022, 21 pages with translation.
Chinese First Office Action for Chinese Application No. 202080039296.1, dated Jun. 10, 2022, 11 pages with translation, Jun. 10, 2022.
Li, Wen-Wen et al., Simultaneous Transmission of Power and Information in an Inductively Coupled Wireless Power Transfer System (Abstract), Oct. 20, 2015.

* cited by examiner

DIGITAL DEMODULATION FOR WIRELESS POWER TRANSFER AND RELATED METHODS

CROSS-REFERENCE TO RELATED APPLICATIONS

This application is a continuation of U.S. patent application Ser. No. 16/843,697, filed Apr. 8, 2020, now U.S. Pat. No. 11,223,232, issued Jan. 11, 2022, which claims the benefit of the filing date of U.S. Provisional Patent Application 62/854,031, filed May 29, 2019, and titled DIGITAL DEMODULATION FOR WIRELESS POWER TRANSFER, the entire disclosure of which is hereby incorporated herein by reference.

FIELD

The present disclosure relates generally to wireless power transfer, and more specifically, some embodiments relate to digital demodulation for wireless power transmitters.

BACKGROUND

Wireless power transfer systems may transfer power from one electronic device to another electronic device. More specifically, a transmitter of a transmitting device may generate an electromagnetic field, and a receiver of a receiving device may extract power from the electromagnetic field.

BRIEF DESCRIPTION OF THE DRAWINGS

While this disclosure concludes with claims particularly pointing out and distinctly claiming specific embodiments, various features and advantages of embodiments within the scope of this disclosure may be more readily ascertained from the following description when read in conjunction with the accompanying drawings, in which:

DETAILED DESCRIPTION

Figure 1:
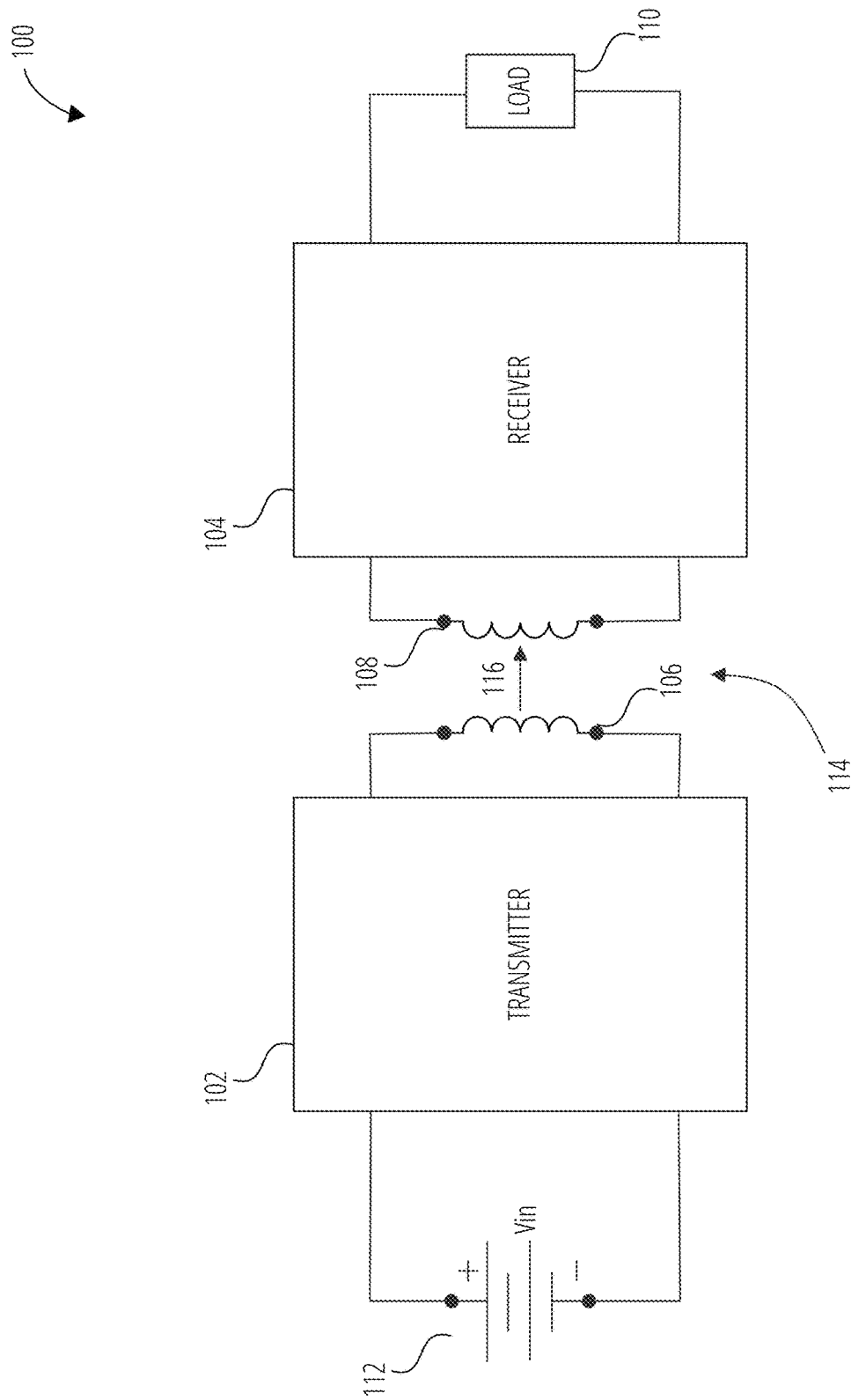
FIG. 1 is a block diagram of a wireless power system including a transmitter and a receiver, according to various embodiments of the disclosure.

In the following detailed description, reference is made to the accompanying drawings, which form a part hereof, and in which are shown, by way of illustration, specific examples of embodiments in which the present disclosure may be practiced. These embodiments are described in sufficient detail to enable a person of ordinary skill in the art to practice the present disclosure. However, other embodiments may be utilized, and structural, material, and process changes may be made without departing from the scope of the disclosure.

The illustrations presented herein are not meant to be actual views of any particular method, system, device, or structure, but are merely idealized representations that are employed to describe the embodiments of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed embodiments. The use of the terms "exemplary," "by example," and "for example," means that the related description is explanatory, and though the scope of the disclosure is intended to encompass the examples and legal equivalents, the use of such terms is not intended to limit the scope of an embodiment or this disclosure to the specified components, steps, features, functions, or the like.

It will be readily understood that the components of the embodiments as generally described herein and illustrated in the drawing could be arranged and designed in a wide variety of different configurations. Thus, the following description of various embodiments is not intended to limit the scope of the present disclosure, but is merely representative of various embodiments. While the various aspects of the embodiments may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to embodiments of the present disclosure.

The embodiments may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, etc. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

Power may be transferred wirelessly from one device to another in a wide range of applications. Qi is an open interface standard developed by the Wireless Power Consortium that uses inductive charging for wireless power transfer. A wireless power system, such as a Qi wireless power system, includes a transmitter and a receiver. In some examples, the transmitter controls the power transferred to the receiver based on feedback received from the receiver. Communication between the receiver and transmitter may be done in-band by altering the electrical conditions at the receiver. A change in the state can be implemented using a switching resistance or a switching capacitance at the receiver. The rate of change is typically between 1 kHz to 2 kHz to transmit a stream of bits from the receiver to the transmitter. The change in the capacitance or resistance on the receiver causes a change in a coil voltage potential Vcoil, a coil current Icoil, and a resultant measurement voltage potential Vmeas, or a sense current Isense at the transmitter end. At the transmitter end, the feedback appears as a bit stream at the rate of change in the state (e.g., 1 kHz to 2 kHz, without limitation). The fundamental frequency used for power transfer varies (e.g., from 110 kHz to 205 kHz, without limitation). The transmitter signals, i.e., the coil voltage potential Vcoil or coil current Icoil at the transmitter end, experience an amplitude change on the order of a few millivolts or milliamps to hundreds of millivolts or milliamps depending on the alignment of a receiver coil with a transmitter coil, input voltage, or load conditions, without limitation. Amplitude changes of other transmitter signals such as the measurement voltage potential Vmeas and the sense current Isense may follow responsive to the amplitude changes in the coil voltage potential Vcoil and the coil current Icoil. One key challenge is to extract a demodulated signal under a misaligned condition as transmitter signals may have a meager amplitude and may be significantly distorted. Further, the transmitter is expected to work with several receivers having varying electrical characteristics.

Various embodiments disclosed herein relate to digital demodulation. In some embodiments, at a transmitter, one or more signals of interest (e.g., coil voltage potential Vcoil, coil current Icoil, measurement voltage potential Vmeas, and/or sense current Isense) may be level shifted (e.g., to 3.3 volts for voltage potentials, without limitation). Further, the one or more signals of interest may be sensed by an analog-to-digital converter (ADC) and processed (e.g., via one or more digital filters) to demodulate and thus extract the signal sent by the receiver. In some embodiments, multiple signals (e.g., the coil current Icoil and the measurement voltage potential Vmeas, without limitation) may be processed in parallel, and the data (i.e., digital data from the receiver extracted from the signals), which may be extracted and verified (e.g., using checksum), may be used for processing. In some embodiments, more than one signal may provide data, in which case the first verified data may be used. Further, in some embodiments, in extreme operating conditions such as misalignment, a single signal (e.g., coil current) may provide verified data.

Further, in some embodiments, a selective averaging (SA) process (e.g., a selective averaging algorithm, without limitation) may provide performance similar, or identical to, hardware phase detection circuitry. A wireless power standard (e.g., the Qi standard, without limitation) may require at least two signals to derive demodulation data (i.e., to cover all operating conditions). According to various embodiments, amplitude modulation of the coil voltage potential Vcoil, the coil current Icoil, the measurement voltage potential Vmeas, or the sense current Isense may use a single ADC sample for processing, while the coil current phase may use average values of the coil current Icoil within one switching period. Various embodiments disclosed herein may be sufficiently robust to prevent dead spots in transmission, and thus various embodiments may decrease instances of wireless power transfer shutdown and/or failure.

Further, some embodiments may relate to power conversion (e.g., within a wireless power transmitter, without limitation). More specifically, some embodiments relate to a buck-boost converter of a wireless power transmitter. A four-switch buck-boost converter (FSBBC), which is a versatile dc-to-dc topology, may be used when the input voltage range encompasses the output voltage. Applications for FSBBC range from cell operated electronics to high power electronics. A FSBBC may be used in applications such as Qi transmitters, where both the input voltage and output voltage are variable. This variation of input voltage around the output voltage may require that a FSBBC operate in buck, boost, or buck-boost mode depending on a ratio of an output voltage to an input voltage. One problem with this topology is the smooth transition between different modes of operation. Further, different operating modes lead to different small signal behavior, thus resulting in variable transient responses.

One relatively simple control mode for a DC-DC converter is a voltage mode control (VMC). In VMC, a control structure of the DC-DC converter involves an output voltage used as feedback for controlling the power converter. The output voltage may be compared with a reference voltage to produce an error voltage, and the error voltage is passed through a compensator, which provides duty cycle data for the four switches. The compensator may include, for example, a PID controller or a 3P3Z controller implemented in digital domain. The output of the digital compensator typically varies from 0-100% and is used to control the duty cycle of a PWM waveform. The duty cycle may in turn control the voltage applied to a power stage, thereby controlling the output voltage.

The control structure of the FSBBC is similar to embodiments discussed above (e.g., to the VMC control structure of the DC-DC converter discussed above). However, due to a combination of different modes (e.g., buck mode and boost mode, without limitation) into a single control law, the output of the FSBBC compensator may vary from 0 to 200% against the 0 to 100% in a conventional buck converter. The output of the FSBBC compensator may determine the mode of operation. For values from 0 to 100%, the FSBBC may operate as a buck converter. For 100 to 200%, the FSBBC may operate as a boost converter. However, considering the deadtime in switching of an H-bridge of the FSBBC and half bridge driver operation, particularly the bootstrap driver (e.g., considering charge time of a capacitor driving a top MOSFET in a leg of the H-bridge), the duty cycle values may be limited. For instance, a maximum of 95% duty cycle in buck mode may allow a 5% duration for a PWM driver bootstrap capacitor to charge. Similarly, a minimum of 5% duty cycle in boost mode may ensure a reliable output voltage and necessary time to prevent shoot through. This may limit the buck operation from 5% to 95% and boost from 105% to 195% (e.g., because of the deadtime and the half bridge driver operation). Between the 95% and 105% range, neither buck nor boost modes alone may provide acceptable results. As a result, a cascaded buck-boost (CBB) mode may be used between 95% and 105%. In this way an output voltage equal to input voltage around the 100% duty cycle may be generated, which may result in higher ripple in the output voltage.

In the CBB mode, the buck and the boost stages may operate as cascaded converters. The output of the buck converter is fed to the boost converter. Controlling the duty cycles of the buck and boost stages independently may enable output voltage control in the CBB mode. The CBB mode may not be restricted to a 95% to 105% limit, but may be extended to a different (e.g., higher) range. With this scheme, for a given output voltage, the transition from one mode to another due to input voltage change may be seamless. The present embodiments operate in only two modes, namely buck and CBB. The mode of operation is buck for the compensator output from 5% to a predetermined duty cycle, such as 95%. Beyond, for example 95%, the mode of operation may be CBB.

Various embodiments of the present disclosure are now explained with reference to the accompanying drawings.

FIG. 1 is a block diagram of a wireless power system 100 including a transmitter 102 and a receiver 104, according to various embodiments of the disclosure. Transmitter 102 is operably coupled to a voltage source 112 (e.g., a direct current (DC) voltage source) configured to provide an input voltage Vin, and receiver 104 is coupled to a load 110. Wireless power system 100 further includes coil 106 associated with transmitter 102 and coil 108 associated with receiver 104, which coils 106, 108 may be used to transfer power 116 from transmitter 102 to receiver 104 (e.g., via inductive coupling). When coil 106 is in proximity with coil 108 the coil 106 and the coil 108 may be called coupled coils 114. Power transmission may be efficient when coil 106 is properly aligned with coil 108. As will be appreciated, transmitter 102 may control the power 116 transferred by controlling an input voltage, a frequency, and/or a duty cycle of a signal applied to coil 106.

In some embodiments the transmitter 102 is configured to control the power 116 transferred to the receiver 104 based on feedback received from the receiver 104. This feedback, and other information from the receiver 104, may be conveyed to the transmitter 102 by altering electrical conditions at the receiver 104. Various states of the electrical conditions at the receiver 104 may be associated with various logic levels such that a series of shifts between different electrical conditions at the receiver 104, which are detectable by the transmitter 102, may be associated with a digital signal including a stream of varying logic levels (e.g., a first electrical condition of the receiver 104 associated with a logic level high and a second electrical condition of the receiver 104 associate with a logic level low in a binary signal implementation). By way of non-limiting example, change in the electrical conditions at the receiver 104 may be implemented using a switching resistance or a switching capacitance at the receiver (e.g., for the load 110). As a capacitance and/or resistance of the load 110 switches, current and or voltage potential of the coil 106 is altered, which may be detected by measuring the voltage and/or current of the coil 106, and/or by measuring other currents and/or voltage potentials within the transmitter 102. In some embodiments a change on the order of a few millivolts or milliamps to hundreds of millivolts or milliamps may be observed, depending on the alignment of the coil 106 with the coil 108, the input voltage Vin, load conditions, other factors, or combinations thereof.

In some embodiments a frequency of change in the electrical conditions (e.g., a resistance and/or capacitance of the load 110) at the receiver 104 may be between 1 kHz and 2 kHz to transmit a stream of bits from the receiver to the transmitter. At the transmitter 102, the feedback may appear as a bit stream modulating the frequency used for power transfer. The frequency used for power transfer varies (e.g., from 110 kHz to 205 kHz). More detail regarding how the transmitter 102 demodulates the feedback from the receiver 104 will be discussed below.

Figure 2:
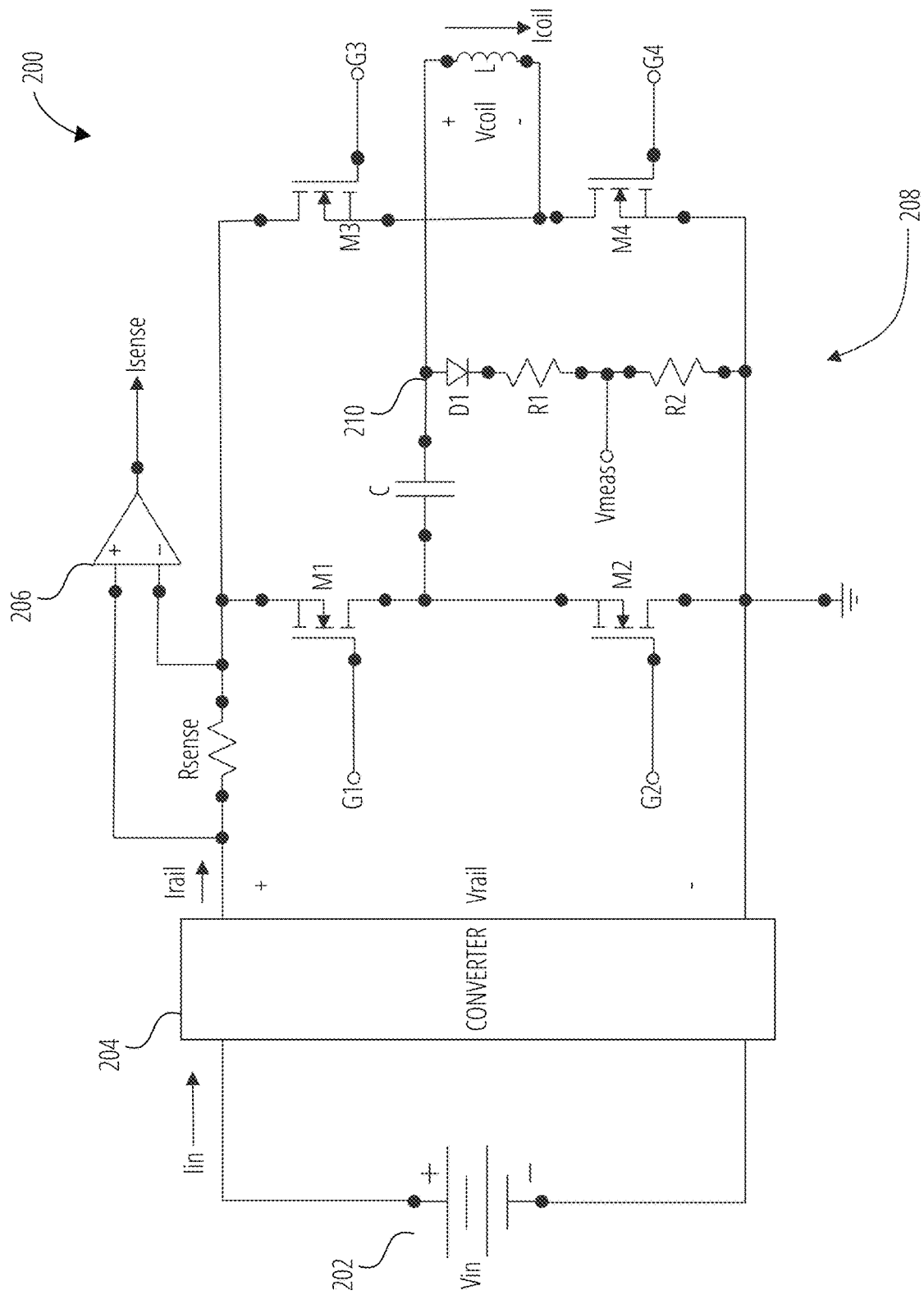
FIG. 2 is a block diagram of a transmitter, which is an example of the transmitter of FIG. 1, in accordance with various embodiments of the disclosure.

FIG. 2 is a block diagram of a transmitter 200, which is an example of the transmitter 102 of FIG. 1, in accordance with various embodiments of the disclosure. In this example, transmitter 200 includes a converter 204 (e.g., a DC to DC converter such as a four-switch buck-boost converter (FSBBC)) and a MOSFET H-bridge 208 including a number of transistors M1-M4. More detail regarding the converter 204 will be discussed with reference to FIG. 16 through FIG. 26. The transmitter 200 also includes a sense resistor Rsense operably coupled in between the converter 204 and the MOSFET H-bridge 208 and an amplifier circuitry 206 having the sense resistor Rsense operably coupled across its input terminals. In this configuration, the amplifier circuitry 206 is a transconductance amplifier configured to provide a sense current signal Isense whose amplitude is responsive to, and a function of, a voltage drop across the sense resistor Rsense, which voltage drop is proportional to the amount of output current Trail provided by the converter 204 to the MOSFET H-bridge 208. Accordingly, the sense current signal Isense is indicative of an amount of output current Trail provided to the MOSFET H-bridge 208 by the converter 204.

Figure 3:
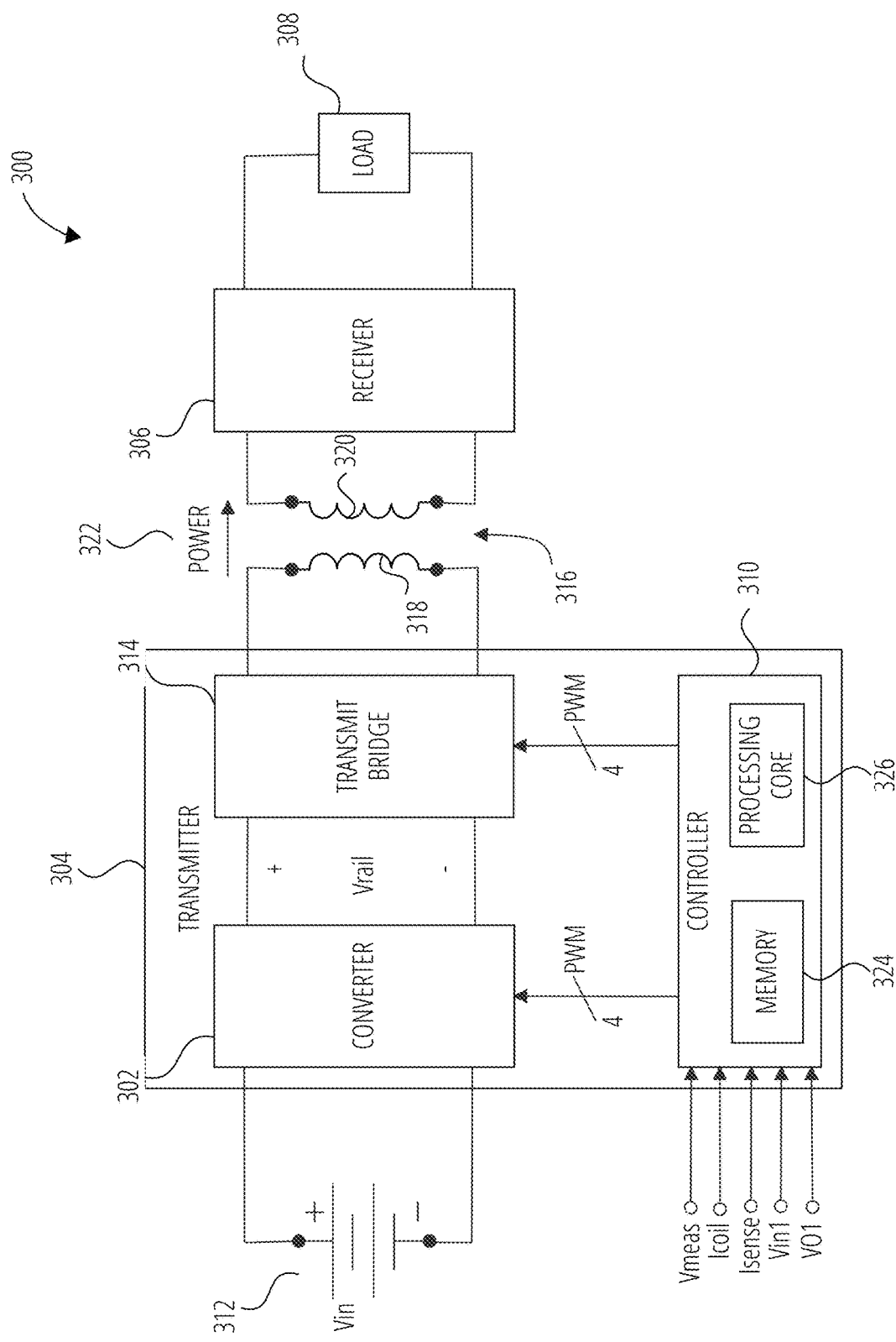
FIG. 3 is a schematic illustration of a wireless power system, according to various embodiments of the disclosure.

According to various embodiments, the MOSFET H-bridge 208 may be controlled via a controller (e.g., a digital signal controller such as the controller 310 of FIG. 3) coupled to each of the gates G1-G4 of transistors M1-M4, respectively. Also, transmitter 200 includes a resonant tank circuit including a capacitor C and an inductor L, which inductor L may be implemented by the transmit coil 106 of FIG. 1, coupled across an output of the MOSFET H-bridge 208. As a result, the controller is configured to selectively change a polarity of current provided to the resonant tank circuit, and in turn to the inductor L, by selectively biasing the gates G1-G4 of transistors M1-M4. A coil voltage potential Vcoil across the inductor L may result from control of the MOSFET H-bridge 208 by the controller.

The MOSFET H-bridge 208 further includes a rectifying diode D1 and a pair of resistors R1 and R2 operably coupled in series with each other from a node 210 between the inductor L and the capacitor C back to a first input of the MOSFET H-bridge 208, illustrated herein as a common potential point, such as ground. The rectifying diode D1 may provide half-wave rectification of the coil voltage potential Vcoil. A measurement voltage potential Vmeas is taken between resistor R1 and resistor R2 and is proportional to a voltage potential of a first end of the transmit coil (L), in relation to the common potential. A second input to the MOSFET H-bridge 208 is coupled to an output of converter 204. Converter 204, which is discussed more fully below, may be configured to control a rail voltage potential Vrail and a rail current Irail supplied to the MOSFET H-bridge 208 by the converter 204. A voltage source 202 (e.g., a DC voltage source such as a battery) may provide an input voltage potential Vin at an input current Iin to the converter 204.

As previously mentioned, a controller may selectively change the polarity of current provided to the resonant tank circuit by selectively biasing the gates G1-G4 of the transistors M1-M4 of the MOSFET H-bridge 208. For example, gates G1 and G4 of transistors M1 and M4 may be biased to cause transistors M1 and M4 to conduct electrical current, and gates G2 and G3 of transistors M2 and M3 may be biased to prevent transistors M2 and M3 from conducting current. With the gates G1-G4 thus biased, current from the converter 204 flows through sense resistor Rsense, through transistor M1, through capacitor C, to a parallel combination of the inductor L with the resistors R1 and R2, and to a return of converter 204, which is shown connected to the common potential. Also, gates G1 and G4 of transistors M1 and M4 may be biased to prevent transistors M1 and M4 from conducting current, and gates G2 and G3 of transistors M2 and M3 may be biased to cause transistors M2 and M3 to conduct current. With the gates G1-G4 thus biased, current from the converter 204 flows through the sense resistor Rsense, through transistor M3, through inductor L, to the parallel combination of the capacitor C with the resistors R1 and R2, and to the return of converter 204.

As the coil current Icoil passes through the inductor L, power may be received by a receive coil (e.g., the coil 108 of FIG. 1) of a receiver (e.g., the receiver 104 of FIG. 1). The receiver may provide communications to the transmitter 200 by changing electrical conditions at the receiver (e.g., switching a resistance and/or capacitance of a load, as discussed above with reference to FIG. 1). As a result, the coil current Icoil may be modulated responsive to the changes in electrical conditions at the receiver. In consequence, the sense current signal Isense, the measurement voltage potential Vmeas, and the coil current Icoil may all be modulated responsive to the changes of electrical conditions at the receiver. One or more of the coil current Icoil, the measurement voltage potential Vmeas, and/or the sense current signal Isense may be provided to the controller to extract the communications provided by the receiver. In some embodiments, the controller may adjust operation of the transmitter 200 (e.g., the converter 204 or the MOSFET H-bridge 208, without limitation) based on information provided to the transmitter 200 by the receiver. In other embodiments, voltage source 202 may be controllable, and in such an embodiment the controller may adjust the voltage output of voltage source 202 based on information provided to the transmitter 200 by the receiver.

FIG. 3 is a schematic illustration of a wireless power system 300, according to various embodiments of the disclosure. The wireless power system 300 may include a power coupling element 316 including a transmit coil 318 and a receive coil 320. Wireless power system 300 includes a transmitter 304 with associated transmit coil 318 and a receiver 306 with associated receive coil 320. The transmitter 304 is operably coupled to a voltage source 312 (e.g., a DC voltage source) configured to provide an input voltage potential Vin and the receiver 306 is operably coupled to a load 308. In at least some embodiments, transmitter 304 includes a converter 302 (e.g., a DC to DC converter such as an FSBBC) and a transmit bridge 314 (e.g., a MOSFET H-bridge such as the MOSFET H-bridge 208 of FIG. 2). For example, converter 302 may include the converter 204 of FIG. 2 and/or transmit bridge 314 may include the MOSFET H-bridge 208 of FIG. 2. Further, wireless power system 300 includes a controller 310 (e.g., a digital signal processing microcontroller) coupled to each of converter 302 and transmit bridge 314. The controller 310 may include a processing core 326 and a memory 324. Controller 310 may be configured to receive one or more of a measurement voltage potential Vmeas, a representation of a coil current Icoil of the transmit coil 318 (may be referred to herein simply as "coil current" and/or "Icoil"), a sense current signal Isense (e.g., the Vmeas, the Icoil, and the Isense of FIG. 2), a stepped-down version Vin1 of the input voltage potential Vin, and a stepped-down version VO1 of the rail voltage potential Vrail (e.g., Vin1 and VO1, respectively, of FIG. 17). Further, controller 310 may be configured to convey a pulse-width modulation (PWM) signal to each of converter 302 and transmit bridge 314. The controller 310 is configured to control the PWM signals to the transmit bridge 314 based on the measurement voltage potential Vmeas, the coil current Icoil, and/or the sense current signal Isense. Also, the controller 310 is configured to control the PWM signals to the converter 302 based on the stepped-down version of the input voltage potential Vin1 and the stepped-down version of the rail voltage potential VO1.

There are several ways to control power 322 transmitted from a transmitter (e.g., transmitter 304 of FIG. 3) to a receiver (e.g., receiver 306 of FIG. 3). For example, with reference again to FIG. 2, the rail voltage potential Vrail may be controlled to control the transferred power 322. This may result in a fixed frequency operation. A transmitter with input voltage control may have a fixed frequency of, for example, 125 kHz. As shown in FIG. 3, controller 310 may be used to control the power 322 transferred to the receiver 306. Inputs of controller 310 are measurement voltage potential Vmeas, coil current Icoil, and sense current signal Isense. Outputs of controller 310 are PWM signals, which may be supplied to converter 302 and transmit bridge 314. In a variable voltage mode control, the rail voltage potential Vrail applied to transmit bridge 314 may be controlled by controlling the duty cycle of converter 302. There are other control modes where the rail voltage potential Vrail is fixed, and the frequency, duty cycle, or phase between legs of the PWM of transmit bridge 314 is varied. In such a design, converter 302 may not be required if input voltage Vin is of the appropriate value. By way of non-limiting example, where the voltage source 312 is a battery, drift in the input voltage potential Vin may occur (e.g., depending on a state of charge of the battery), in which case the converter 302 may be desirable to prevent drift in the rail voltage potential Vrail. Also by way of non-limiting example, where the voltage source 312 is a more stable voltage source than a battery, the converter 302 may not be required because the voltage source 312 may sufficiently regulate a voltage potential provided to the transmit bridge 314.

Figure 4:
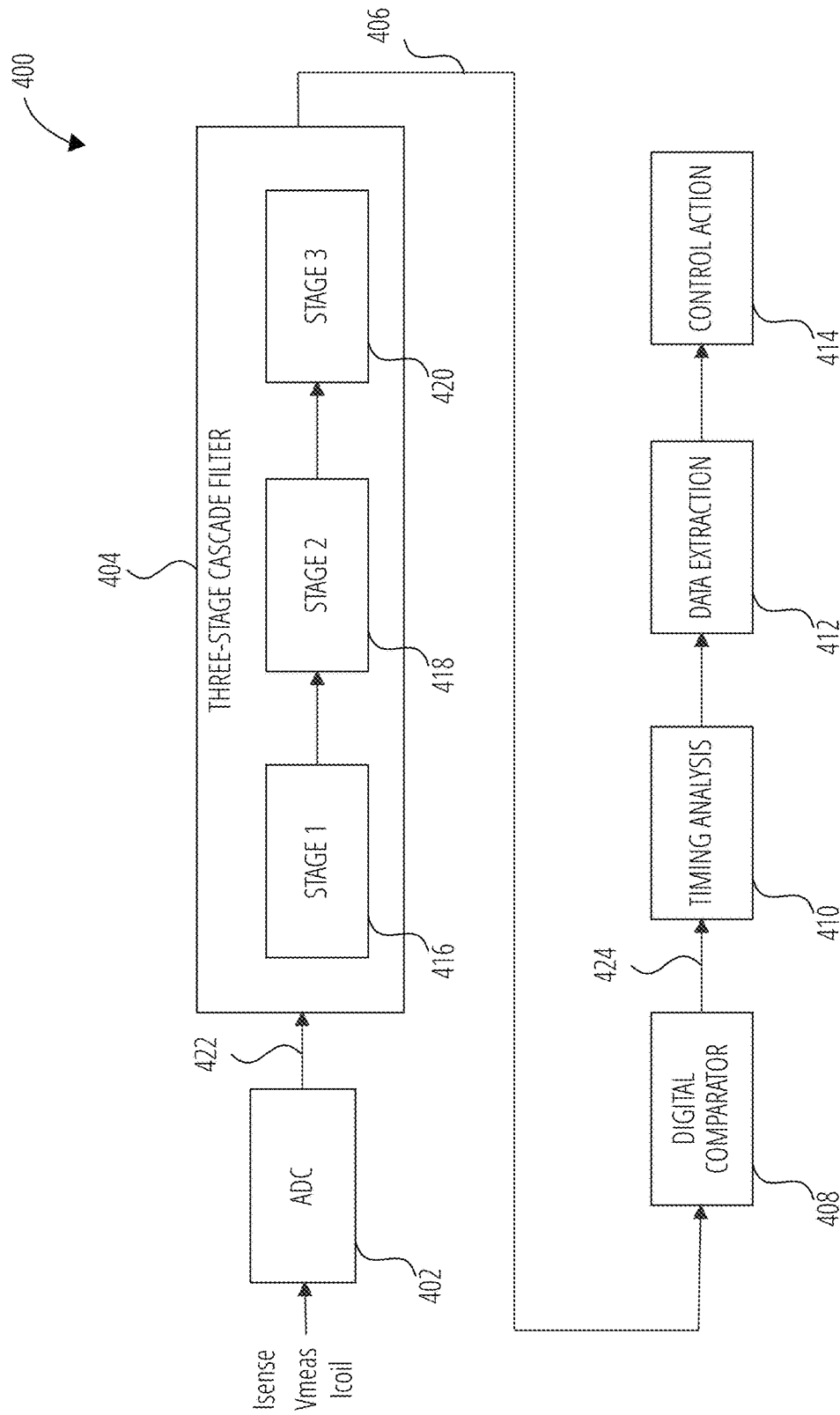
FIG. 4 is a functional flow diagram of a digital demodulation process, according to some embodiments of the disclosure.

FIG. 4 is a functional flow diagram of a digital demodulation system 400 (e.g., to process amplitude for demodulation), according to some embodiments of the disclosure. In some embodiments, operations of the digital demodulation system 400 may be performed by a controller (e.g., the controller 310 of FIG. 3). In this example, the same processing operations may be applied for any one or more of the signal inputs (e.g., sense current signal Isense, measurement voltage potential Vmeas, and coil current Icoil, as illustrated in FIG. 3) provided to the controller. In some embodiments, at least two of four signals (e.g., three amplitude signals including the measurement voltage potential Vmeas, the coil current Icoil and the sense current signal Isense, and one selective averaging signal including a coil current phase, which includes phase information extracted from the coil current Icoil) may be used for extracting communications from the receiver to enable provision of successful communication for sustaining power transfer under varying electrical and mechanical conditions. An analog-to-digital converter (ADC) 402 samples the at least two of the four signals at or near half of an on time of PWM provided to the transmit bridge 314 (e.g., during an on time of transistors M1/M4, transistors M2/M3, or both). This may provide a peak measurement voltage potential Vmeas under a no load condition (i.e., no load at the receiver) and a measurement of the coil current Icoil. The ADC 402 may output an ADC signal 422.

The ADC signal 422 (i.e., a signal provided at a digital output of ADC 402) may be passed through a three-stage cascade filter 404 to filter out high and low frequency components, resulting in a filtered output 406 of the three-stage cascade filter 404. Three-stage cascade filter 404 includes three stages (stage 1 416, stage 2 418, stage 3 420) including one high-pass stage and two low pass stages. By way of non-limiting example, stage 1 416 and stage 2 418 may include low pass filters and stage 3 420 may include a high-pass filter. The high-pass stage may filter out an average component present in the ADC signal 422 due to half wave rectification (i.e., due to the rectifying diode D1 of FIG. 2). The two low pass stages may filter out, for example, a 125 kHz component present in the ADC signal 422. If this low pass filtering is not sufficient to filter out the 125 kHz component, the 125 kHz component may appear as ripple in the filtered output 406 of the three-stage cascade filter 404 (e.g., a compensator output). The high-pass filter cutoff frequency may be set to, for example, 1000 Hz, while the low pass frequency cutoff may be set to, for example, 5000 Hz. This configuration may provide a bandpass filter effect between, for example, 1-5 kHz. Since, in this example, the signal of interest is between 1-2 kHz, the output (e.g., filtered output 406 of the three-stage cascade filter 404) of the compensator provides a demodulated signal. By contrast, a simple bandpass filter is a second order system with 20 dB/decade attenuation in the stop band (for example 1 kHz<f>4 kHz). This would provide roughly 29 dB of attenuation for a signal with frequency 125 kHz (125 kHz signal will be attenuated by a factor $\frac{1}{28}$). Since the high frequency (HF) content has a higher amplitude than the low frequency (LF) demodulation signal, an additional low pass filter stage provides higher attenuation for signal at 125 kHz, which is around 59 dB (125 kHz signal will be attenuated by a factor $\frac{1}{891}$), as compared to a simple band-pass filter. This allows effective blocking of the HF signal from the LF demodulation signal.

Filtered output 406 may be compared (e.g., via a digital comparator 408) against a threshold with hysteresis to obtain a digital signal 424 with logic levels of, for example, 0 and 3.3V. This digital signal 424 may be provided to a timing analysis module 410, which includes input capture and logic to verify the timing of the digital signal 424 and extract a 0 or 1 from the waveform based on timing features of the digital signal 424. For example, the signal may be encoded in such a way that absence of transition for 500 microseconds (μs) may result in a "0," while a 250 μs transition would equal to "1." For example, a Qi message structure may include several "1"s to synchronize the detection, followed by a start bit, an 8-bit message, a parity, and a stop bit. Data extraction module 412 extracts the message starting with the start bit, computes checksum, and compares the parity to determine if the message is received correctly. There may be several messages passed from the receiver to the transmitter, one being a control error value. The receiver may measure the voltage at its end, compare it with a reference, and send the error to the transmitter as an 8-bit signed integer. A control loop operating in the transmitter may apply the control error to a control action module 414 to change the output voltage (Vrail) of the converter.

Figure 5:
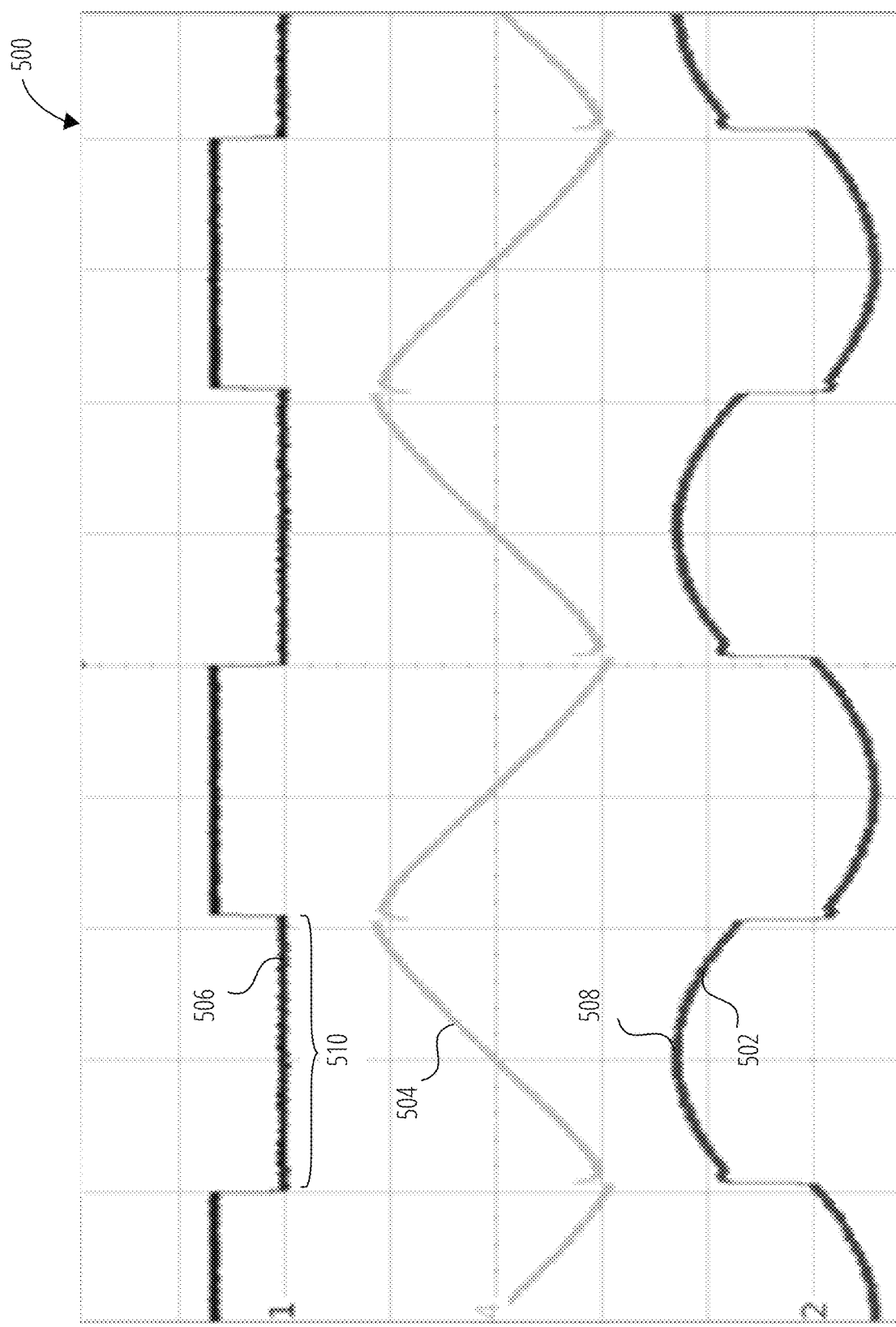
FIG. 5 is a plot illustrating digital amplitude demodulation waveforms, according to some embodiments of the disclosure.

FIG. 5 is a plot 500 illustrating digital amplitude demodulation waveforms, according to some embodiments of the disclosure. The plot 500 includes a coil voltage potential waveform 502 and a coil current waveform 504 respectively representing a coil voltage potential Vcoil (with reference to ground) and a coil current Icoil (e.g., at an input of ADC 402 of FIG. 4). Further, plot 500 depicts a PWM waveform 506 generated by a controller (e.g., controller 310 of FIG. 3). The PWM waveform 506 may be from the PWM signals provided to the transmit bridge 314 (FIG. 3). The PWM waveform 506 may be generated (e.g., using operations of the digital demodulation system 400 of FIG. 4) based on the coil voltage potential waveform 502, the coil current waveform 504, or both. The coil voltage potential Vcoil may be rectified with a diode (D1 of FIG. 2) and stepped down to a measurement voltage potential Vmeas, for example, 3.3V (e.g., using a resistor divider). This may allow only a positive part of the coil voltage potential waveform 502 to be applied to an ADC (e.g., the ADC 402 of FIG. 4). The coil voltage potential waveform 502 at no load has a peak 508 at half the on time (e.g., at the center of a logic level low period of time 510 of the PWM waveform 506). The use of a load, however, would cause the peak 508 of the coil voltage potential waveform 502 to be positioned to the left in relation to the center of the logic level low period of time 510 (i.e., because the phase of the entire coil voltage potential waveform 502 shifts left relative to the coil current waveform 504 and the PWM waveform 506), corresponding to earlier in logic level low period of time 510. This effect may be observed by comparing the position of measurement voltage potential waveform 902 of FIG. 9 (corresponding to no load) with the position of measurement voltage potential waveform 1002 of FIG. 10 (corresponding to inclusion of a load). The coil current Icoil is also rectified by the diode and passed through an op-amp buffer to the ADC (e.g., the ADC 402 of FIG. 4) for amplitude demodulation. The same rectified and buffered current can be used as a reference for a control loop (e.g., a control loop incorporating the digital demodulation system 400 of FIG. 4), which may be updated based on feedback received from a receiver.

According to some embodiments, for selective averaging of the coil current Icoil before providing the coil current Icoil to the ADC 402, coil current Icoil may be passed through an opamp-based differential amplifier with an offset of, for example, half of an ADC reference voltage (e.g., 3.3V/2, a reference voltage potential of the controller), and a gain of, for example, less than 1. The gain may be selected to allow the coil current Icoil provided to the ADC input (e.g., ADC 402) to be less than, for example, 3.3V. The coil current Icoil resembles a triangular waveform at no load. However, the coil current Icoil may become closer to a sine wave as the load increases (e.g., see the ADC coil current waveform 504 of FIG. 5).

The demodulation of the signal from the receiver can be done on any of the signals: measurement voltage potential Vmeas, coil current Icoil, and sense current signal Isense. The measurement voltage Vmeas and coil current Icoil have a high frequency component from which the receiver signal may be demodulated. However, the sense current signal Isense is typically heavily filtered (e.g., using a low pass filter such as an RC filter (not shown) implemented with amplifier circuitry 206) and resembles a DC waveform. The sense current signal Isense may be used for power calculation and foreign object detection.

Figure 6:
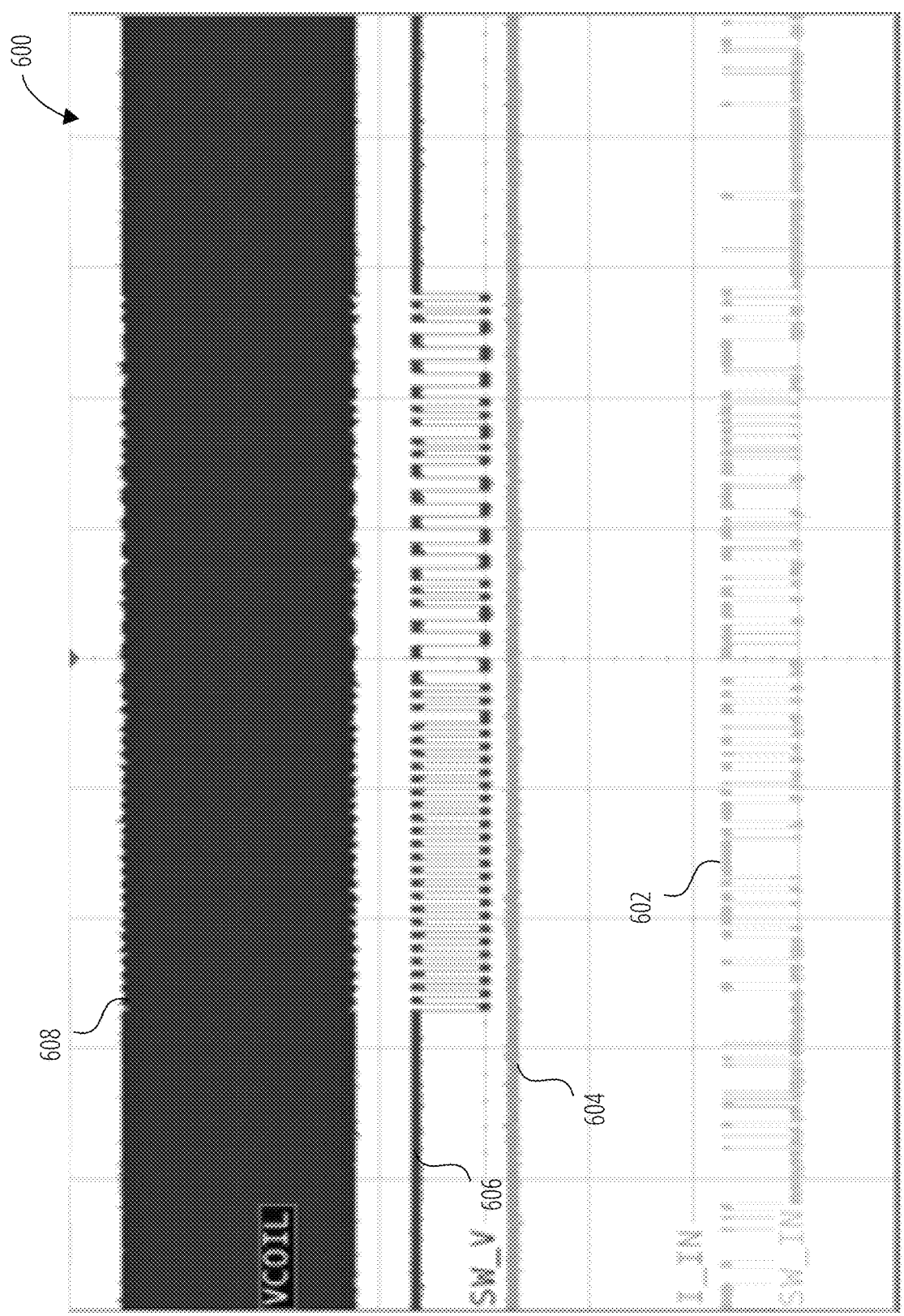
FIG. 6 is a plot illustrating digital amplitude demodulation waveforms under a full load condition, according to some embodiments.

FIG. 6 is a plot 600 illustrating digital amplitude demodulation waveforms under a full load condition (e.g., 5 W), according to some embodiments. Referring to FIG. 4 and FIG. 6 together, the plot 600 includes a sense current demodulation waveform 602, a sense current waveform 604 (corresponding to the sense current signal Isense), a measurement voltage potential demodulation waveform 606, and a measurement voltage potential waveform 608 (corresponding to the measurement voltage potential waveform Vmeas). The sense current demodulation waveform 602 corresponds to the digital signal 424 outputted by the digital comparator 408 and inputted to the timing analysis module 410 responsive to the sense current potential signal Isense provided to the ADC 402. The measurement voltage potential demodulation waveform 606 corresponds to the digital signal 424 responsive to the measurement voltage potential Vmeas inputted to the ADC 402. The sense current waveform 604 and the measurement voltage potential waveform 608 may oscillate at the fundamental frequency (e.g., 110 kHz to 205 kHz), which is much faster than oscillations of the sense current demodulation waveform 602 and the measurement voltage potential demodulation waveform 606 (e.g., about 1 kHz to 2 kHz). As a result, the sense current waveform 604 and the measurement voltage potential waveform 608 appear in FIG. 6 as solid bars, and signals are therefore not discernable therefrom, but may be extracted therefrom. More specifically, the sense current demodulation waveform 602 may be generated (e.g., by a controller such as the controller 310 of FIG. 3 using operations of the digital demodulation system 400 of FIG. 4) based on the sense current waveform 604. Also, the measurement voltage potential demodulation waveform 606 may be generated based on the measurement voltage potential waveform 608. The sense current demodulation waveform 602 and the measurement voltage potential waveform 608 may be internal signals used by the controller 310 (FIG. 3).

Figure 7:
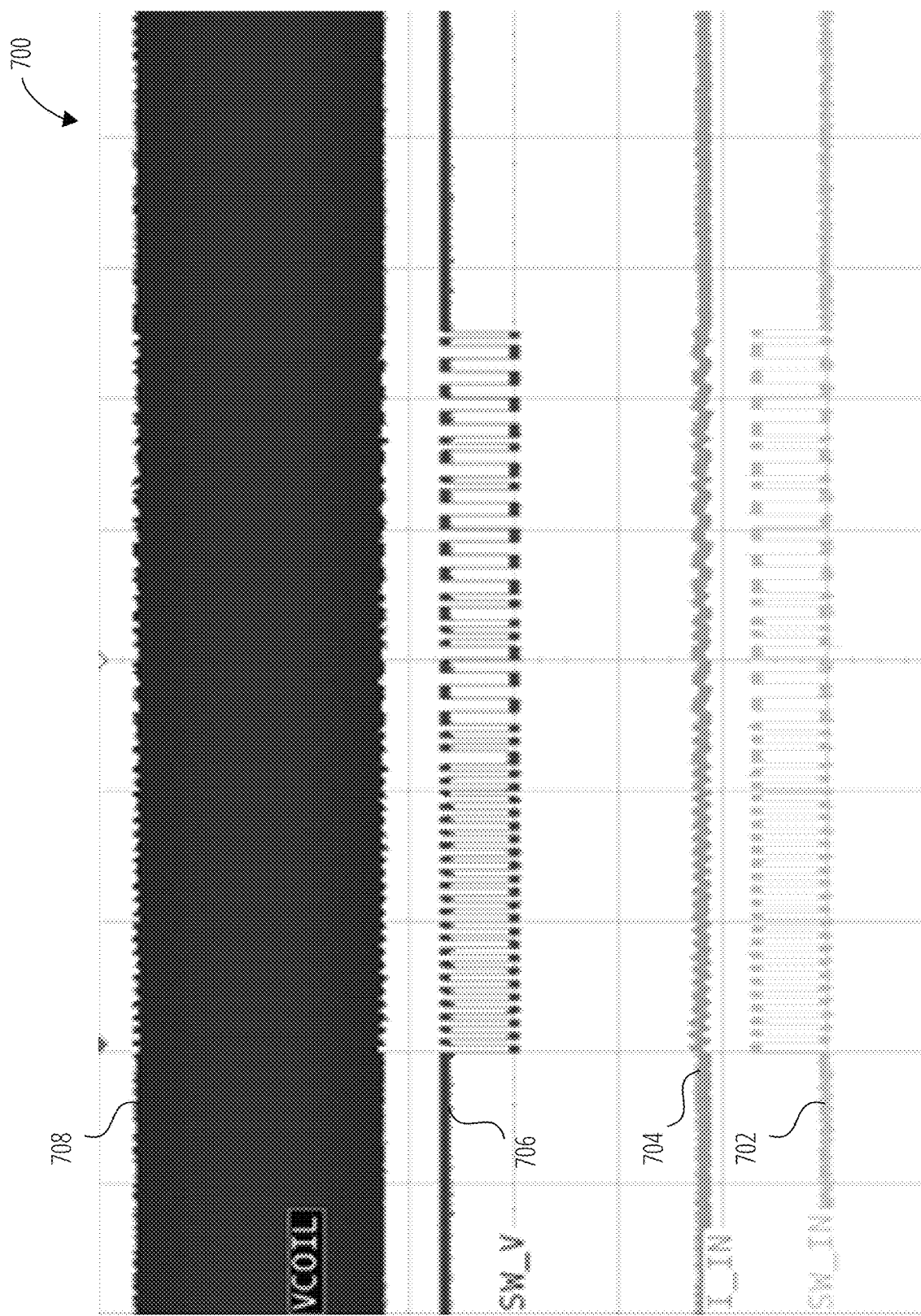
FIG. 7 is a plot illustrating digital amplitude demodulation waveforms under a no load condition, according to some embodiments.

FIG. 7 is a plot 700 illustrating digital amplitude demodulation waveforms under a no load condition, according to some embodiments. Referring to FIG. 4 and FIG. 7 together, the plot 700 includes a sense current demodulation waveform 702, a sense current waveform 704 (corresponding to the sense current signal Isense), a measurement voltage potential demodulation waveform 706, and a measurement voltage potential waveform 708 (corresponding to the measurement current voltage potential Vmeas). The sense current demodulation waveform 702 may be generated (e.g., by a controller such as the controller 310 of FIG. 3 using operations of the digital demodulation system 400 of FIG. 4) based on the sense current waveform 704. The sense current demodulation waveform 702 may be the digital signal 424 outputted by the digital comparator 408 and the timing analysis module 410 responsive to the sense current signal Isense provided to the ADC 402. Also, the measurement voltage potential demodulation waveform 706 may be generated based on the measurement voltage potential waveform 708. The measurement voltage potential demodulation waveform 706 may be the digital signal 424 responsive to the measurement voltage potential Vmeas provided to the ADC 402.

Figure 8:
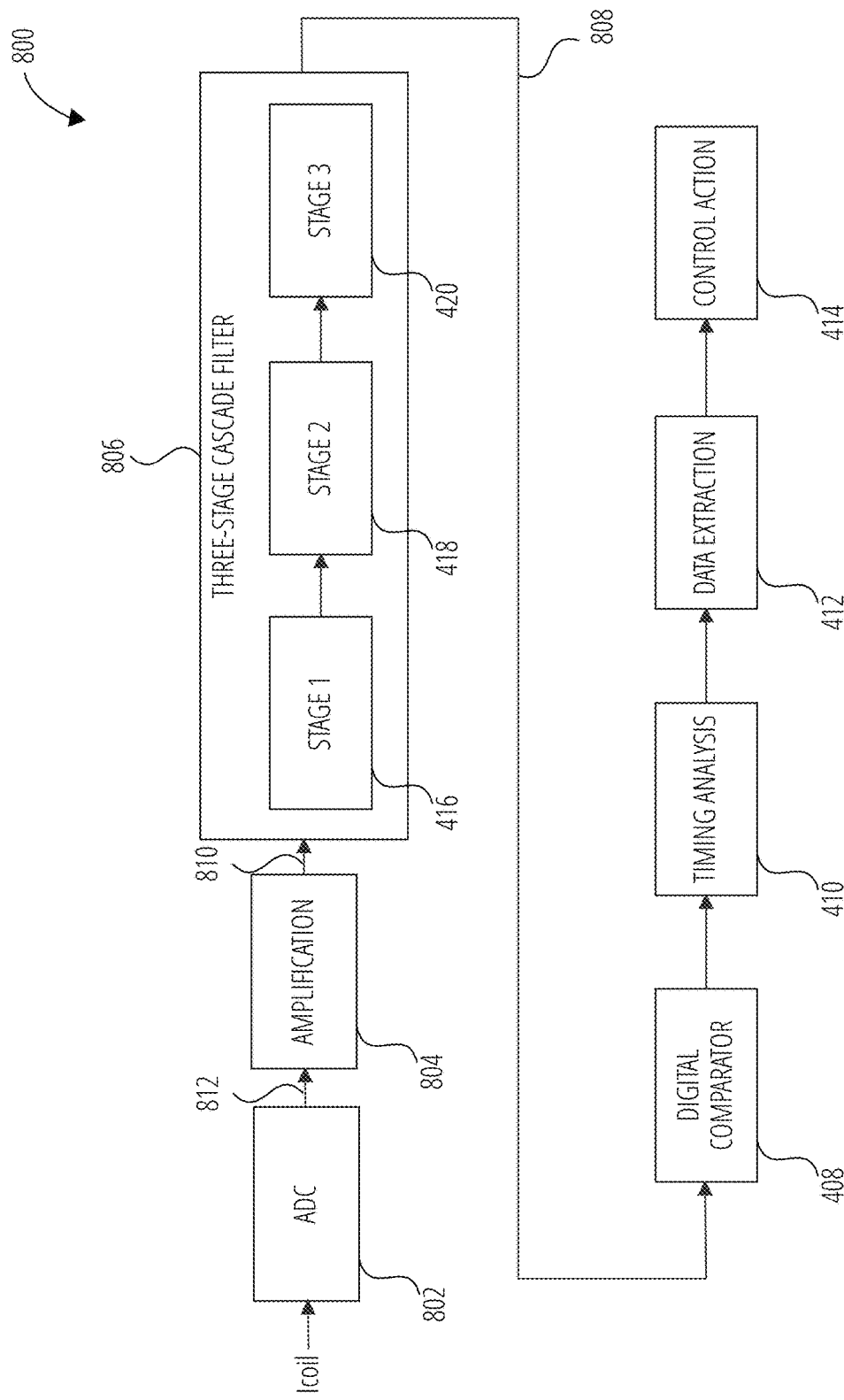
FIG. 8 is a functional flow diagram of a digital demodulation process that may be used for selective averaging, according to some embodiments.

FIG. 8 is a functional flow diagram of a digital demodulation system 800 that may be used for selective averaging, according to some embodiments. The digital demodulation system 800 of FIG. 8 is similar to the digital demodulation system 400 of FIG. 4 except that the digital demodulation system 800 includes both an ADC 802 and an amplification stage 804 prior to the three-stage cascade filter 404 instead of the ADC 402 of FIG. 4. The amplification stage 804 may add a fixed delay in the flow of the digital demodulation system 800. Accordingly, the ADC 802 may sample the coil current Icoil taking into consideration the fixed delay introduced by the amplification stage 804.

Figure 9:
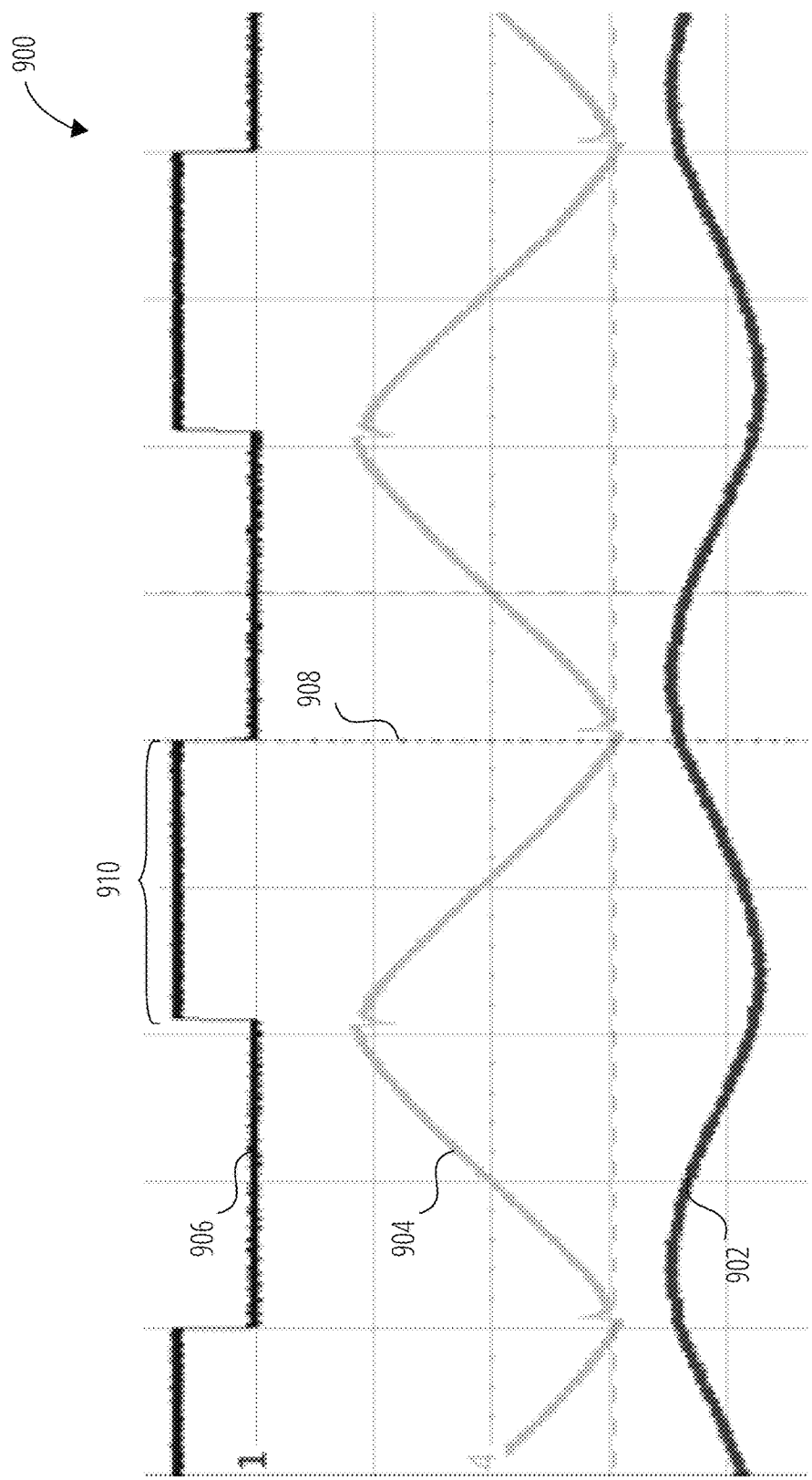
FIG. 9 is a plot illustrating selective averaging demodulation waveforms under a no load condition, according to some embodiments.

FIG. 9 is a plot 900 illustrating selective averaging demodulation waveforms under a no load condition, according to some embodiments. Referring to FIG. 8 and FIG. 9 together, the plot 900 includes a voltage potential waveform 902, a coil current waveform 904 (corresponding to the coil current Icoil at the ADC 802), and a PWM waveform 906. The voltage potential waveform 902 is the output of an op-amp based low pass filter with dc bias responsive to the coil voltage potential Vcoil (FIG. 2) provided to the op-amp based low pass filter. The voltage potential waveform 902 is in the range of zero volts to 3.3 volts. A delay of the low pass filter causes the voltage potential waveform 902 to be out of phase with the coil voltage potential waveform 502 of FIG. 5. The PWM waveform 906 may be generated by a controller (e.g., controller 310 of FIG. 3, without limitation) and provided to a transmit bridge (e.g., the transmit bridge 314 of FIG. 3, without limitation). The PWM waveform 906 may be generated (e.g., by a controller such as the controller 310 of FIG. 3) based on the voltage potential waveform 902, the coil current waveform 904, or both. A vertical line 908 after a PWM on time 910 corresponds with a triggering of the start of the ADC 802 to take a sample. This triggering to take a sample may occur responsive to a falling edge of the PWM waveform 906, without limitation. ADC 802, which may include a digital signal processing microcontroller ADC, may be configured to operate in an oversampling mode, where ADC 802 may be triggered for a set number of cycles with a configurable delay between the samples. For example, ADC 802 may be configured to trigger four samples with a fixed delay between the samples. At the end of the conversion, ADC 802 provides an output 812, which is an average of the four samples. In other words, the ADC 802 is configured to oversample the one or more electrical signals, samples of the sampled signal provided by the ADC 802 include averages (e.g., output 812) of oversampled values of the one or more electrical signals. The output 812 has a resolution of the ADC bits, which is typically 12 bits in digital signal processing microcontrollers. The unipolar 12-bit value may be processed to remove the dc component (e.g., 1.65V) and the resulting signal is amplified by a gain of 8 (e.g., via amplification stage 804). In this example, a 16-bit signed average signal 810 results. The amplified signal (the signed amplified signal 810) is passed through a three-stage cascade filter 806 to filter out the high and low frequency components. This filter configuration may be identical to the three-stage cascade filter 404 discussed above with reference to FIG. 4 and provides a bandpass filter effect between, for example, 1-5 kHz. Since, in this example, the signal of interest is between 1-2 kHz, the filtered output 808 of the three-stage cascade filter 806 (e.g., output of a converter) provides a demodulated signal. The subsequent processing of the demodulated signal is the same as that discussed above with reference to FIG. 4.

Figure 10:
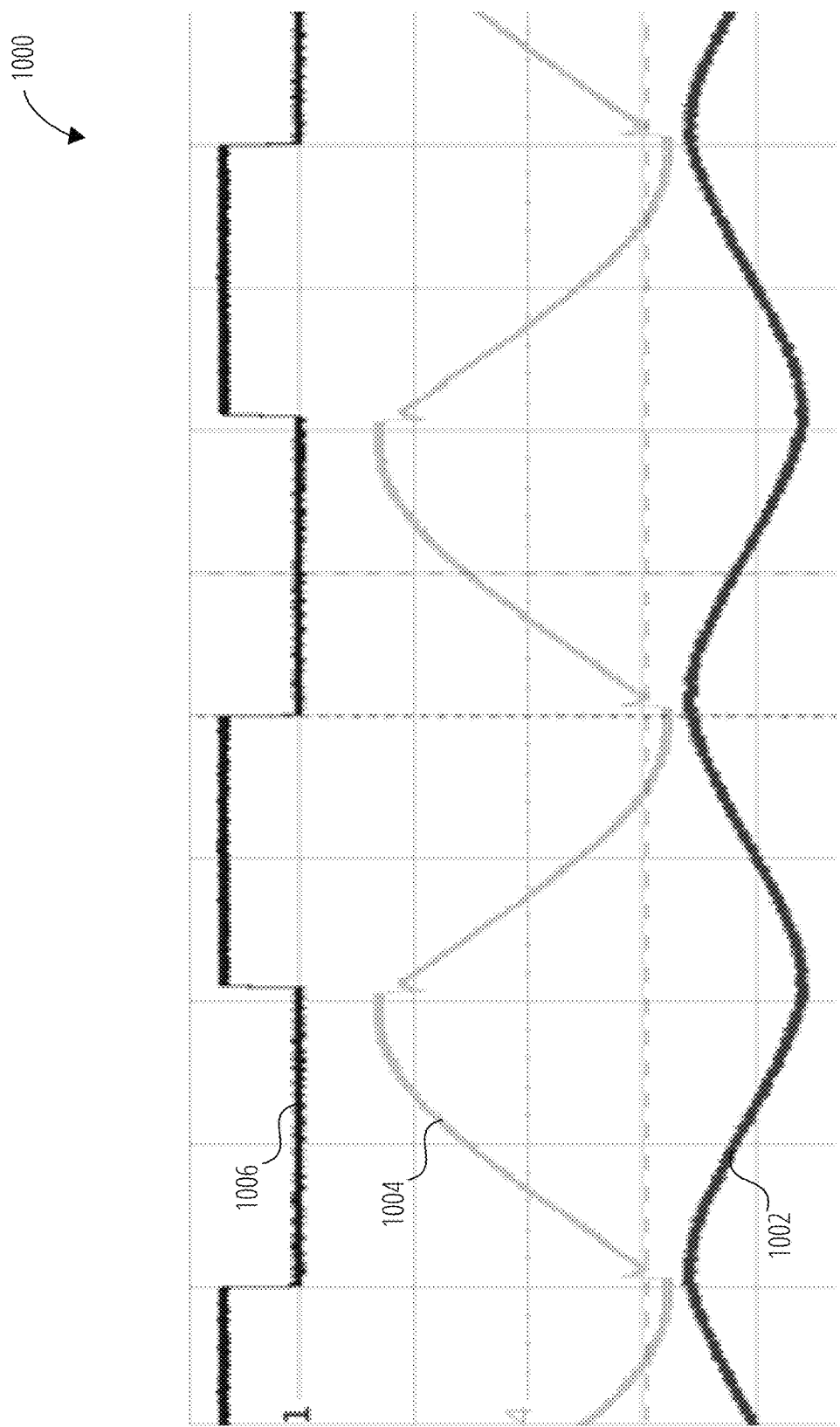
FIG. 10 is a plot illustrating selective averaging demodulation waveforms under a load condition, according to some embodiments.

FIG. 10 is a plot 1000 illustrating selective averaging demodulation waveforms under a load condition (e.g., a 5 W load). The plot 1000 includes a voltage potential waveform 1002, a coil current waveform 1004. The voltage potential waveform 1002 is the output of an op-amp based low pass filter with dc bias responsive to the coil voltage potential Vcoil (FIG. 2) provided to the op-amp based low pass filter, similar to the voltage potential waveform 902 of FIG. 9. The coil current waveform 1004 corresponds to the coil current Icoil (e.g., at an input of ADC 802 of FIG. 8), similar to the coil current waveform 904 of FIG. 9. The plot 1000 also includes a PWM waveform 1006, which is similar to the PWM waveform 906 of FIG. 9. It may be seen, however, that there is a change in a shapes of the voltage potential waveform 1002 and the coil current waveform 1004 as compared to the voltage potential waveform 902 and the coil current waveform 904 due to the presence of a load. For example, the coil current waveform 1004 includes peaks that are less symmetric than peaks of the coil current waveform 904, which may be attributed to a longer charge time involved under a load condition. Also, the voltage potential waveform 1002 has a slightly higher peak-to-peak amplitude and is shifted slightly in phase relative to the voltage potential waveform 902.

Figure 11:
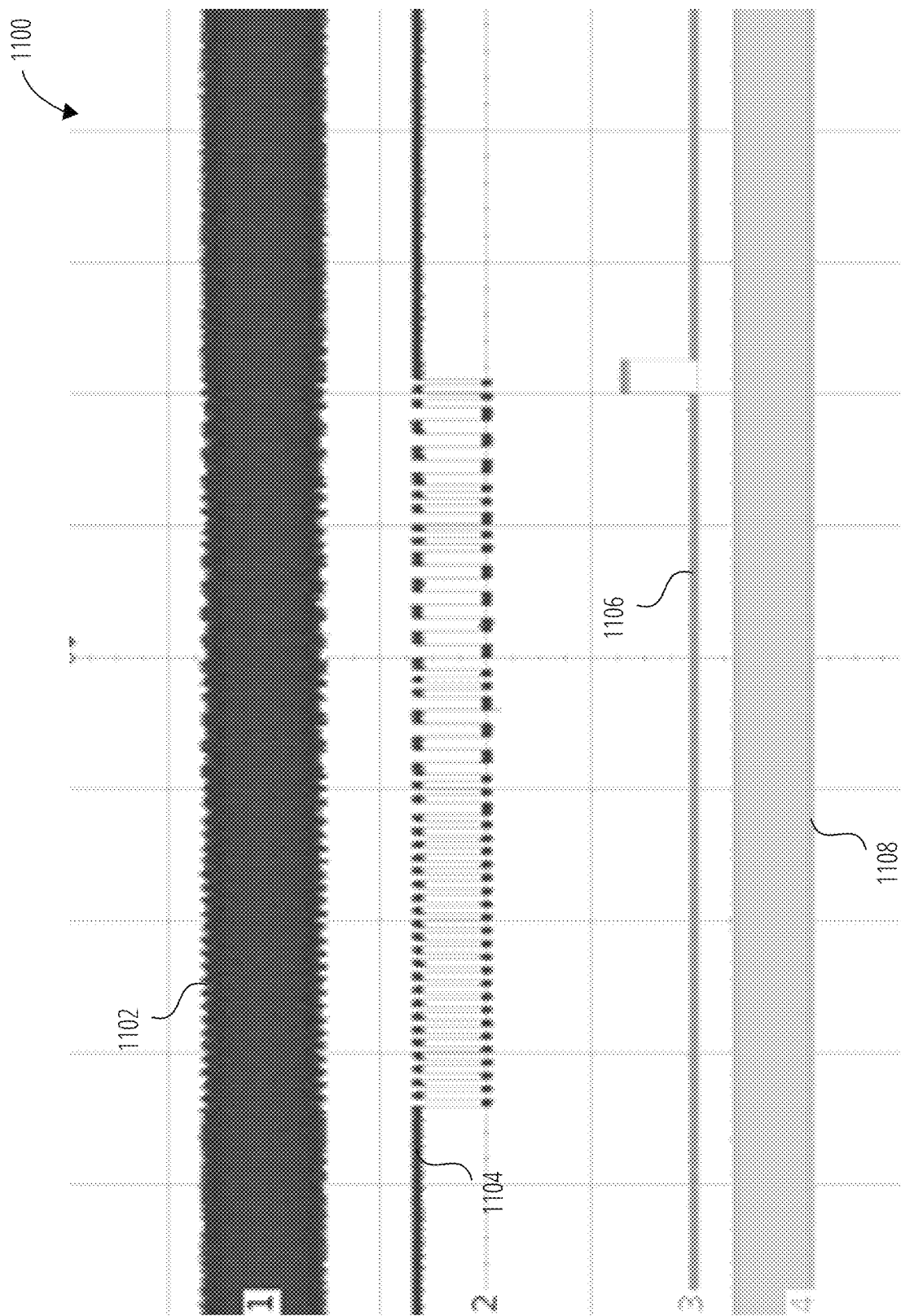
FIG. 11 is a plot illustrating selective average demodulation waveforms, according to some embodiments.

FIG. 11 is a plot 1100 illustrating selective average demodulation waveforms, according to some embodiments. The plot 1100 includes a coil current waveform 1102 (corresponding to a coil current Icoil), a coil current demodulation waveform 1104, a verified message waveform 1106, and a PWM waveform 1108 (corresponding to a signal of the PWM waveform provided by the controller 310 to the transmit bridge 314 of FIG. 3). The coil current demodulation waveform 1104 and the verified message waveform 1106 may be generated (e.g., using operations of the digital demodulation system 800 of FIG. 8) based on the coil current waveform 1102. For example, the coil current demodulation waveform 1104 and the verified message waveform 1106 may be generated by the controller 310 of FIG. 3.

As noted above, some embodiments may relate to power conversion (e.g., within a wireless power transmitter), and more specifically to an FSBBC of a wireless power transmitter (e.g., transmitter 102 of FIG. 1, transmitter 200 of FIG. 2, or transmitter 304 of FIG. 3).

Figure 12:
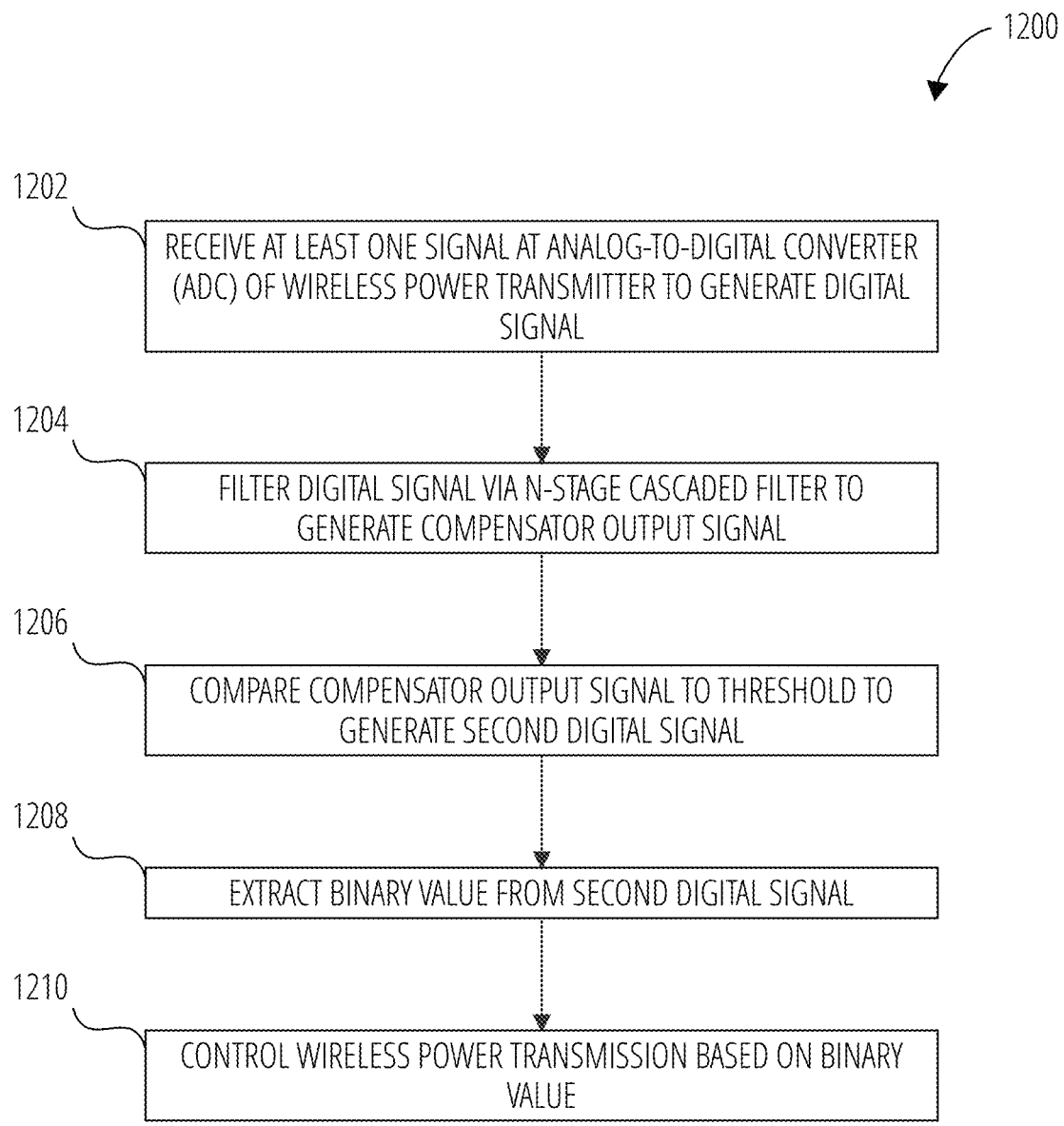
FIG. 12 is a flowchart illustrating a method of operating a wireless transmitter of a wireless power system, according to some embodiments.

FIG. 12 is a flowchart illustrating a method 1200 of operating a wireless transmitter (e.g., the transmitter 102 of FIG. 1, the transmitter 200 of FIG. 2, the transmitter 304 of FIG. 3, without limitation) of a wireless power system, according to some embodiments. In operation 1202, method 1200 receives at least one signal at an ADC (e.g., the ADC 402 of FIG. 4, the ADC 802 of FIG. 8) of a wireless power transmitter to generate a digital signal (e.g., the ADC signal 422 of FIG. 4). In some embodiments receiving the at least one signal includes receiving at least one of a measurement voltage potential Vmeas, a coil current Icoil, and a sense current signal Isense (FIG. 2, FIG. 3, FIG. 4) (Icoil in FIG. 8).

In operation 1204, method 1200 filters the digital signal via an n-stage cascaded filter to generate a compensator output signal (e.g., the filtered output 406 of the three-stage cascade filter 404 of FIG. 4 or the filtered output 808 of the three-stage cascade filter 806 of FIG. 8). The n-stage cascaded filter may be considered a compensator, so a signal output by the n-stage cascaded filter may be referred to as a compensator output signal, or alternately as a filtered output. In some embodiments, filtering the digital signal via the n-stage cascaded filter includes filtering the digital signal via a 3-stage cascaded filter (e.g., the three-stage cascade filter 404 of FIG. 4 or the three-stage cascade filter 806 of FIG. 8). By way of non-limiting example, the 3-stage cascaded filter may include two low pass filters followed by a high-pass filter, as discussed above with reference to FIG. 4.

In operation 1206, method 1200 compares the compensator output signal to a threshold to generate a second digital signal. In some embodiments comparing the compensator output signal to a threshold includes comparing the compensator output threshold against a threshold with hysteresis to obtain a second digital signal with levels of, for example, 0 and 3.3V. In operation 1208, method 1200 extracts a binary value from the second digital signal. In some embodiments extracting the binary value includes extracting a 0 or a 1 from the second digital signal based on timing between edges of the second digital signal. In other words, extracting a binary value from the second digital signal includes assigning a 1 or a zero based on the length of time between transition edges (e.g., rising edges, falling edges) of the second digital signal. In operation 1210, method 1200 controls wireless power transmission based on the binary value. In some embodiments controlling the wireless power transmission includes controlling power (e.g., a magnitude, frequency, and/or phase of voltage and/or current) transmitted to a receiver from the wireless power transmitter.

Figure 13:
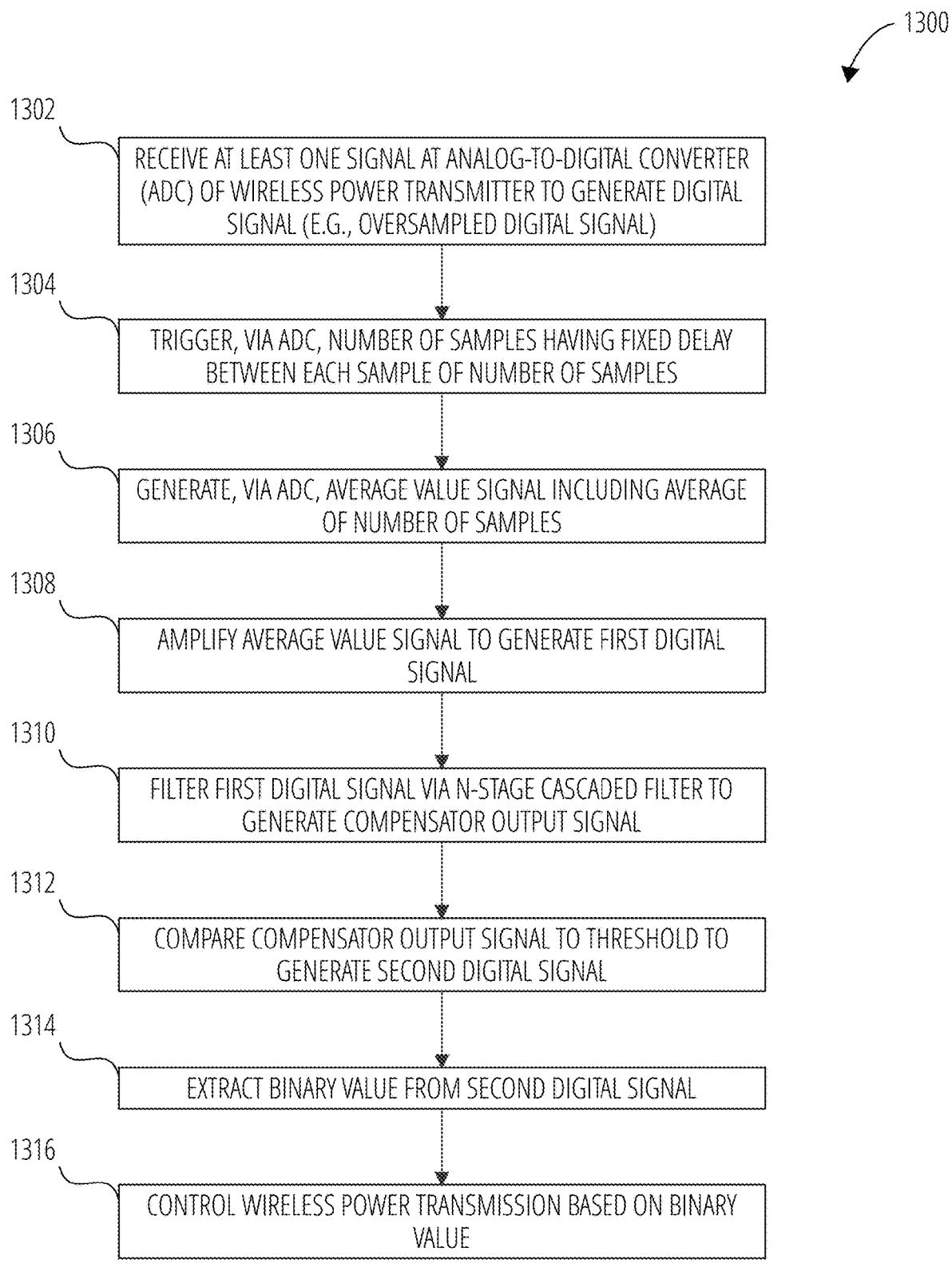
FIG. 13 is a flowchart illustrating a method of operating a wireless transmitter of a wireless power system, according to some embodiments.

FIG. 13 is a flowchart illustrating a method 1300 of operating a wireless transmitter (e.g., the transmitter 102 of FIG. 1, the transmitter 200 of FIG. 2, transmitter 304 of FIG. 3) of a wireless power system, according to some embodiments. In operation 1302, method 1300 receives at least one signal at an ADC (e.g., the ADC 802 of FIG. 8) of a wireless power transmitter to generate a digital signal (e.g., an oversampled digital signal). In some embodiments receiving the at least one signal includes receiving at least one of a measurement voltage potential Vmeas, a coil current Icoil, and a sense current signal Isense (FIG. 2, FIG. 3, FIG. 4, FIG. 8).

In operation 1304, method 1300 triggers, via the ADC, a number of samples having a fixed delay between each sample of the number of samples. In operation 1306, method 1300 generates, via the ADC, an average value signal including an average of the number of samples. In operation 1308, method 1300 amplifies the average value signal to generate a first digital signal.

In operation 1310, method 1300 filters the first digital signal via an n-stage cascaded filter to generate a compensator output signal (e.g., the filtered output 808 of the three-stage cascade filter 806 of FIG. 8). In some embodiments, filtering the digital signal via the n-stage cascaded filter includes filtering the digital signal via a 3-stage cascaded filter (e.g., the three-stage cascade filter 806 of FIG. 8). By way of non-limiting example, the 3-stage cascaded filter may include two low pass filters followed by a high-pass filter, as discussed above with reference to FIG. 4.

In operation 1312, method 1300 compares the compensator output signal to a threshold to generate a second digital signal. In some embodiments comparing the compensator output signal to a threshold includes comparing the compensator output threshold against a threshold with hysteresis to obtain a second digital signal with levels of, for example, 0 and 3.3V. In operation 1314, method 1300 extracts a binary value from the second digital signal. In some embodiments extracting the binary value includes extracting a 0 or a 1 from the second digital signal based on timing between edges of the second digital signal. In other words, extracting a binary value from the second digital signal includes assigning a 1 or a zero based on the length of time between transition edges (e.g., rising edges, falling edges) of the second digital signal. In operation 1316, method 1300 controls wireless power transmission based on the binary value. In some embodiments controlling the wireless power transmission includes controlling power (e.g., a magnitude, frequency, and/or phase of voltage and/or current) transmitted to a receiver from the wireless power transmitter.

Figure 14:
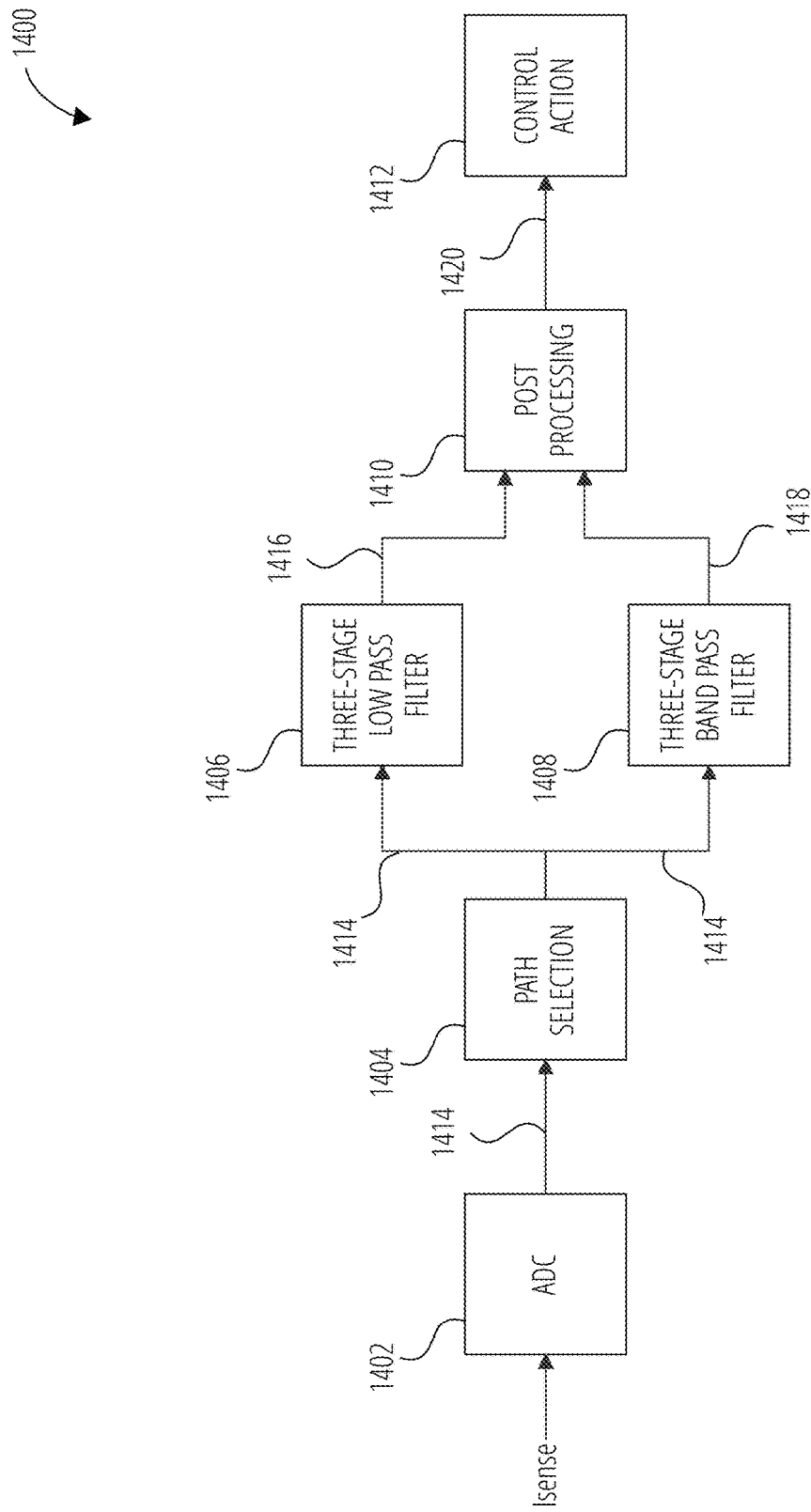
FIG. 14 is a functional flow diagram of a digital demodulation system to process a sense current signal, according to some embodiments.

FIG. 14 is a functional flow diagram of a digital demodulation system 1400 to process a sense current signal Isense, according to some embodiments. The digital demodulation system 1400 includes an ADC 1402 receiving sense current signal Isense (an analog sense current) and converting the sense current signal Isense to a digital sense current representation 1414. The digital demodulation system 1400 also includes a path selection module 1404 configured to selectively provide the digital sense current representation 1414 to a three-stage low pass filter 1406 or a three-stage band pass filter 1408. The three-sage band pass filter may be similar to the three-stage cascade filter 404 of FIG. 4. Prior to a power transfer phase (e.g., an operational state of a wireless power system in which a transmitter is transferring power wirelessly to a receiver) the path selection module 1404 provides the digital sense current representation 1414 to the three-stage low pass filter 1406. The three-stage low pass filter 1406 receives the digital sense current representation 1414 and filters the digital sense current representation 1414, using three low pass stages, to produce a threshold 1416 to be used in post-processing by a post-processing module 1410. A cutoff frequency of the three-stage low pass filter 1406 may be set to one kilohertz. The resulting waveform for the threshold 1416 produces a low frequency phase delayed (e.g., by filters of the three-stage low pass filter 1406) and damped reference, which is maintained at the output of three-stage low pass filter 1406 and which can be used to compare with the incoming demodulation signal (the digital sense current representation 1414 during the power transfer phase). Since the three-stage low pass filter 1406 does not include a high pass filter, the output of the three-stage low pass filter 1406 (i.e., threshold 1416) has the same direct current (DC) level as that of the digital sense current representation 1414. This may be particularly useful for cases when the change in the sense current signal Isense is minimal (e.g., no-load resistive modulation by a wireless power receiver such as the receiver 104 of FIG. 1 or the receiver 306 of FIG. 3).

In a no load condition the modulation depth in the sense current signal Isense may be relatively small as compared to that of a load condition (e.g., where a load 110 or load 308 is present). As a result, in the no load condition the modulation depth may be too small to be reliably detected using the three-stage band pass filter 1408 and erroneous data may be extracted. Once there is sufficient current at the transmitter side (e.g., transmitter 102 of FIG. 1, transmitter 200 of FIG. 2, transmitter 304 of FIG. 3), the path selection module 1404 may switch to providing the digital sense current representation 1414 to the three-stage band pass filter 1408. The three-stage band pass filter 1408 may be similar to the three-stage cascade filter 404 (FIG. 4) and the three-stage cascade filter 806 (FIG. 8) discussed above. The three-stage band pass filter 1408 receives the digital sense current representation 1414, filters the digital sense current representation 1414 as discussed with reference to the three-stage cascade filter 404 and the three-stage cascade filter 806, and provides a filtered sense current representation 1418 for post-processing by a post-processing module 1410.

The post-processing module 1410 may include a digital comparator (e.g., similar to the digital comparator 408 of FIG. 4 and FIG. 8), a timing analysis module (e.g., similar to the timing analysis module 410 of FIG. 4 and FIG. 8), and a data extraction module (e.g., similar to the data extraction module 412 of FIG. 4 and FIG. 8). The digital comparator of the post-processing module 1410 may use the threshold 1416 provided by the three-stage low pass filter 1406 to compare the filtered sense current representation 1418 to, and apply its timing analysis and data extraction capabilities to extract communications 1420 received from the receiver. Since the threshold 1416 is provided by the three-stage low pass filter 1406, the threshold 1416 is a low pass filtered version of the digital sense current representation 1414, and acts as a reference against which the digital sense current representation 1414 is compared in the post-processing module. Accordingly, the digital demodulation system 1400 may include a control action module 1412 configured to control action (e.g., of a wireless power transmitter) based on the communications 1420 received from the receiver.

Figure 15:
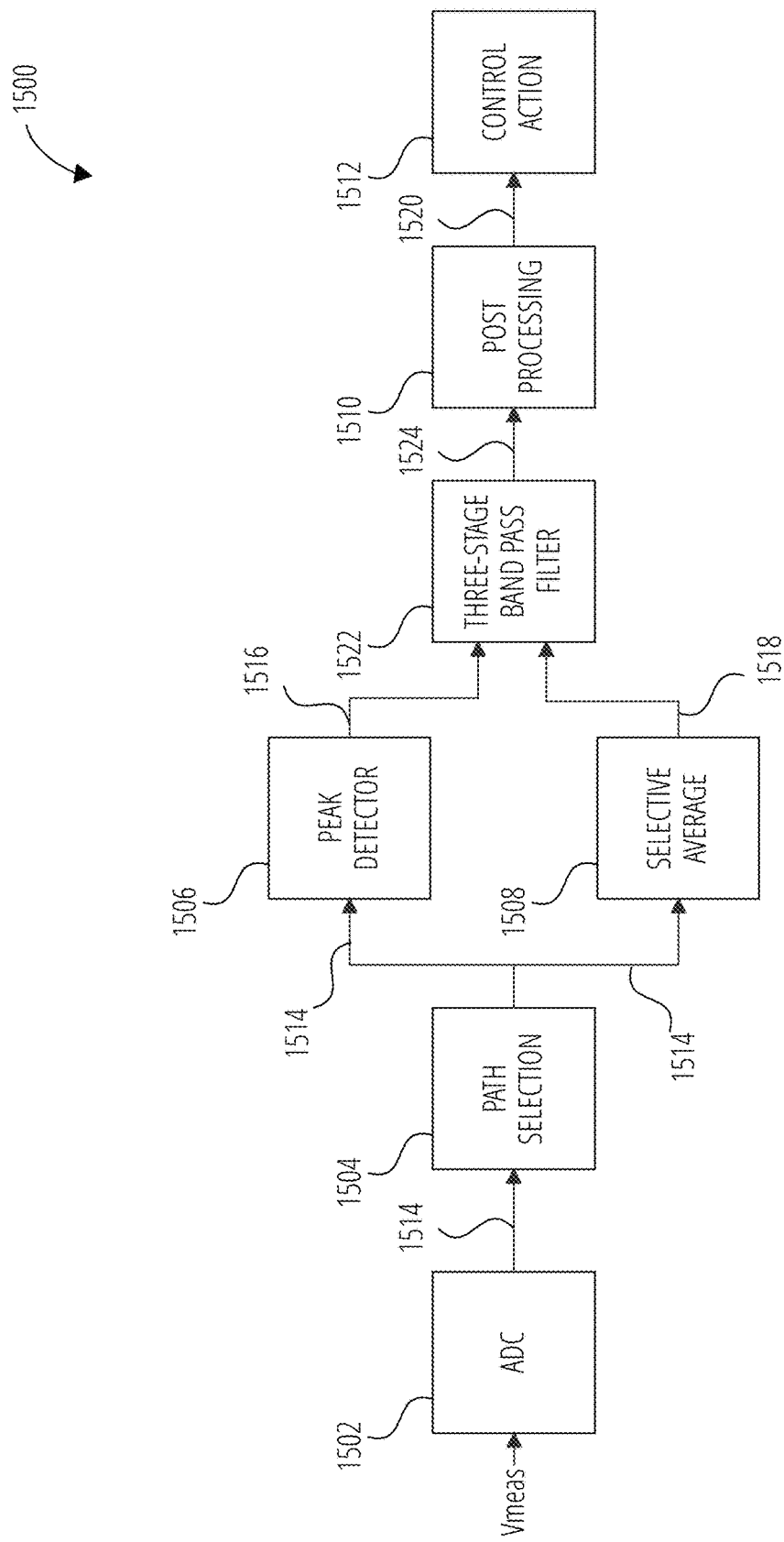
FIG. 15 is a functional flow diagram of a digital demodulation system to process a measurement voltage potential, according to some embodiments.

FIG. 15 is a functional flow diagram of a digital demodulation system 1500 to process a measurement voltage potential Vmeas, according to some embodiments. The digital demodulation system 1500 includes an ADC 1502 configured to convert the measurement voltage potential Vmeas to a digital measurement voltage potential representation 1514 and provide the digital measurement voltage potential representation 1514 to a path selection module 1504. Path selection module 1504 is configured to receive the digital measurement voltage potential representation 1514 and selectively provide the digital measurement voltage potential representation 1514 to a peak detector module 1506 or selective average module 1508. The digital demodulation system 1500 may operate in an averaging mode when the path selection module 1504 provides the digital measurement voltage potential representation 1514 to the selective average module 1508 and in a peak mode when the path selection module 1504 provides the digital measurement voltage potential representation 1514 to the peak detector module 1506.

By default the digital demodulation system 1500 operates in the averaging mode (i.e., the path selection module 1504 provides the digital measurement voltage potential representation 1514 to selective average module 1508) at startup. In the averaging mode the ADC 1502 collects samples (of the digital measurement voltage potential representation 1514) corresponding to a selected duration. By way of non-limiting example, the selected duration may correspond to four samples from PWM signal (PWM from controller 310 to transmit bridge 314 of FIG. 3) start to half of an on time (Ton/2), where the on time Ton is four microseconds (Ton=4 µs). The selective average module 1508 receives the digital measurement voltage potential representation 1514 and provides an average 1518 of the digital measurement voltage potential representation 1514. The average 1518 corresponds to a phase of the digital measurement voltage potential representation 1514 with respect to a PWM signal. For example, a reference to trigger sampling by the ADC 1502 may be the PWM signal provided by the controller 310 to the transmit bridge 314 (FIG. 3). This PWM signal may drive a tank circuit including a capacitor C and an inductor L (FIG. 3). With change in the load (e.g., load 110 of FIG. 1 or load 308 of FIG. 3) at the receiver 104, 306 the measurement voltage potential Vmeas peak moves to the left in time (corresponding to moving earlier in time). Where no load is present peaks in the measurement voltage potential Vmeas coincide with the on time of the PWM signal. Where a load is present, however, peaks in the measurement voltage potential Vmeas occur earlier in time than Ton/2, as compared with the no load condition. Therefore, if the samples taken by the ADC 1502 are synchronized with the PWM signal, the average provides the phase information.

If the transmitter 102 is not able to successfully demodulate the digital measurement voltage potential representation 1514 after repeated attempts to demodulate the signal, then the path selection module 1504 switches the digital measurement voltage potential representation 1514 over to the peak mode (i.e., the path selection module 1504 provides the digital measurement voltage potential representation 1514 to the peak detector module 1506). A state machine (e.g., of the controller 310 of FIG. 3) may keep track of whether or not successful demodulation has occurred. Demodulation may not be successful due to several factors. By way of non-limiting examples, unsuccessful demodulation may occur responsive to amplitude of the modulation in the measurement voltage potential Vmeas being too low or signal distortion in the measurement voltage potential Vmeas. In peak mode the ADC 1502 is triggered in oversampling mode to store several samples corresponding to one half cycle of switching frequency. By way of non-limiting example, the ADC 1502 may be triggered in oversampling mode to sample at 125 kHz fixed frequency instead of in the range of 110 kHz to 205 kHz. The peak detector module 1506 is configured to receive the digital measurement voltage potential representation 1514 and compute a peak 1516 from values (of the digital measurement voltage potential representation 1514) preferably stored using direct memory access (DMA) processing. By way of non-limiting example, DMA may be used to free a processing core (e.g., processing core 326 of FIG. 3) of a controller used to implement the digital demodulation system 1500 (e.g., controller 310 of FIG. 3, controller 1704 of FIG. 17). The use of DMA may enable direct transfer of data from an analog-to-digital converter (ADC) to memory (e.g., random access memory) (e.g., memory 324 of FIG. 3) without any intervention from the processing core of the controller. Since values of the digital measurement voltage potential representation 1514 may be converted and stored at a very high rate (e.g., 2 MHz, without limitation), DMA may prevent the processing core of the controller (e.g., controller 310 of FIG. 3) from sampling the measurement voltage potential Vmeas, which provides the processing core of the controller time to do other computations. Accordingly, the controller may be free to run any supplementary code during data storage. Further, since DMA transfer does not depend on code execution from memory, it has a very high execution rate.

The three-stage band pass filter 1522 is configured to receive the peak 1516 (in the peak mode) or the average 1518 (in the averaging mode). The peak 1516 or the average 1518 is used to demodulate communications from the receiver from the digital measurement voltage potential representation 1514. Demodulation of communications from the digital measurement voltage potential representation 1514 using the peak 1516 may be performed similar to demodulation of communications from the average 1518. The three-stage band pass filter 1522 is similar to the three-stage cascade filter 404 of FIG. 4 and the three-stage cascade filter 806 of FIG. 8. The three-stage band pass filter 1522 is configured to provide a filtered measurement voltage potential 1524 to post-processing module 1510. The post-processing module 1510 includes a digital comparator (e.g., similar to the digital comparator 408 of FIG. 4 and FIG. 8), a timing analysis module (e.g., similar to the timing analysis module 410 of FIG. 4 and FIG. 8), and a data extraction module (e.g., similar to the data extraction module 412 of FIG. 4 and FIG. 8). Accordingly, the post-processing module 1510 is configured to receive the filtered measurement voltage potential 1524 and extract communications 1520 received from a receiver (e.g., receiver 104 of FIG. 1, receiver 306 of FIG. 3). Control action module 1512 is configured to perform control actions, which may be performed based on the communications 1520 received from the receiver.

Figure 16:
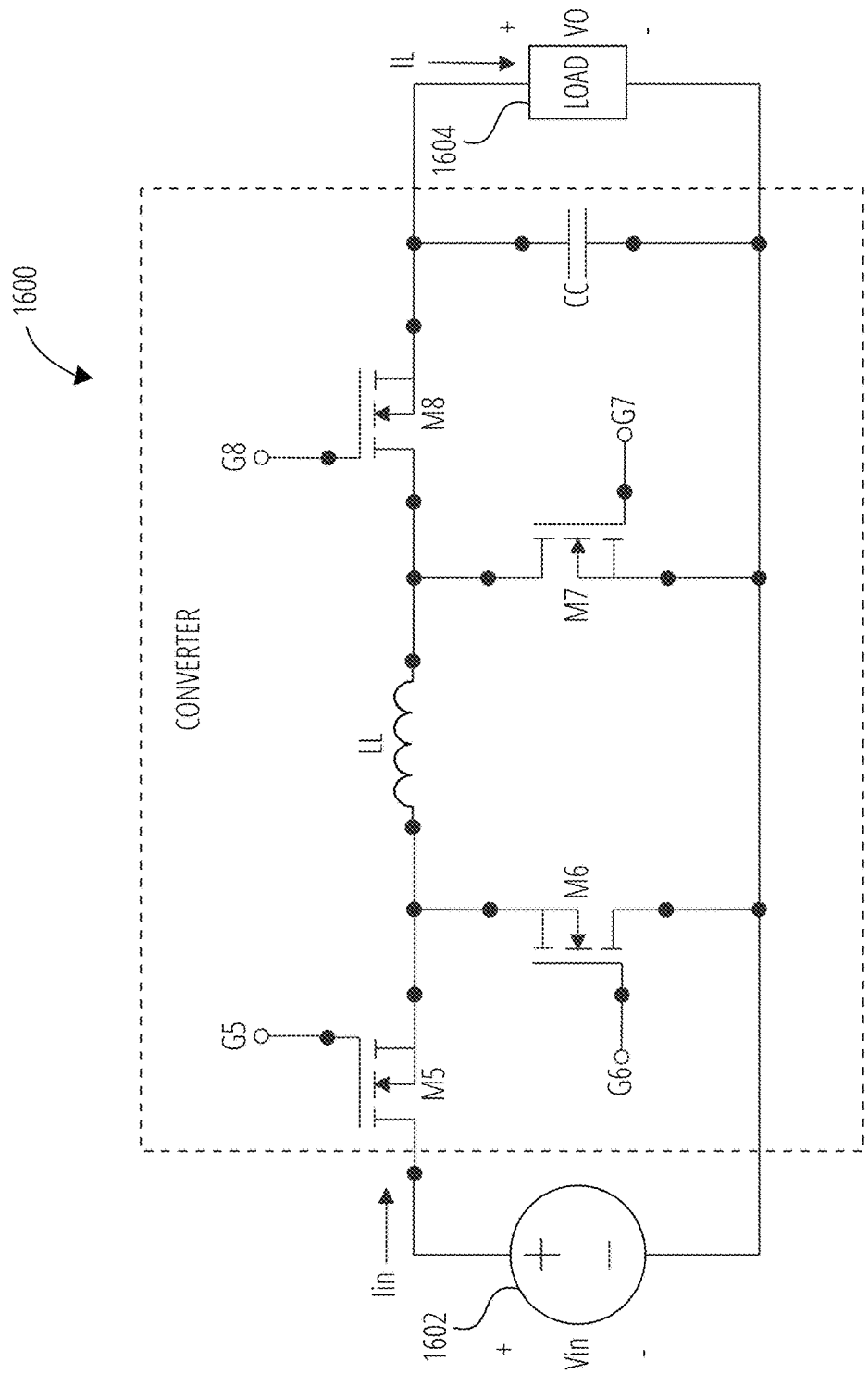
FIG. 16 is a schematic illustration of a converter, which is an example of a converter of FIG. 2 or FIG. 3, in accordance with various embodiments of the present disclosure.

FIG. 16 is a schematic illustration of a converter 1600, which is an example of a converter 204 of FIG. 2 or a converter 302 of FIG. 3, in accordance with various embodiments of the present disclosure. For example, converter 204 of FIG. 2 and/or converter 302 of FIG. 3 may include converter 1600. FIG. 16 illustrates converter 1600 operably coupled to a voltage source 1602 and a load 1604. The voltage source 1602 may be an external voltage source such as the voltage source 112 or the voltage source 202 of FIG. 1 and FIG. 2, respectively. The voltage source 1602 is configured to provide input voltage potential Vin provided by voltage source 1602 at an input current Iin to the converter 1600. Converter 1600 is also operably coupled to a load 1604. Converter 1600 is configured to provide a load voltage potential VO (also referred to herein as "output voltage potential VO") having a load current IL to the load 1604. By way of non-limiting example, the load 1604 may be the transmit bridge 314 and transmit coil 318 of FIG. 3, in which case the load voltage potential VO and the load current IL would be the rail voltage potential Vrail and the rail current Irail of FIG. 2, respectively.

Converter 1600 is configured to operate both in a buck mode and a boost mode. In the buck mode of the converter 1600, the load voltage potential VO is lower than the input voltage potential Vin and the load current IL is higher than the input current IL. In the boost mode of the converter 1600 the load voltage potential VO is higher than the input voltage Vin and the load current IL is lower than the input current Iin.

Converter 1600 includes four switches (e.g., transistors M5-M8) in an H-bridge configuration with an inductor LL operably coupled across the output of the H-bridge. As a result, the converter 1600 is configured as a four switch buck-boost converter (FSBBC). The converter 1600 further includes a capacitor CC operably coupled in parallel with the load 1604 to reduce ripple at the output of the converter 1600.

The converter 1600 may be configured to be operated at a relatively high frequency (e.g., 500 kHz). Switches M5-M8 may include transistors (e.g., MOSFETs) for low to medium power applications (e.g., 5 Watt to 300 Watt power applications). Transistors (e.g., MOSFETs) M5 and M6 may be biased so as to control a converter operation in the buck mode. In the buck mode the gate G8 of transistor M8 is biased to enable transistor M8 to conduct and the gate G7 of transistor M7 is biased to prevent transistor M7 from conducting. Signals on Gates G5 and G6 of transistors M5 and M6 are alternately asserted and de-asserted (G5 is asserted when G6 is de-asserted and G6 is asserted when G5 is de-asserted) so as to respectively enable, and prevent, conduction. For example, transistors M5 and M6 may be controlled by complementary PWM signals during the buck mode. By way of non-limiting example, gates G5 and G6 of transistors M5 and M6 may be driven by drivers (e.g., MOSFET drivers such as the gate driver 1706 of FIG. 17), which are controlled by the PWM signals (e.g., buck PWM waveform 2402 (FIG. 24), buck PWM waveform 2502 (FIG. 25), buck PWM waveform 2602 (FIG. 26), etc.) from a controller (e.g., a microcontroller, such as controller 310 of FIG. 3 using operations of the digital demodulation system 400 of FIG. 4 and/or the digital demodulation system 800 of FIG. 8).

Transistors (e.g., MOSFETs) M7 and M8 may be biased so as to control a converter operation in the boost mode. In the boost mode a signal on the gate G5 of transistor M5 is asserted to enable transistor M5 to conduct and a signal on the gate G6 of transistor M6 is de-asserted to prevent transistor M6 from conducting. Signals on the gates G7 and G8 of transistors M7 and M8 are alternately asserted and de-asserted (G7 is asserted when G8 is de-asserted and G8 is asserted when G7 is de-asserted) so as to respectively enable, and prevent, conduction. For example, transistors M7 and M8 may be controlled by complementary PWM signals in the boost mode. By way of non-limiting example, gates G7 and G8 of transistors M7 and M8 may be driven by drivers, which are controlled by the PWM signals (e.g., boost PWM waveform 2504 (FIG. 25), boost PWM waveform 2604 (FIG. 26)) from a controller.

Figure 17:
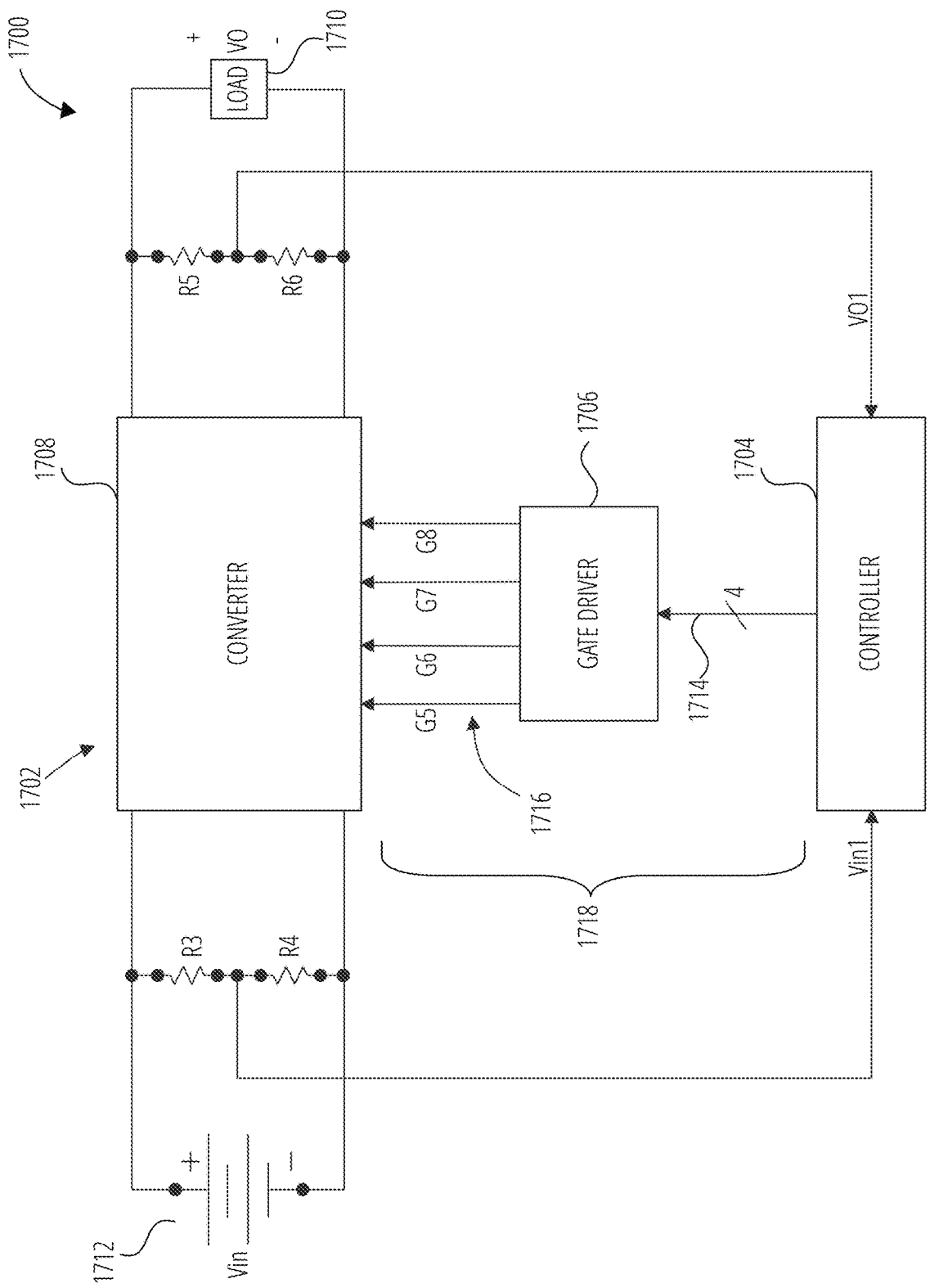
FIG. 17 is a schematic illustration of a portion of a wireless power transmitter, according to some embodiments.

FIG. 17 is a schematic illustration of a portion 1700 of a wireless power transmitter (e.g., such as the transmitter 102 of FIG. 1 or the transmitter 200 of FIG. 2), according to some embodiments. The portion 1700 includes a control interface 1718 between a power stage 1702 and a controller 1704 (e.g., the controller 310 of FIG. 3). The control interface 1718 includes a controller output 1714, a gate driver 1706, and a driven controller output 1716. The power stage 1702 includes a converter 1708 (e.g., the converter 1600 of FIG. 16) operably coupled to a voltage source 1712, which voltage source 1712 is arranged to provide an input voltage potential Vin, and a load 1710. The converter 1708 is configured to provide an output voltage potential VO to the load 1710. With the converter 1708 operating in a buck mode, the output voltage potential VO may be less than the input voltage potential Vin. With the converter 1708 operating in a boost mode, the output voltage potential VO may be greater than the input voltage potential Vin.

The power stage 1702 also includes a step-down resistor divider network including series connected resistors R3 and R4 operably coupled across the voltage source 1712 and across an input to the converter 1708. A stepped-down input voltage potential Vin1 proportional to the input voltage potential Vin provided by the voltage source 1712 may be provided to the controller 1704 from between resistors R3 and R4. The power stage 1702 further includes a step-down resistor divider network including series connected resistors R5 and R6 operably coupled across the load 1710 and across an output of the converter 1708. A stepped-down output voltage potential VO1 proportional to the output voltage potential VO provided by the converter 1708 may be provided to the controller 1704 from between resistors R5 and R6. As a result, the controller 1704 is configured to compare the input voltage potential Vin provided to the converter 1708 to the output voltage potential VO provided by the converter 1708 responsive to the stepped-down input voltage potential Vin1 and the stepped-down output voltage potential VO1 received by the controller 1704.

The controller 1704 may include a microcontroller such as a digital signal processing microcontroller configured for extremely fast calculations (e.g., substantially 50 million instructions per second). For example, controller 1704 may sample the stepped-down input voltage potential Vin1 and the stepped-down output voltage potential VO1 (e.g., from step-down resistor divider networks R3 and R4, and R4 and R5). A controller output 1714 of controller 1704 may provide the PWM signals (e.g., PWM signals provided by the controller 310 to the converter 302 of FIG. 3). In some embodiments, the portion 1700 includes the gate driver 1706 (e.g., a MOSFET driver) configured to receive the controller output 1714 and provide a driven controller output 1716. In some embodiments the gate driver 1706 may be implemented into the converter 1708. In some embodiments, the gate driver 1706 may be implemented separately from the converter 1708. By way of non-limiting example, the gate driver 1706 may include MOSFET drivers, inductors, capacitors, and current sensing circuits. The driven controller output 1716 may be applied to gates G5, G6, G7, and G8 of switches (e.g., M5, M6, M7, and M8 of FIG. 16) of the converter 1708 (e.g., the converter 1600 of FIG. 16) to control the converter 1708. The gate driver 1706 may, in some embodiments, convert voltage levels of the controller output 1714, i.e., the provided PWM signals, to voltage levels required to drive the transistors (e.g., M5-M8) of converter 1708. By way of non-limiting example, the voltage levels generated via gate driver 1706 may be converted from a logic level low voltage potential of zero volts and a logic level high voltage potential of 3.3 volts (0 V, 3.3 V), respectively, to a logic level low voltage potential of zero volts and a logic level high voltage potential of twelve volts (0 V, 12 V). In addition, gate driver 1706 may provide a current drive to switch the transistors M5-M8 within a minimum time.

Figure 18:
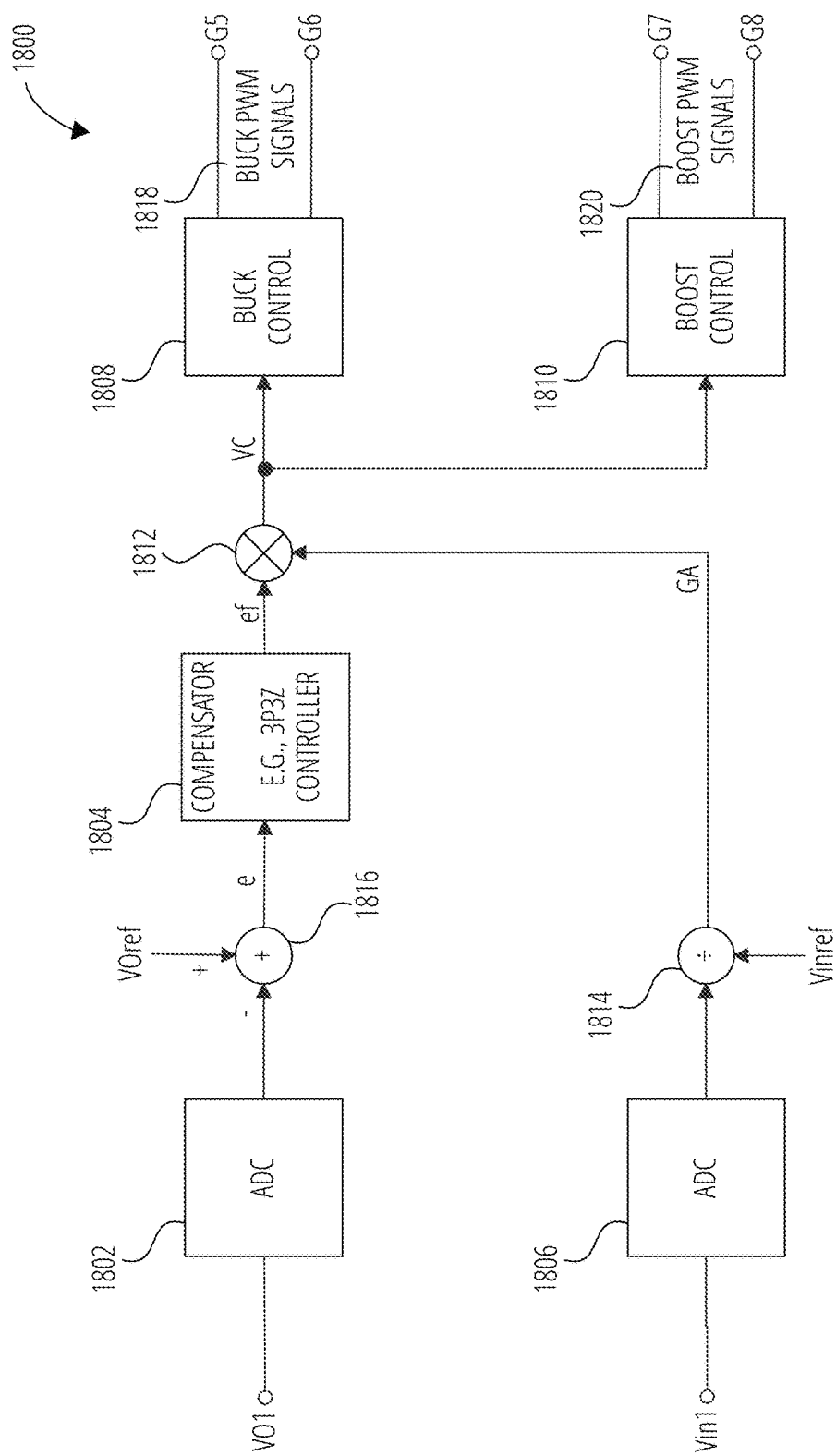
FIG. 18 is block diagram of a portion of a controller, according to some embodiments.

FIG. 18 is a block diagram of a portion of a controller 1800 (e.g., a digital signal processing microcontroller), according to some embodiments. The controller 1800 may be an example of the controller 310 of FIG. 3 and/or the controller 1704 of FIG. 17. In some embodiments, processing of the controller 1800 may be generally executed using software/firmware with support from hardware of the controller 1800. Accordingly, in some embodiments the block diagram of FIG. 18 may be implemented in part or in totality using software/firmware. In some embodiments the block diagram of FIG. 18 may be implemented in part or in totality using hardware components. A stepped-down output voltage potential VO1 (FIG. 17) may be converted into digital form by ADC 1802. For example, stepped-down output voltage potential VO1 may be sampled every cycle or every other cycle (e.g., of one of the controller outputs 1714 such as that provided to G5). The controller 1800 is configured to compare this sampled voltage potential against a reference output voltage potential VOref using an adder 1816 (e.g., by subtracting the sample of stepped-down output voltage potential VO1 from the reference output voltage potential VOref), and an error voltage potential e is provided. By way of non-limiting examples, the reference output voltage potential VOref may be a value specified by standards governing operation of the converter 1708 (FIG. 17), or the reference output voltage potential VOref may be provided by a wireless power receiver and demodulated using the method 1200 of FIG. 12 or the method 1300 of FIG. 13. The controller 1800 is configured to input the error voltage potential e to a compensator 1804. Compensator 1804 may include a direct form 2 and/or a cascaded implementation of a 3P3Z controller. A 3P3Z controller has three poles and two zeros, which may be selectively set to provide an optimum transient response. The compensator 1804 may filter the error voltage potential e to generate a filtered error ef. The filtered error ef output by the compensator 1804 varies according to the input voltage potential (i.e., the error voltage potential e) and output load conditions. It should be noted that the terms involving the root words "filter" and "compensator" are sometimes used herein interchangeably.

The controller 1800 also includes an ADC 1806 configured to sample a stepped down input voltage potential Vin1 and provides the sample to a divider 1814. It should be noted that in some embodiments the ADC 1802 and the 1806 may be configured to convert the stepped-down versions of the input voltage potential Vin1 and the output voltage potential VO1 to values corresponding to the input voltage potential Vin and the output voltage potential VO, respectively. The stepped-down input voltage potential Vin1 can be sampled in every cycle or every other cycle (i.e., like the stepped-down output voltage potential VO1). The divider 1814 is configured to divide an input reference voltage potential Vinref by the sample of the stepped-down input voltage potential Vin1 to provide an adaptive gain GA. The adaptive gain GA is, therefore, a ratio of the reference input voltage potential Vinref to the measured sample of the stepped-down input voltage potential Vin1.

Figure 19:
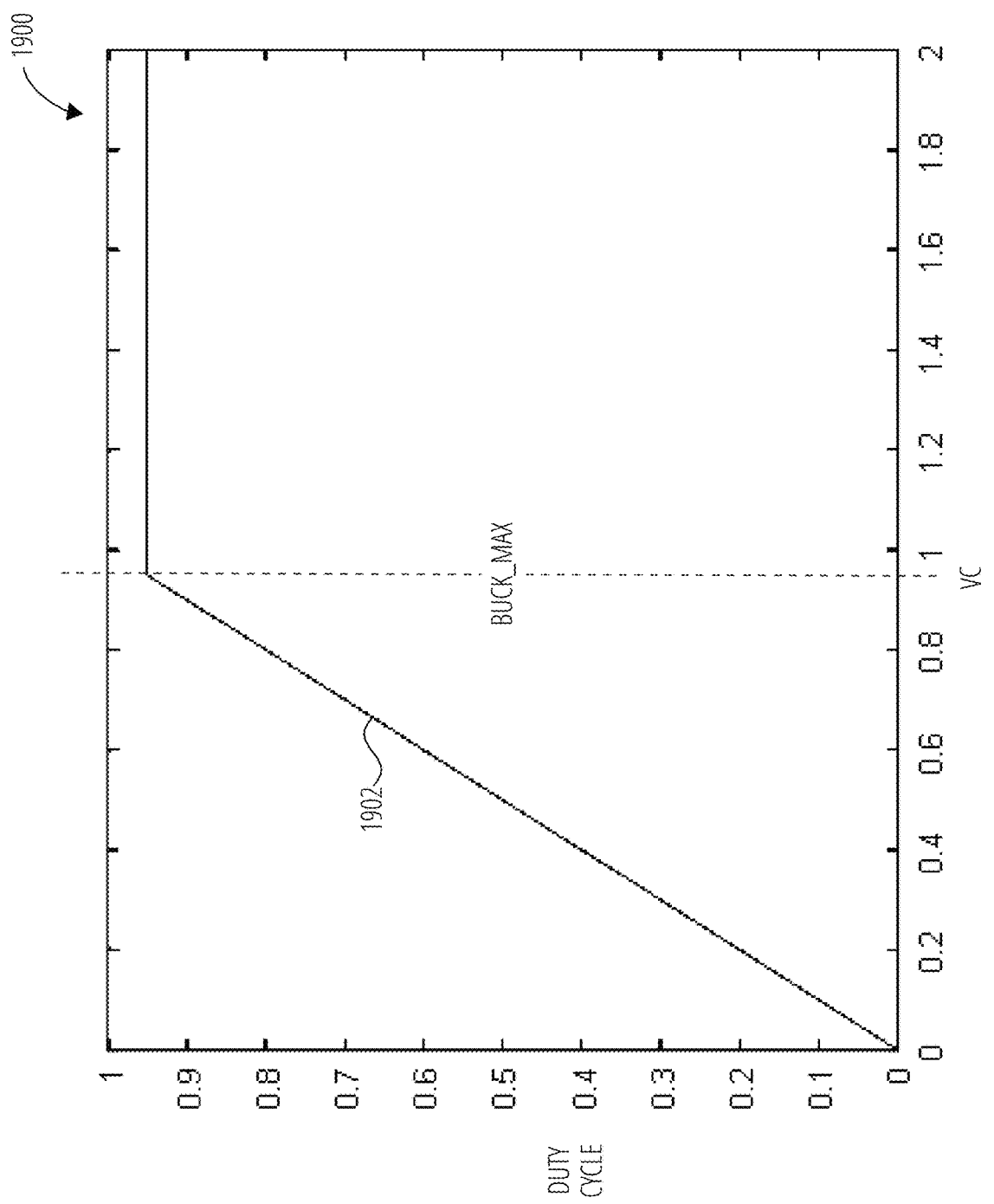
FIG. 19 is a plot illustrating a relationship between a duty cycle control signal and a buck duty cycle for a buck mode of a converter, according to some embodiments.

The controller 1800 is configured to multiply the filtered error ef output by compensator 1804 by the adaptive gain GA derived from the stepped-down input voltage potential Vin1 and the reference input voltage potential Vinref using a multiplier 1812 to generate a duty cycle control signal VC (i.e., the output of compensator 1804, ef, treated with the adaptive gain, GA). The duty cycle control signal VC may be used to derive a duty cycle for the buck and the boost legs of the full bridge converter (e.g., the converter 1708 of FIG. 17). The duty cycle for the buck mode is linear and is as shown in FIG. 19.

The duty cycle control signal VC is provided to a buck control module 1808 and a boost control module 1810. During the buck mode the buck control module 1808 is configured to drive the gates G5 and G6 of transistors M5 and M6 (FIG. 16) based on the duty cycle control signal VC. In other words, the buck control module 1808 is configured to generate buck PWM signals 1818 (e.g., a buck PWM signal and a complimentary buck PWM signal that is complimentary to the buck PWM signal) and drive the gates G5 and G6 using the buck PWM signals 1818. At the same time, as previously discussed, a signal to the gate G8 of transistor M8 (FIG. 16) is asserted so as to enable conduction and a signal to the gate G7 of transistor M7 is de-asserted so as to prevent conduction.

During the boost mode, or CBB mode, the boost control module 1810 is configured to drive the gates G7 and G8 of transistors M7 and M8 based on the duty cycle control signal VC. In other words, the boost control module 1810 is configured to generate boost PWM signals 1820 (e.g., a boost PWM signal and a complimentary boost PWM signal that is complimentary to the boost PWM signal) and drive the gates G7 and G8 using the boost PWM signals 1820. At the same time, as previously discussed, a signal to the gate G5 is asserted so as to enable conduction and a signal to the gate G6 is de-asserted so as to prevent conduction.

As discussed with reference to FIG. 21, a duty cycle corresponding to the duty cycle control signal VC is configured to transition linearly and smoothly between a buck mode and a cascaded buck-boost mode of the converter 1708 (FIG. 17). Also, as discussed with reference to FIG. 23, the controller output 1714 (FIG. 17) is configured to control the converter 1708 to have a zero decibel (0 dB) magnitude of an open loop gain that is at a constant frequency regardless of fluctuations of the converter input voltage potential Vin.

FIG. 19 is a plot 1900 illustrating a relationship between a duty cycle control signal VC and a buck duty cycle 1902 for a buck mode of a converter, according to some embodiments. The plot 1900 includes a duty cycle 1902 for the buck mode plotted against the duty cycle control signal VC. The duty cycle 1902 varies linearly as VC (e.g., duty cycle 1902~VC) from VC=0 to VC=BUCK_MAX, and duty cycle 1902 is saturated beyond BUCK_MAX. During buck mode, the operation of the converter (e.g., the converter 1708 of FIG. 17) is similar to a buck converter, which will be understood to a person of ordinary skill in the art. In the buck mode, the output voltage potential VO of the converter is a function of the input voltage Vin of the converter and the duty cycle 1902. The output voltage potential is given by: VO=Vin*Dbuck, where Dbuck is the duty cycle 1902 in the buck mode.

The output voltage potential VO may be less than the input voltage potential Vin in the buck mode (the duty cycle 1902 in the buck mode is always less than 1). The BUCK_MAX value may be decided (e.g., by the designer) and may vary from, for example, 0.8 to 0.95. An upper limit of, for example, 0.95 may be required to charge a bootstrap MOSFET driver (e.g., gate driver 1706), which drives a high side MOSFET (e.g., transistor M5 of FIG. 16). During the buck mode, the boost leg MOSFETs are turned OFF (e.g., signal to gate G7 of transistor M7 of FIG. 16 is de-asserted to prevent conduction and a signal to the gate G8 of transistor M8 of FIG. 16 is asserted to enable conduction).

Once the duty cycle 1902 clamps to BUCK_MAX, the mode changes from buck mode to boost mode. The buck leg MOSFETs (e.g., transistors M7 and M8 of FIG. 16) may be operated at BUCK_MAX, and the duty cycle control signal VC may be used to derive a boost mode duty cycle Dboost. This mode is known as a cascaded buck-boost (CBB) as the buck section is cascaded with boost section. In CBB mode, the duty cycle for the MOSFETs M7 and M8 vary responsive to the input voltage potential Vin and load condition. The output voltage in the boost mode is given by: VO=Vin*BUCK_MAX/(1−Dboost). As seen from this equation, the output voltage potential VO is a non-linear function of the duty cycle Dboost. Dboost may be linearized (using, for example, either a lookup table or an equation) as shown in FIG. 20.

Figure 20:
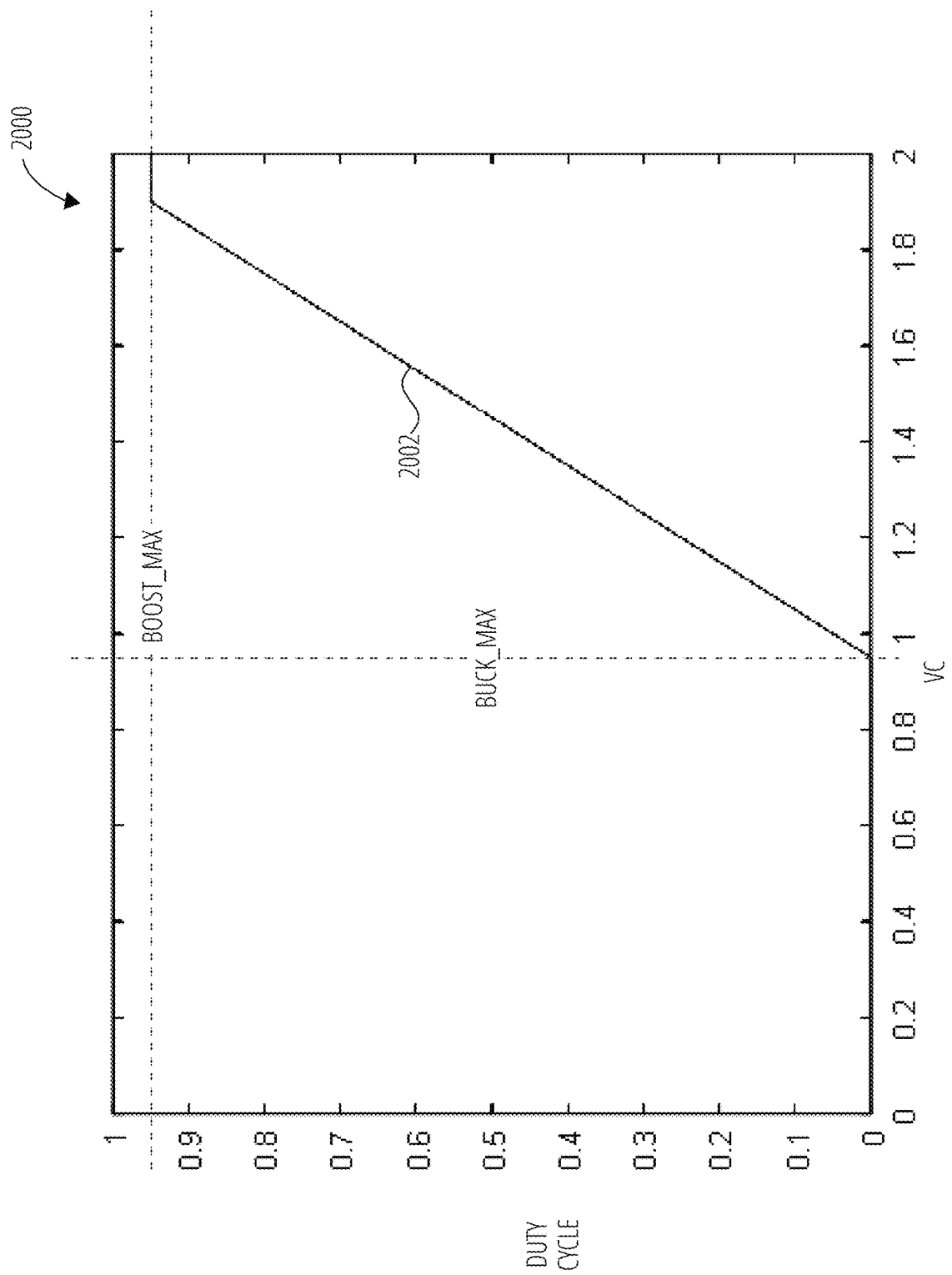
FIG. 20 is a plot illustrating a relationship between a duty cycle control signal and a boost duty cycle for a boost mode of a converter, according to some embodiments.

FIG. 20 is a plot 2000 illustrating a relationship between a duty cycle control signal VC and a boost duty cycle 2002 (Dboost) for a boost mode of a converter (e.g., the converter 1708 of FIG. 17), according to some embodiments. The plot 2000 includes a boost duty cycle 2002 plotted against the duty cycle control signal VC. The value of the boost duty cycle 2002 in buck mode is 0, while the boost duty cycle 2002 varies from 0 to BOOST_MAX in the CBB mode, providing a linear range of operation in CBB mode (e.g., boost duty cycle 2002=VC−BUCK_MAX). The value for BOOST_MAX can vary from, for example, 0.9 to 0.95.

The graphs shown in FIGS. 19 and 20 illustrate operation in which there is zero rise time at the MOSFET gate. However, in reality, the rise and fall times of the MOSFET driver (e.g., gate driver 1706 of FIG. 17) may be finite. The effect of this can be clearly seen at lower duty cycles, where the pulse width is very narrow. The narrow pulse width may not pass through the gate driver 1706, and may result in a MOSFET not being driven on to conduct during the short duration of the on-time. This may be compensated for by specifying a minimum pulse width TMIN for buck and CBB modes. Whenever the pulse width is below TMIN, the duty cycle may be set to 0.

Figure 21:
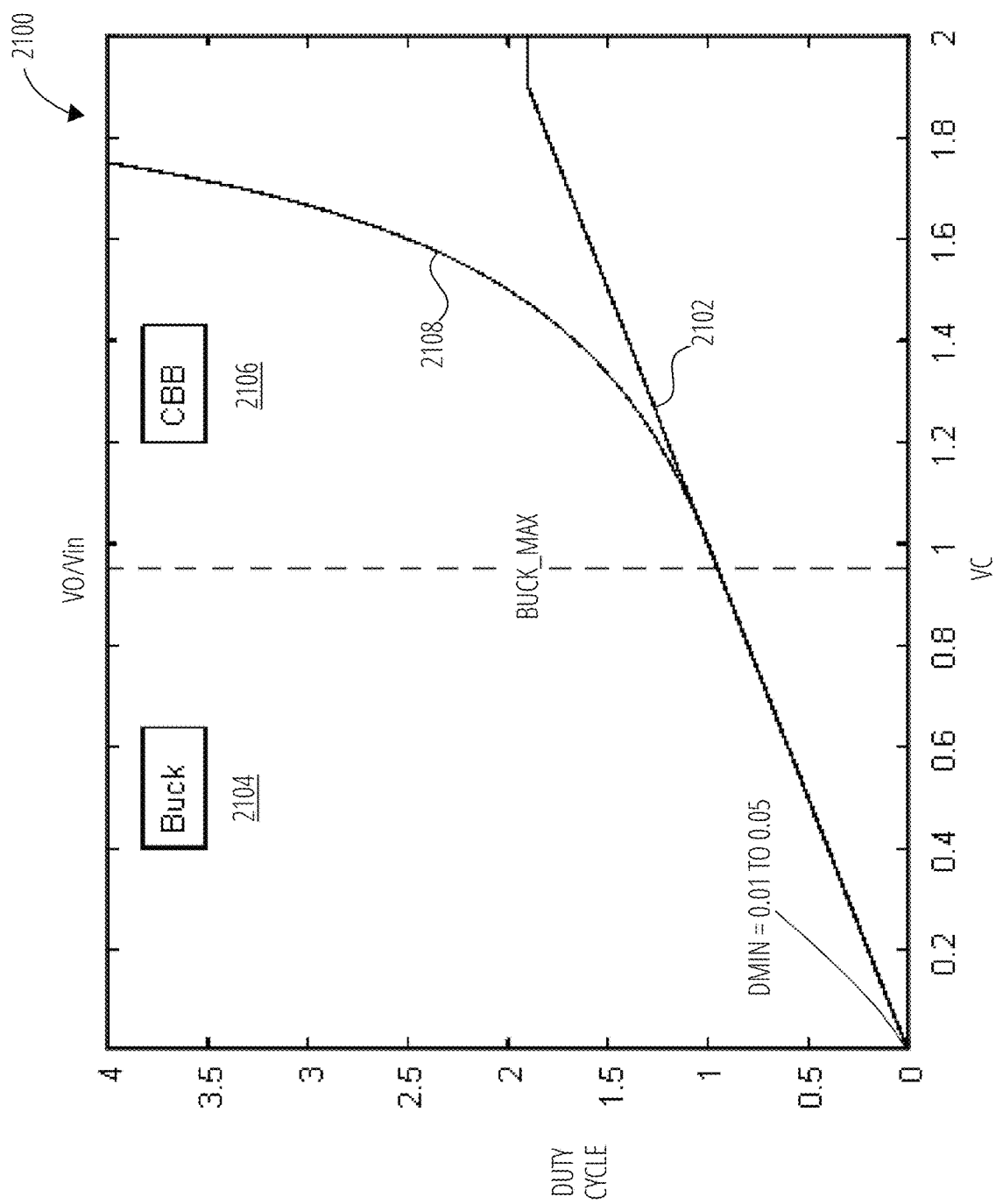
FIG. 21 is a plot illustrating a relationship between a duty cycle control signal and a duty cycle spanning both a buck mode and a CBB mode, according to some embodiments.

FIG. 21 is a plot 2100 illustrating a relationship between a duty cycle control signal VC and a duty cycle, as illustrated by duty cycle curve 2102 spanning both a buck mode 2104 and a CBB mode 2106, according to some embodiments. The duty cycle, which occupies the vertical axis of the plot 2100, is shown as a decimal in the range of 0 to 4, which corresponds to percentages from 0% to 400%. FIG. 21 also illustrates a ratio 2108 between the boost mode output voltage potential VO to input voltage potential Vin (VO/Vin) plotted against duty cycle. Duty cycle curve 2102 shows the duty cycle curve 2102 in both the buck and the CBB modes considering the minimum on time duration Tmin. A minimum duty cycle, Dmin, can be represented in terms of duty cycle curve 2102 as: Dmin=Tmin/T where T=switching period. For example, Dmin can vary from 1% to 5% (corresponding to 0.01 to 0.05 in the plot 2100) depending on the switching frequency and the MOSFET driver (e.g., the gate driver 1706) used.

The smooth transition of the duty cycle curve 2102 between the modes provides a linear operation along a wide input voltage potential Vin range. This may prevent ripple or transitions in the output voltage potential VO in the vicinity of the changeover from one mode to another. This is particularly useful in applications involving battery sources, where the input voltage linearly decreases as the battery discharges.

Figure 22:
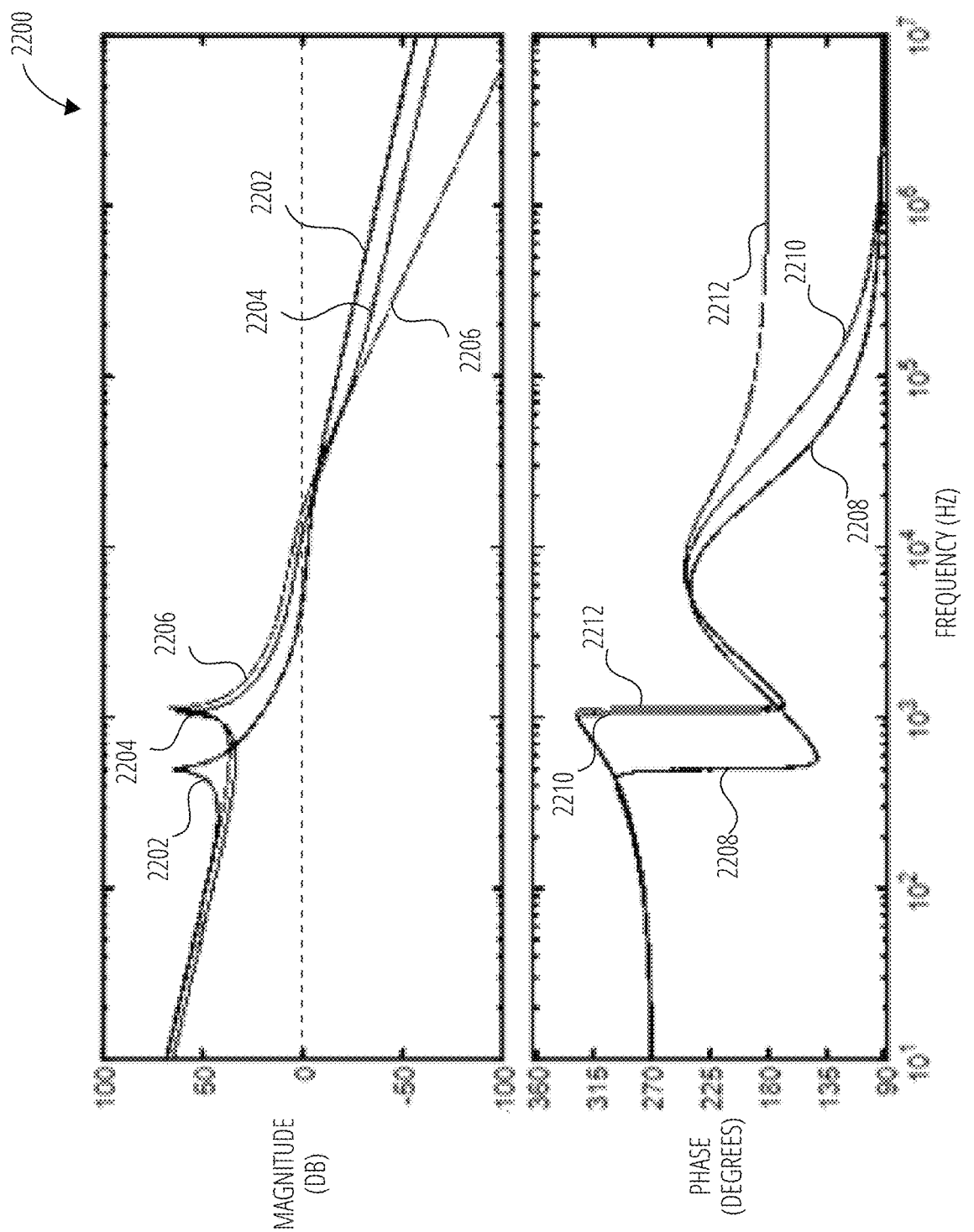
FIG. 22 is a bode plot of an open loop gain of the transmitter portion of FIG. 17 without adaptive gain of FIG. 18.

FIG. 22 is a bode plot 2200 of an open loop gain of the transmitter portion 1700 of FIG. 17 without adaptive gain GA of FIG. 18. The open loop gain takes into consideration the ADC gain (i.e., of the ADC 1802 of FIG. 17, a PWM gain, a resistor divider gain (e.g., the resistor dividers formed by R3 and R4 and by R5 and R6 of FIG. 17)), the compensator 1804 of FIG. 18, and a plant transfer function, but does not take into consideration the adaptive gain GA of FIG. 18. As a result, the gain illustrated in the bode plot 2200 of FIG. 22 may be the gain observed at the output of the compensator 1804 (the filtered error ef) before multiplication by the adaptive gain GA.

The bode plot 2200 includes magnitude (in decibels (dB) and phase (in degrees)) plots of the open loop gain for different levels of the input voltage potential Vin of FIG. 17, specifically for Vin=7, Vin=15, and Vin=23 volts. In other words, the bode plot 2200 includes a Vin=7 volts magnitude 2202 and a Vin=7 volts phase 2208, a Vin=15 volts magnitude 2204 and a Vin=15 volts phase 2210, and a Vin=23 volts magnitude 2206 and a Vin=23 volts phase 2212. As may be seen by inspecting the bode plot 2200, the zero dB points for the Vin=7 volts magnitude 2202, the Vin=15 volts magnitude 2204, and the Vin=23 volts magnitude 2206 are all at different frequencies. In other words, a change in the input voltage potential Vin may cause a difference in a zero dB crossover point of the filtered error ef of FIG. 18, thereby leading to different time responses. The addition of the adaptive gain GA shown in FIG. 18 may eliminate this issue in the compensator output VC of FIG. 18.

Figure 23:
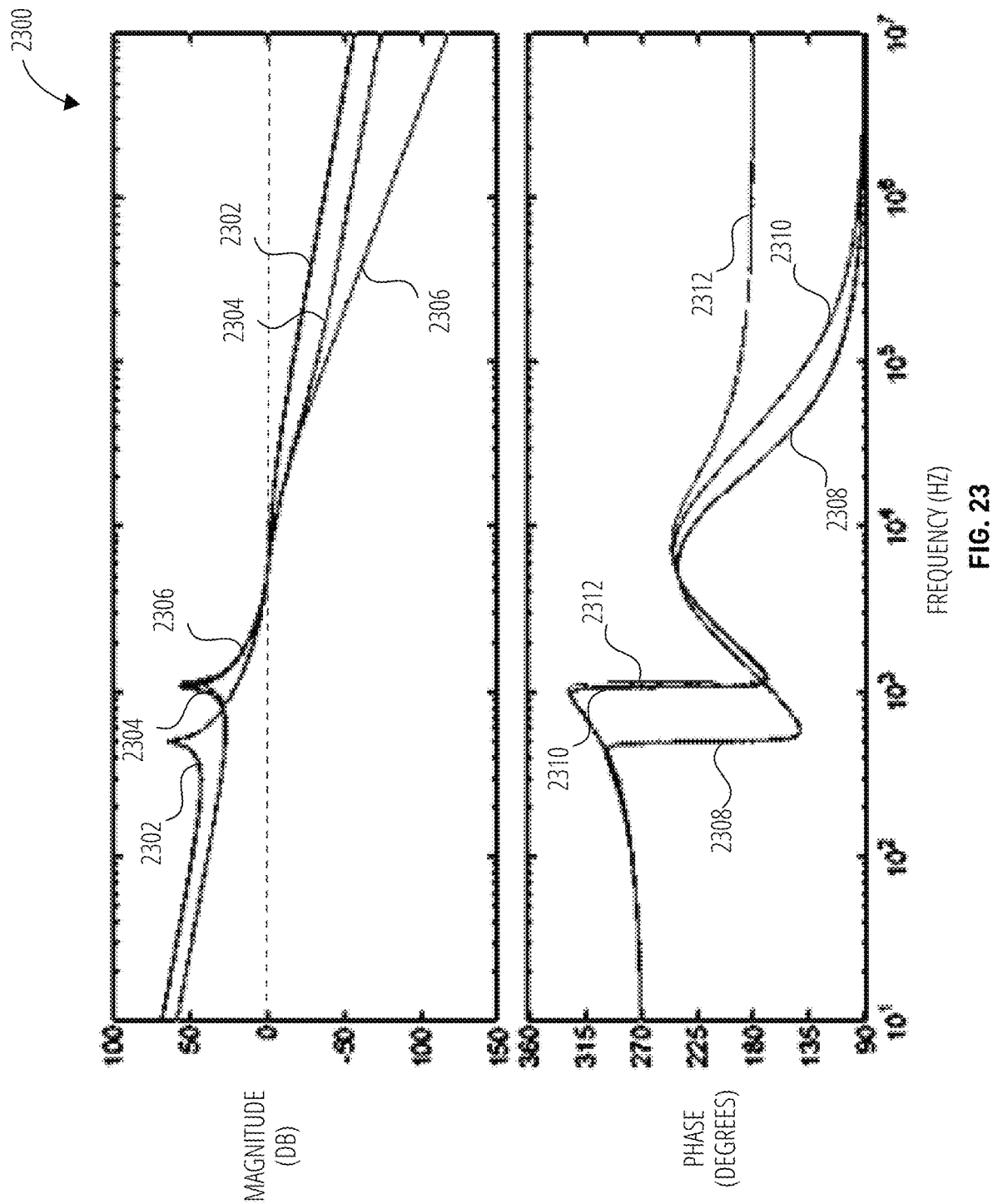
FIG. 23 is a bode plot of the open loop gain of the transmitter portion of FIG. 17 with adaptive gain of FIG. 18.

FIG. 23 is a bode plot 2300 of the open loop gain of the transmitter portion 1700 of FIG. 17 with adaptive gain GA of FIG. 18. Similar to the bode plot 2200 of FIG. 22 the bode plot 2300 includes magnitude and phase plots for the open loop gain for different levels of the input voltage potential Vin of FIG. 17, specifically for Vin=7, Vin=15, and Vin=23 volts. In other words, the bode plot 2300 includes a Vin=7 volts magnitude 2302 and a Vin=7 volts phase 2308, a Vin=15 volts magnitude 2304 and a Vin=15 volts phase 2310, and a Vin=23 volts magnitude 2306 and a Vin=23 volts phase 2312.

As may be seen by inspecting the bode plot 2300, the zero dB points for the Vin=7 volts magnitude 2302, the Vin=15 volts magnitude 2304, and the Vin=23 volts magnitude 2306 are all at the same frequency. In other words, a change in the input voltage potential Vin does not change the zero dB crossing point of the magnitude of the open loop gain with adaptive gain GA. Accordingly, the reference input voltage potential Vinref of FIG. 18 may be set to a minimum input voltage potential or a maximum input voltage potential. It may be advantageous to set the reference input voltage potential Vinref to a minimum, as this may lead to an adaptive gain GA of less than 1 (e.g., because it may be easier to implement computational logic with number less than 1). The adaptive gain GA may be considered during the placement of poles and zeros in the design of the compensator 1804.

Figure 24:
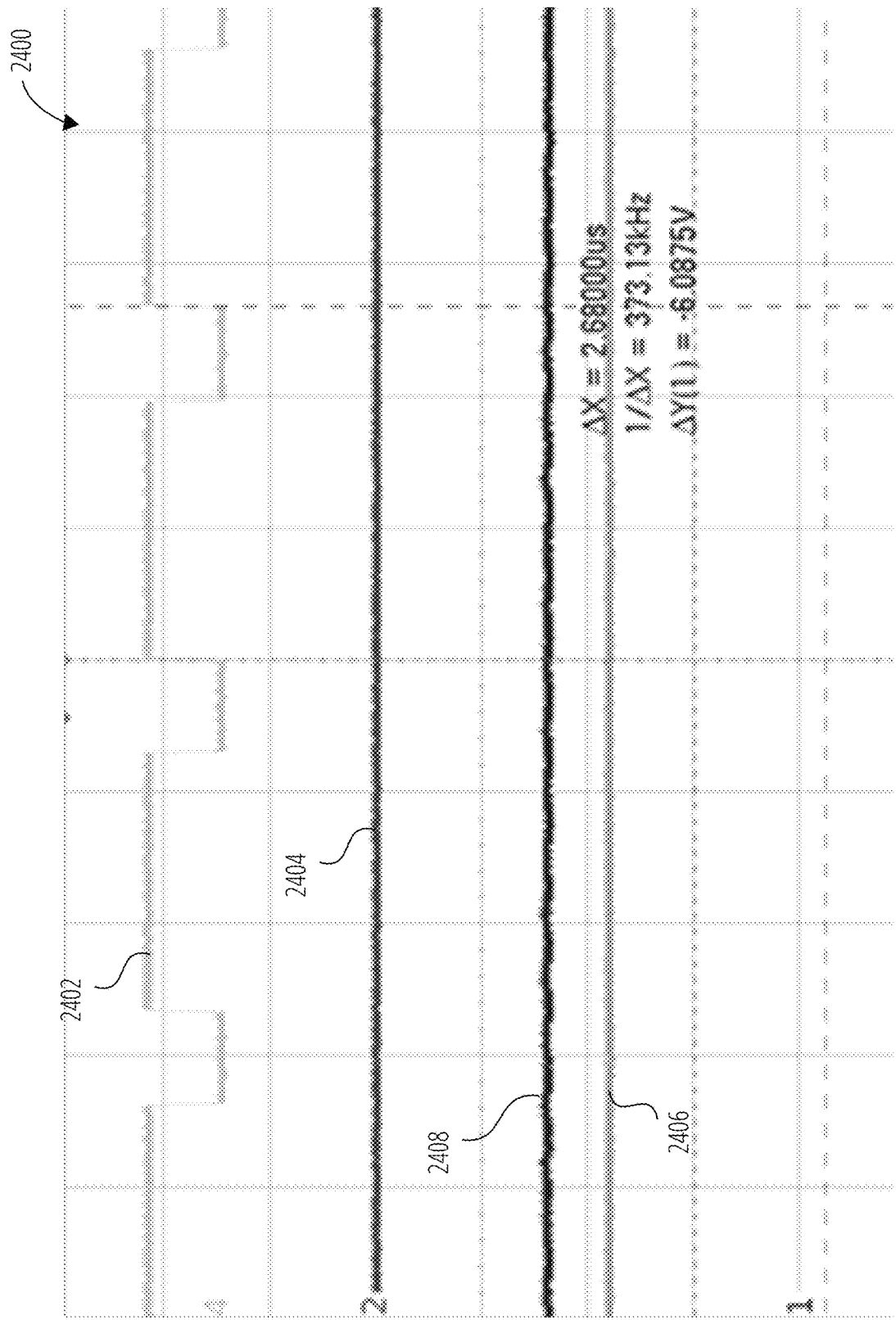
FIG. 24 is a plot illustrating various waveforms of the portion of the transmitter of FIG. 17 operating in a buck mode.

FIG. 24 is a plot 2400 illustrating various waveforms of the portion 1700 of the transmitter of FIG. 17 operating in a buck mode. The plot 2400 includes an input voltage potential Vin waveform 2408 and an output voltage potential VO waveform 2406. Although a small amount of ripple is shown on the input voltage potential Vin waveform 2408, this ripple is added by an electromagnetic interference filter (not shown), which adds the ripple. It is noted that the output voltage potential VO waveform 2406 has no ripple. The input voltage potential Vin of the input voltage potential Vin waveform 2408 is higher than the output voltage potential VO of the output voltage potential VO waveform 2406. Since the input voltage potential Vin is higher than the output voltage potential VO, the transmitter is operating in a buck mode.

The plot 2400 also includes a buck PWM waveform 2402 and a boost PWM waveform 2404. The buck PWM waveform 2402 corresponds to the buck PWM signals 1818 of FIG. 18, and may be one of the buck PWM signals 1818 provided to gate G5 or gate G6 of FIG. 18. As a result, the buck PWM waveform 2402 and its compliment may be used to drive gates G5 and G6 of transistors M5 and M6 of the converter 1600 of FIG. 16. The duty cycle of the buck PWM waveform 2402 may be proportional to the duty cycle control signal VC of FIG. 18. By way of non-limiting example, the frequency of operation may be 375 kHz and the duty cycle of the buck PWM waveform 2402 may be around 0.75. The boost PWM waveform 2404 may not transition in the buck mode (e.g., may be set to zero volts).

Figure 25:
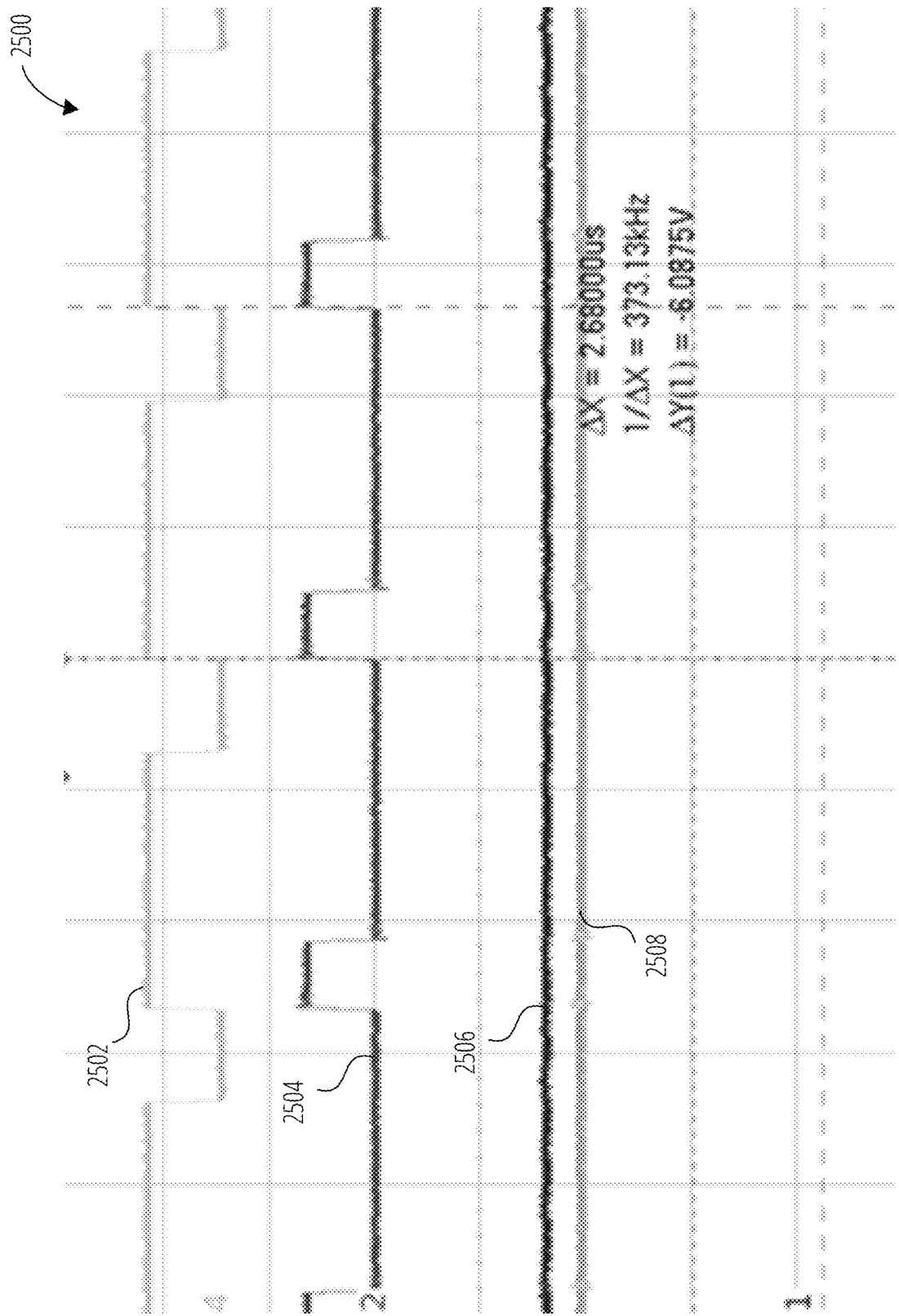
FIG. 25 is a plot illustrating various waveforms of the portion of the transmitter of FIG. 17 operating in a boost or CBB mode.
Figure 26:
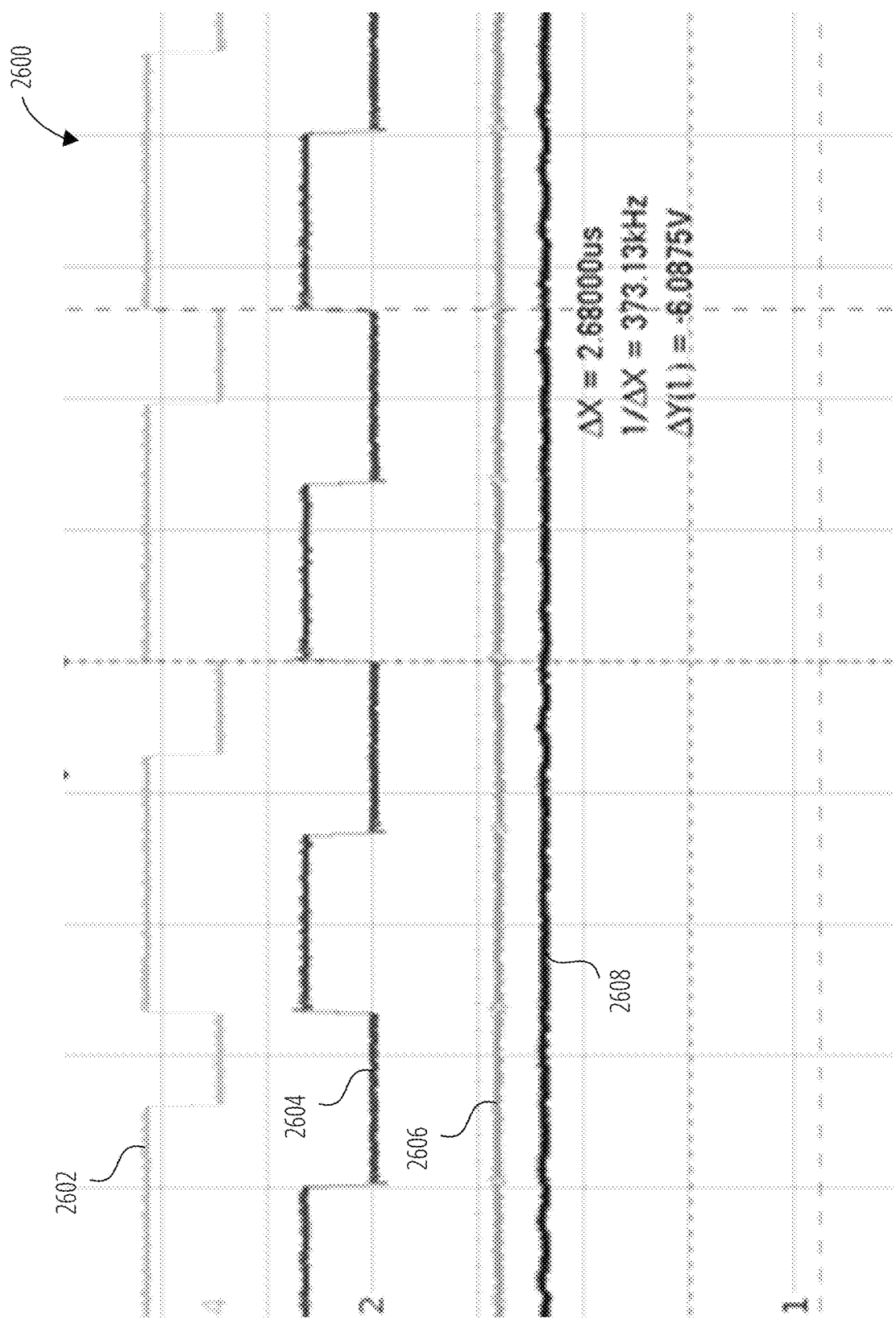
FIG. 26 is a plot illustrating various waveforms of the portion of the transmitter of FIG. 17 operating in a boost or CBB mode.

FIG. 25 and FIG. 26 are plots, plot 2500 and plot 2600 respectively, illustrating various waveforms of the portion 1700 of the transmitter of FIG. 17 operating in a CBB mode. The plot 2500 includes an input voltage potential Vin waveform 2508 and an output voltage potential VO waveform 2506. The output voltage potential VO corresponding to the output voltage potential VO waveform 2506 is higher than the input voltage Vin corresponding to the input voltage Vin waveform 2508.

The plot 2500 also includes a buck PWM waveform 2502 and a boost PWM waveform 2504. The buck PWM waveform 2502 of FIG. 25 is similar to the buck PWM waveform 2402 of FIG. 24. In FIG. 25, however, the duty cycle control signal VC of FIG. 18 has reached the BUCK_MAX limit (e.g., BUCK_MAX=0.8). The boost PWM waveform 2504 starts with a duty cycle greater than Dmin. By way of non-limiting example, the frequency of operation may be 375 kHz, and the duty cycle may be about 0.18 for the boost PWM waveform 2504.

In FIG. 26 the plot 2600 includes an input voltage potential Vin waveform 2608 and an output voltage potential VO waveform 2606. The output voltage potential VO corresponding to the output voltage potential VO waveform 2606 is higher than the input voltage potential Vin corresponding to the input voltage potential Vin waveform 2608.

The plot 2600 also includes a buck PWM waveform 2602 and a boost PWM waveform 2604. The buck PWM waveform 2602 of FIG. 26 is similar to the buck PWM waveform 2402 of FIG. 24. In FIG. 26, however, the duty cycle control signal VC of FIG. 18 has exceeded the BUCK_MAX limit and a duty cycle of the buck PWM waveform 2602 is clamped to BUCK_MAX. A duty cycle of the boost PWM waveform 2604 is linearly proportional to Vc and is around 0.5.

Figure 27:
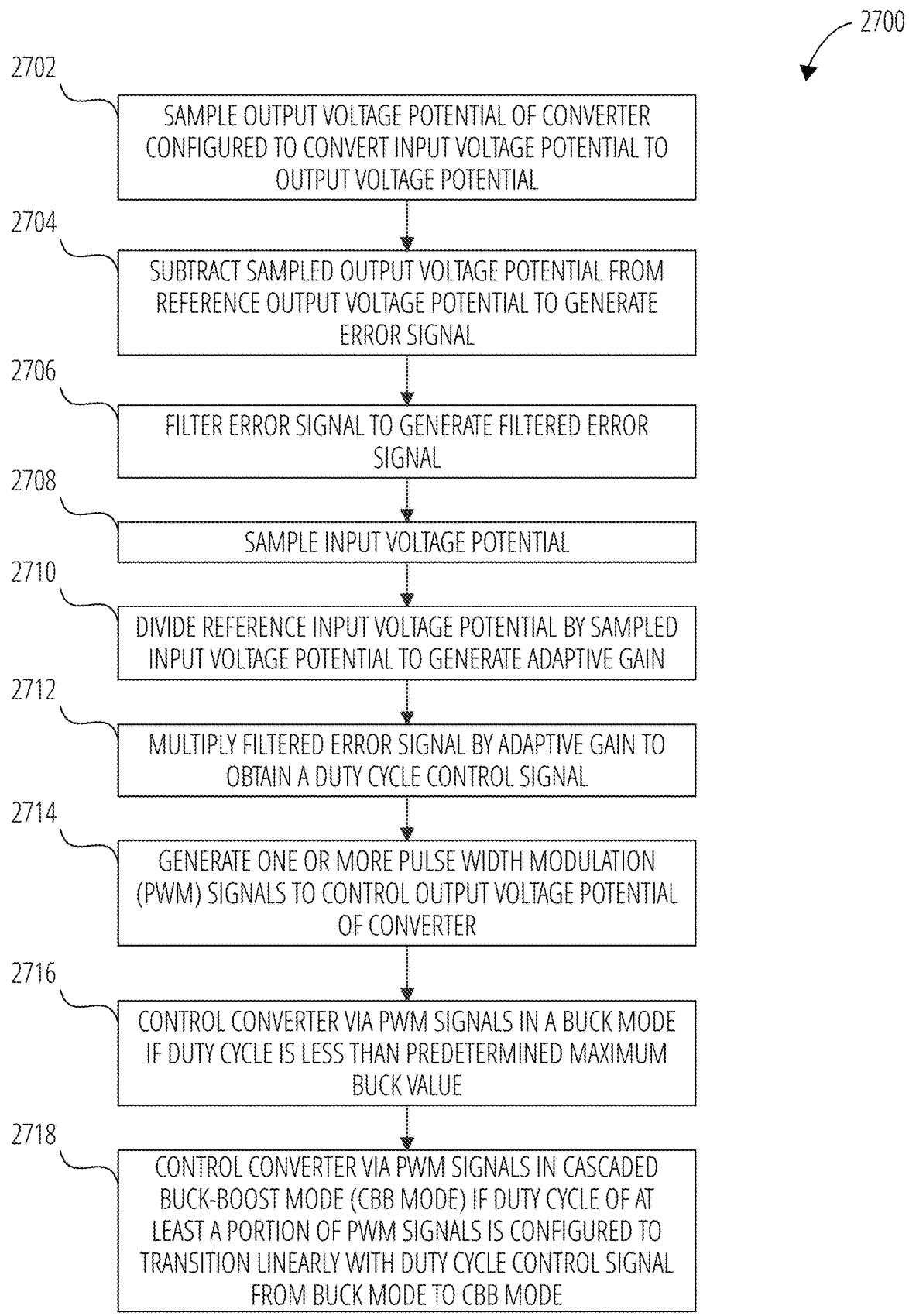
FIG. 27 is a flowchart illustrating a method of operating a wireless power transmitter, according to some embodiments.

FIG. 27 is a flowchart illustrating a method 2700 of operating a wireless power transmitter, according to some embodiments. In operation 2702, method 2700 samples an output voltage potential (e.g., the stepped-down output voltage potential VO1 of FIG. 18) of a converter (e.g., the converter 1708 of FIG. 17) configured to convert an input voltage potential (e.g., the input voltage potential Vin of FIG. 18) to the output voltage potential. In some embodiments sampling the output voltage potential includes sampling the output voltage potential using an ADC (e.g., the ADC 1802 of FIG. 18). In some embodiments the sampled output voltage potential includes a stepped down version (e.g., stepped down using a resistor divider) of an actual output voltage potential outputted by the converter. In some embodiments the input voltage potential includes a stepped-down version (e.g., stepped down using a resistor divider) of an actual input voltage potential received by the converter.

In operation 2704, method 2700 subtracts the sampled output voltage potential from a reference output voltage potential (e.g., the reference output voltage potential VOref of FIG. 18) to generate an error signal (e.g., the error signal e of FIG. 18). In operation 2706, method 2700 filters the error signal to generate a filtered error signal. In some embodiments, filtering the error signal includes filtering the error signal using a compensator (e.g., the compensator 1804 of FIG. 18). In some embodiments the compensator includes a 3P3Z controller 310.

In operation 2708, method 2700 samples the input voltage potential. In some embodiments sampling the input voltage potential includes sampling the input voltage potential with an ADC (e.g., the ADC 1806 of FIG. 18). In operation 2710, method 2700 divides a reference input voltage potential by the sampled input voltage potential to generate an adaptive gain (e.g., the adaptive gain GA of FIG. 18). The adaptive gain is thus configured to change as the sampled input voltage potential changes.

In operation 2712, method 2700 multiplies the filtered error signal by the adaptive gain to obtain a duty cycle control signal (e.g., the duty cycle control signal of FIG. 18). In some embodiments multiplying the filtered error signal by the adaptive gain includes multiplying the filtered error signal by the adaptive gain using a multiplier (e.g., the multiplier 1812 of FIG. 18).

In operation 2714, method 2700 generates one or more pulse width modulation (PWM) signals to control the output voltage potential of the converter. In some embodiments a buck controller (e.g., the buck control module 1808 of FIG. 18) is configured to generate buck PWM signals (e.g., the buck PWM signals 1818 of FIG. 18). In some embodiments a boost controller (e.g., the boost control module 1810 of FIG. 18) is configured to generate boost PWM signals (e.g., the boost PWM signals 1820 of FIG. 18). The converter may be controlled responsive to the PWM signals.

In operation 2716, method 2700 controls the converter via PWM signals in a buck mode if the duty cycle is less than a predetermined maximum buck value.

In operation 2718, method 2700 controls the converter via PWM signals in a CBB mode if the duty cycle of at least a portion of the PWM signals is configured to transition linearly with the duty cycle control signal from the buck mode to the CBB mode.

Figure 28:
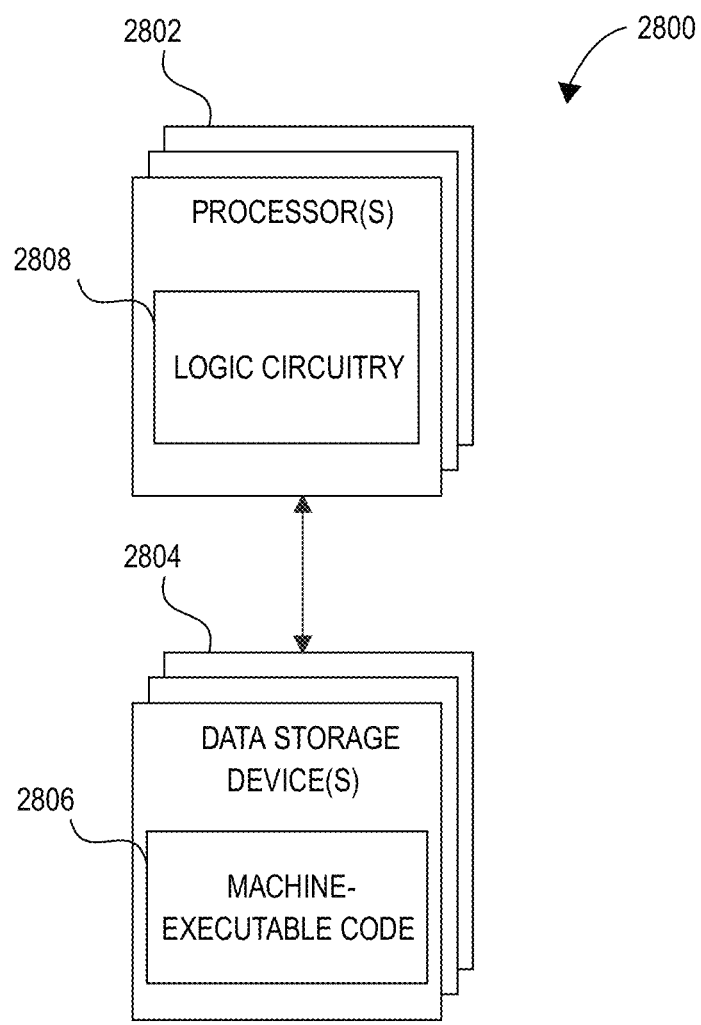
FIG. 28 is a block diagram of a computing device that may be used in some embodiments.

It will be appreciated by those of ordinary skill in the art that functional elements of embodiments disclosed herein (e.g., functions, operations, acts, processes, and/or methods) may be implemented in any suitable hardware, software, firmware, or combinations thereof. FIG. 28 illustrates non-limiting examples of implementations of functional elements disclosed herein. In some embodiments, some or all portions of the functional elements disclosed herein may be performed by hardware specially configured for carrying out the functional elements.

FIG. 28 is a block diagram of circuitry 2800 that, in some embodiments, may be used to implement various functions, operations, acts, processes, and/or methods disclosed herein. The circuitry 2800 includes one or more processors 2802 (sometimes referred to herein as "processors 2802") operably coupled to one or more data storage devices (sometimes referred to herein as "storage 2804"). The storage 2804 includes machine-executable code 2806 stored thereon and the processors 2802 include logic circuitry 2808. The machine-executable code 2806 includes information describing functional elements that may be implemented by (e.g., performed by) the logic circuitry 2808. The logic circuitry 2808 is adapted to implement (e.g., perform) the functional elements described by the machine-executable code 2806. The circuitry 2800, when executing the functional elements described by the machine-executable code 2806, should be considered as special purpose hardware configured for carrying out functional elements disclosed herein. In some embodiments the processors 2802 may be configured to perform the functional elements described by the machine-executable code 2806 sequentially, concurrently (e.g., on one or more different hardware platforms), or in one or more parallel process streams.

When implemented by logic circuitry 2808 of the processors 2802, the machine-executable code 2806 is configured to adapt the processors 2802 to perform operations of embodiments disclosed herein. For example, the machine-executable code 2806 may be configured to adapt the processors 2802 to perform at least a portion or a totality of the method 1200 of FIG. 12, the method 1300 of FIG. 13, and/or the method 2700 of FIG. 27. As another example, the machine-executable code 2806 may be configured to adapt the processors 2802 to perform at least a portion or a totality of the operations discussed for the controller 310 of FIG. 3, the digital demodulation system 400 of FIG. 4, the digital demodulation system 800 of FIG. 8, the digital demodulation system 1400 of FIG. 14, the digital demodulation system 1500 of FIG. 15, the controller 1704 of FIG. 17, and/or the controller 1800 of FIG. 18. As a specific, non-limiting example, the machine-executable code 2806 may be configured to adapt the processors 2802 to digitally demodulate a signal of a wireless power transmitter (e.g., the transmitter 102 of FIG. 1, the transmitter 200 of FIG. 2, the transmitter 304 of FIG. 3) to extract a communication received from a wireless power receiver (e.g., the receiver 104 of FIG. 1 or the receiver 306 of FIG. 3) via wireless power transfer from a wireless power transmitter to the wireless power receiver as described in various embodiments disclosed herein. As another specific, non-limiting example, the machine-executable code 2806 may be configured to adapt the processors 2802 to control a converter (e.g., the converter 204 of FIG. 2, the converter 302 of FIG. 3, the converter 1600 of FIG. 16, or the converter 1708 of FIG. 17) using adaptive gain, as disclosed in various embodiments herein.

The processors 2802 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute functional elements corresponding to the machine-executable code 2806 (e.g., software code, firmware code, hardware descriptions) related to embodiments of the present disclosure. It is noted that a general-purpose processor (may also be referred to herein as a host processor or simply a host) may be a microprocessor, but in the alternative, the processors 2802 may include any conventional processor, controller, microcontroller, or state machine. The processors 2802 may also be implemented as a combination of computing devices, such as a combination of a DSP and a microprocessor, a plurality of microprocessors, one or more microprocessors in conjunction with a DSP core, or any other such configuration.

In some embodiments the storage 2804 includes volatile data storage (e.g., random-access memory (RAM)), non-volatile data storage (e.g., Flash memory, a hard disc drive, a solid state drive, erasable programmable read-only memory (EPROM), etc.). In some embodiments the processors 2802 and the storage 2804 may be implemented into a single device (e.g., a semiconductor device product, a system on chip (SOC), etc.). In some embodiments the processors 2802 and the storage 2804 may be implemented into separate devices.

In some embodiments the machine-executable code 2806 may include computer-readable instructions (e.g., software code, firmware code). By way of non-limiting example, the computer-readable instructions may be stored by the storage 2804, accessed directly by the processors 2802, and executed by the processors 2802 using at least the logic circuitry 2808. Also by way of non-limiting example, the computer-readable instructions may be stored on the storage 2804, transferred to a memory device (not shown) for execution, and executed by the processors 2802 using at least the logic circuitry 2808. Accordingly, in some embodiments the logic circuitry 2808 includes electrically configurable logic circuitry 2808.

In some embodiments the machine-executable code 2806 may describe hardware (e.g., circuitry) to be implemented in the logic circuitry 2808 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used. By way of non-limiting examples, Verilog™, System-Verilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 2808 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some embodiments the machine-executable code 2806 may include an HDL, an RTL, a GL description, a mask level description, other hardware description, or any combination thereof.

In embodiments where the machine-executable code 2806 includes a hardware description (at any level of abstraction), a system (not shown, but including the storage 2804) may be configured to implement the hardware description described by the machine-executable code 2806. By way of non-limiting example, the processors 2802 may include a programmable logic device (e.g., an FPGA or a PLC) and the logic circuitry 2808 may be electrically controlled to implement circuitry corresponding to the hardware description into the logic circuitry 2808. Also by way of non-limiting example, the logic circuitry 2808 may include hard-wired logic manufactured by a manufacturing system (not shown, but including the storage 2804) according to the hardware description of the machine-executable code 2806.

Regardless of whether the machine-executable code 2806 includes computer-readable instructions or a hardware description, the logic circuitry 2808 is adapted to perform the functional elements described by the machine-executable code 2806 when implementing the functional elements of the machine-executable code 2806. It is noted that although a hardware description may not directly describe functional elements, a hardware description indirectly describes functional elements that the hardware elements described by the hardware description are capable of performing.

Various embodiments described herein may achieve (e.g., via minimal hardware) robust demodulation under all conditions. Further, according to some embodiments, there may be no impact of changing component values over time (e.g., especially capacitors). Moreover, various embodiments (e.g., one or more novel algorithms) may make use of an oversampling feature available in some digital signal processing microcontrollers.

Moreover, according to some embodiments, a converter may enable for smooth transition between modes when an input voltage changes, and transient responses may be independent of input voltage changes due to adaptive gain.

EXAMPLES

A non-exhaustive, non-limiting list of example embodiments follows. Not each of the example embodiments listed below are explicitly and individually indicated as being combinable with all others of the example embodiments listed below and embodiments discussed above. It is intended, however, that these example embodiments are combinable with all other example embodiments and embodiments discussed above unless it would be apparent to one of ordinary skill in the art that the embodiments are not combinable.

Example 1: A method, comprising: receiving at least one signal at an analog-to-digital converter (ADC) of a wireless power transmitter to generate a digital signal; filtering the digital signal via an n-stage cascaded filter to generate a compensator output signal; comparing the compensator output signal to a threshold to generate a second digital signal; extracting a binary value from the second digital signal; and controlling wireless power transmission based on the binary value.

Example 2: The method of Example 1, wherein receiving the at least one signal comprises receiving at least one of a coil voltage, a coil current, and an input current.

Example 3: The method of Example 1, wherein extracting the binary value comprises extracting a 0 or a 1 from the second digital signal.

Example 4: The method of Example 1, wherein controlling the wireless power transmission comprises controlling power transmitted to a receiver from the wireless power transmitter.

Example 5: The method of Example 1, wherein filtering the digital signal via the n-stage cascaded filter comprises filtering the digital signal via a 3-stage cascaded filter.

Example 6: A method, comprising: receiving at least one signal at an analog-to-digital converter (ADC) of a wireless power transmitter to generate a digital signal; triggering, via the ADC, a number of samples having a fixed delay between each sample of the number of samples; generating, via the ADC, an average value signal including an average of the number of samples; amplifying the average value signal to generate a first digital signal; filtering the first digital signal via an n-stage cascaded filter to generate a compensator output signal; comparing the compensator output signal to a threshold to generate a second digital signal; extracting a binary value from the second digital signal; and controlling wireless power transmission based on the binary value.

Example 7: A wireless power transmitter, comprising: a four switch buck-boost converter (FSBBC) coupled to a input voltage supply; an H-bridge coupled to an output of the FSBBC and a transmit coil, the H-bridge including a first number of transistors; and a controller coupled to each of the FSBBC and the H-bridge, the controller configured to: receive a coil voltage, an coil current, and a input voltage; and convey pulse-width modulation (PWM) signals to each of the FSBBC and the H-bridge.

Example 8: The wireless power transmitter of Example 7, wherein the FSBBC comprises a second number of transistors in an H-bridge configuration.

Example 9: The wireless power transmitter of Example 7, further comprising a gate driver configured to receive the PWM signals from the controller and convey a number of gate signals to the second number of transistors in the FSBBC.

Example 10: The wireless power transmitter of Example 8, wherein the controller comprises: a first analog-to-digital converter (ADC) configured to receive an output voltage and generate a first digital signal; a comparator to compare the first digital signal to a reference output voltage to generate an error signal; a compensator configured to generate a response signal based on the error signal; a second ADC configured to receive an input signal and generate a second digital signal; a divider configured to receive the second digital signal and a reference input voltage and generate an adaptive gain signal; and a multiplier configured to multiply the response signal and the adaptive gain signal to generate a duty cycle control signal.

Example 11: A wireless power transmitter, comprising: a transmitter coil configured to wirelessly couple to a receiver coil of a wireless power receiver to transfer power to the wireless power receiver; and a controller configured to: sample one or more electrical signals of the wireless power transmitter, the one or more electrical signals modulated responsive to alteration of electrical conditions at the wireless power receiver; and digitally demodulate the sampled one or more electrical signals to obtain a communication from the wireless power receiver.

Example 12: The wireless power transmitter of Example 11, wherein the one or more electrical signals of the wireless power transmitter include one or more of a sense current signal, a measurement voltage potential, and a representation of a transmitter coil current.

Example 13: The wireless power transmitter according to any one of Examples 11 and 12, wherein the controller is configured to demodulate the sampled one or more electrical signals using a three-stage cascade filter.

Example 14: The wireless power transmitter of Example 13, wherein the three-stage cascade filter includes two low pass filter stages and one high-pass filter stage.

Example 15: The wireless power transmitter according to any one of Examples 13 and 14, wherein the controller is further configured to: compare an output of the three-stage cascade filter to a threshold to generate a digital signal; extract a binary value from the digital signal based on timing features of the digital signal; and control transmission of the power to the wireless power receiver responsive to the extracted binary value.

Example 16: The wireless power transmitter according to any one of Examples 13-15, wherein the controller is configured to sample the one or more electrical signals of the wireless power transmitter by: taking a number of samples of the one or more electrical signals, the number of samples having a fixed delay between each sample; generating an average value signal including an average of the number of samples; and amplifying the average value signal.

Example 17: The wireless power transmitter of Example 16, wherein the controller is configured to oversample the one or more electrical signals to generate the number of samples.

Example 18: The wireless power transmitter according to any one of Examples 11-17, further comprising a transmit bridge operably coupled to the transmit coil, the transmit bridge controllable by pulse-width modulation signals (PWM signals) from the controller, wherein the controller is configured to generate the PWM signals responsive to the demodulated one or more electrical signals.

Example 19: The wireless power transmitter of Example 18, wherein the transmit bridge includes a transistor H-bridge.

Example 20: The wireless power transmitter according to any one of Examples 11-19, further comprising a converter configured to convert an input voltage potential received from a direct current (DC) power source to an output voltage potential, the output voltage potential including a DC output voltage potential.

Example 21: The wireless power transmitter of Example 20, wherein the converter includes a four switch buck-boost converter, and wherein the controller is configured to generate pulse width modulation signals (PWM signals) to control the converter.

Example 22: The wireless power transmitter of Example 21, wherein the controller is configured to generate the PWM signals by: sampling a stepped-down output voltage potential of the converter, the stepped-down output voltage potential stepped down from the output voltage potential; subtracting the sampled output voltage potential from a reference output voltage potential to generate an error signal; filtering the error signal to generate a filtered error signal; sampling a stepped-down input voltage potential, the stepped-down input voltage potential stepped down from the input voltage potential; dividing a reference input voltage potential by the sampled input voltage potential to generate an adaptive gain; multiplying the filtered error signal by adaptive gain to obtain a duty cycle control signal; and generating the PWM signals based on the duty cycle control signal.

Example 23: The wireless power transmitter according to any one of Examples 11-22, wherein the controller comprises one or more processors operably coupled to one or more data storage devices, the one or more data storage devices having computer-readable instructions stored thereon, the computer-readable instructions configured to instruct the one or more processors to perform at least a portion of operations the controller is configured to perform.

Example 24: A controller for a wireless power transmitter, the controller comprising: an analog-to-digital converter (ADC) configured to receive one or more electrical signals of the wireless power transmitter and provide a sampled signal; a three-stage cascade filter configured to receive the sampled signal and filter the sampled signal to generate a filtered output; and post-processing elements configured to extract a communication provided by a digital wireless receiver from the filtered output.

Example 25: The controller of Example 24, wherein: the one or more electrical signals include a sense current signal proportional to a current provided by a converter of the wireless power transmitter; the sampled signal includes a digital sense current representation; and the filtered output includes a filtered sense current representation.

Example 26: The controller of Example 25, further comprising: a three-stage low pass filter configured to generate a threshold responsive to the digital sense current representation; and a path selector between the ADC and the three-stage band pass filter, the path selector configured to selectively provide the digital sense current representation to the three-stage band pass filter and the three-stage low pass filter; wherein the post-processing elements include a digital comparator configured to compare the filtered sense current representation to the threshold.

Example 27: The controller according to any one of Examples 24-26, wherein the ADC is configured to oversample the one or more electrical signals, and wherein samples of the sampled signal provided by the ADC include averages of oversampled values of the one or more electrical signals.

Example 28: The controller according to any one of Examples 24-27, further comprising an amplifier between the ADC and the three-stage cascade filter, wherein the amplifier is configured to amplify the sampled signal.

Example 29: A controller for a wireless power transmitter, the controller comprising: an analog-to-digital converter (ADC) configured to receive a measurement voltage potential proportional to a voltage potential of a transmit coil of the wireless power transmitter, the ADC configured to provide a sampled signal responsive to the measurement voltage potential; a three-stage cascade filter configured to generate a filtered measurement voltage potential responsive to a determined peak of the measurement voltage potential or a determined average of the measurement voltage potential; and post-processing elements configured to extract a communication provided by a digital wireless receiver from the filtered output.

Example 30: The controller of Example 29, further comprising a path selector configured to enable the three-stage band pass filter to receive the determined peak of the measurement voltage potential responsive to a failure to extract the communication based on the determined average.

Example 31: A wireless power transmitter, comprising: a converter configured to convert an input voltage potential, the input voltage potential and the output voltage potential including direct current (DC) voltage potentials; and a controller operably coupled to the converter, the controller configured to: generate a filtered error responsive to the output voltage potential; generate an adaptive gain responsive to the input voltage potential; generate a duty cycle control signal by applying the adaptive gain to the filtered error; generate pulse width modulation signals (PWM) responsive to the duty cycle control signal; control the converter via the PWM signals in a buck mode if the duty cycle control signal is less than a predetermined maximum buck value; and control the converter via the PWM signals in a cascaded buck-boost mode (CBB mode) if the duty cycle control signal is greater than the predetermined maximum buck value, wherein a duty cycle of at least a portion of the PWM signals is configured to transition linearly with the duty cycle control signal from the buck mode to the CBB mode.

Example 32: The wireless power transmitter of Example 31, wherein the controller is configured to generate the filtered error by: subtracting a stepped-down version of the output voltage potential from a reference output voltage potential to generate an error; and filtering the error with a compensator to generate the filtered error.

Example 33: The wireless power transmitter of Example 32, wherein the compensator includes a three pole three zero controller.

Example 34: The wireless power transmitter according to any one of Examples 31-33, wherein the controller is configured to generate the adaptive gain by dividing a reference input voltage potential by a stepped-down version of the input voltage potential.

Example 35: The wireless power transmitter according to any one of Examples 31-34, wherein a zero decibel value of a magnitude of a transfer function of the duty cycle control signal relative to the output voltage potential occurs at a constant frequency independent of fluctuations in the input voltage potential.

Example 36: The wireless power transmitter according to any one of Examples 31-35, further comprising a battery configured to provide the input voltage potential to the converter.

Example 37: A wireless power transmitter, comprising: a four switch buck-boost converter (FSBBC) coupled to a voltage supply, the FSBBC converter configured to receive an input voltage potential from the voltage supply; an H-bridge coupled to an output of the FSBBC and a transmit coil, the H-bridge including a first number of transistors; and a controller coupled to each of the FSBBC and the H-bridge, the controller configured to: receive one or more of a measurement voltage potential proportional to a transmit coil voltage potential, a representation of a coil current, a sense current signal proportional to an output current provided by the FSBBC, the input voltage potential, and an output voltage potential outputted by the FSBBC; and convey pulse-width modulation (PWM) signals to each of the FSBBC and the H-bridge, the PWM signals based on the one or more of the measurement voltage potential, the transmit coil current, the sense current signal, the input voltage potential, and the output voltage potential.

Example 38: The wireless power transmitter of Example 37, wherein the FSBBC comprises a second number of transistors in an H-bridge configuration.

Example 39: The wireless power transmitter according to any one of Examples 37 and 38, further comprising a gate driver configured to receive the PWM signals from the controller and convey a number of transistor gate signals to the second number of transistors in the FSBBC.

Example 40: The wireless power transmitter according to any one of Examples 37-39, wherein the controller comprises: a first analog-to-digital converter (ADC) configured to receive the output voltage potential and generate samples of the output voltage potential; an adder configured to compare the samples of the output voltage potential to a reference output voltage potential to generate an error signal; a compensator configured to generate a filtered error signal based on the error signal; a second ADC configured to receive the input voltage potential and generate samples of the input voltage potential; a divider configured to receive the samples of the input voltage potential and a reference input voltage potential and generate an adaptive gain; and a multiplier configured to multiply the filtered error signal by the adaptive gain signal to generate a duty cycle control signal.

Example 41: A controller, comprising: one or more processors; and one or more data storage devices having computer-readable instructions stored thereon, the computer-readable instructions configured to instruct the one or more processors to: sample an output voltage potential to produce a digital output voltage potential, the output voltage potential responsive to a converter output voltage potential of a converter of the wireless power transmitter; determine an error between an output reference voltage potential and the digital output voltage potential; filter the error to determine a filtered error; apply an adaptive gain to the filtered error to determine a duty cycle control signal, the adaptive gain determined responsive to a converter input voltage potential of the converter of the wireless power transmitter; and determine a controller output including buck pulse width modulation (PWM) signals and boost PWM signals based on the duty cycle control signal, the controller output configured to control the converter of the wireless power transmitter.

Example 42: The controller of Example 41, wherein the computer-readable instructions are further configured to instruct the one or more processors to: sample an input voltage potential to produce a digital input voltage potential, the input voltage potential responsive to the converter input voltage potential; and divide a reference input voltage potential by the digital input voltage potential to determine the adaptive gain.

Example 43: The controller of Example 42, wherein the input voltage potential is a stepped-down version of the converter input voltage potential of the converter of the wireless power transmitter.

Example 44: The controller according to any one of Examples 41-43, wherein a duty cycle corresponding to the duty cycle control signal is configured to transition linearly and smoothly between a buck mode and a cascaded buck-boost mode of the converter of the wireless power transmitter.

Example 45: The controller according to any one of Examples 41-44, wherein the controller output is configured to control the converter of the wireless power transmitter to have a zero decibel (0 dB) magnitude of an open loop gain that is at a constant frequency regardless of fluctuations of the converter input voltage potential.

Example 46: The controller according to any one of Examples 41-44, wherein the output voltage potential is a stepped-down version of the converter output voltage potential of the converter of the wireless power transmitter.

Example 47: A wireless power transmitter comprising the controller according to any one of Examples 41-46, the wireless power transmitter further comprising the converter.

Example 48: The wireless power transmitter of Example 47, further comprising a gate driver between the controller and the converter, wherein the controller is configured to provide the controller output to the gate driver and the gate driver is configured to drive the buck PWM signals and the boost PWM signals to gates of transistors of the converter.

Example 49: The wireless power transmitter according to any one of Examples 47 and 48, wherein the converter comprises a buck-boost converter.

Example 50: The wireless power transmitter according to any one of Examples 48 and 49, further comprising a transmit bridge operably coupled to the converter and a transmit coil operably coupled to the transmit bridge, the controller configured to extract a communication received from a wireless power receiver through the transmit coil responsive to one or more electrical signals of the transmit bridge.

Example 51: A power coupling element comprising a wireless power receiver and the wireless power transmitter according to any one of Examples 7-23, 31-41, or 47-50.

CONCLUSION

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. A method, comprising:
   transmitting with a transmitter coil of a wireless power transmitter, power to a receiver coil of a wireless power receiver;
   sampling one or more electrical signals of the wireless power transmitter, the one or more electrical signals modulated responsive to alteration of electrical conditions at the wireless power receiver; and digitally demodulating the sampled one or more electrical signals using a digital filter to obtain a communication from the wireless power receiver, the digital filter including at least two low pass filter stages that each filter out a fundamental frequency used for the transmitting of the power to the receiver coil.

2. The method of claim 1, wherein sampling the one or more electrical signals comprises sampling one or more of a sense current signal, a measurement voltage potential, and a representation of a transmitter coil current.

3. The method of claim 1, wherein digitally demodulating the sampled one or more electrical signals comprises digitally demodulating the sampled one or more electrical signals using a digital three-stage cascade filter.

4. The method of claim 3, wherein digitally demodulating the sampled one or more electrical signals using the digital three-stage cascade filter includes digitally demodulating the sampled one or more electrical signals using the two low pass filter stages and one high-pass filter stage.

5. The method of claim 3, comprising:
comparing an output of the digital three-stage cascade filter to a threshold to generate a digital signal;
extracting a binary value from the digital signal based on timing features of the digital signal; and
controlling transmission of the power to the wireless power receiver responsive to the extracted binary value.

6. The method of claim 3, wherein sampling the one or more electrical signals of the wireless power transmitter comprises:
taking a number of samples of the one or more electrical signals, the number of samples having a fixed delay between each sample;
generating an average value signal including an average of the number of samples; and
amplifying the average value signal.

7. The method of claim 6, wherein sampling the one or more electrical signals of the wireless power transmitter comprises oversampling the one or more electrical signals to generate the number of samples.

8. The method of claim 1, comprising:
generating pulse-width modulation signals (PWM signals) responsive to digitally demodulated one or more electrical signals; and
controlling a transmit bridge operably coupled to the transmitter coil using the PWM signals.

9. The method of claim 8, wherein controlling the transmit bridge includes controlling a transistor H-bridge.

10. The method of claim 1, comprising converting an input voltage potential received from a direct current (DC) power source to an output voltage potential, the output voltage potential including a DC output voltage potential.

11. The method of claim 10, wherein:
converting the input voltage potential to the output voltage potential comprises converting the input voltage potential to the output voltage potential using a four switch buck-boost converter; and
the method comprises controlling the converter using pulse width modulation signals (PWM signals).

12. The method of claim 11, comprising generating the PWM signals by:
sampling a stepped-down output voltage potential of the converter, the stepped-down output voltage potential stepped-down from the output voltage potential;

subtracting the sampled output voltage potential from a reference output voltage potential to generate an error signal;
filtering the error signal to generate a filtered error signal;
sampling a stepped-down input voltage potential, the stepped-down input voltage potential stepped-down from the input voltage potential;
dividing a reference input voltage potential by the sampled input voltage potential to generate an adaptive gain;
multiplying the filtered error signal by adaptive gain to obtain a duty cycle control signal; and
generating the PWM signals based on the duty cycle control signal.

13. A method, comprising:
sampling one or more electrical signals received from a wireless power transmitter to provide a sampled signal;
filtering, with a three-stage cascade filter, the sampled signal to generate a filtered output, the three-stage cascade filter including at least two low pass filter stages that each filter out a fundamental frequency used for power transfer; and
extracting a communication provided by a digital wireless receiver from the filtered output.

14. The method of claim 13, wherein:
sampling the one or more electrical signals includes sampling a sense current signal proportional to a current provided by a converter of the wireless power transmitter;
providing the sampled signal includes providing a digital sense current representation; and
generating the filtered output includes generating a filtered sense current representation.

15. The method of claim 14, comprising:
generating, with a three-stage low pass filter, a threshold responsive to the digital sense current representation;
selectively providing, with a path selector between an ADC and the three-stage cascade filter, the digital sense current representation to the three-stage low pass filter and the three-stage low pass filter; and
comparing, using a digital comparator, the filtered sense current representation to the threshold.

16. The method of claim 13, wherein:
sampling the one or more electrical signals comprises oversampling the one or more electrical signals; and
samples of the sampled signal include averages of oversampled values of the one or more electrical signals.

17. The method of claim 13, comprising amplifying the sampled signal.

18. A method, comprising:
receiving a measurement voltage potential proportional to a voltage potential of a transmit coil of a wireless power transmitter;
providing, by an analog-to-digital converter (ADC), a sampled signal responsive to the measurement voltage potential;
generating, by a three-stage cascade filter, a filtered measurement voltage potential responsive to a determined peak of the measurement voltage potential or a determined average of the measurement voltage potential, the three-stage cascade filter including at least two low pass filter stages that each filter out a fundamental frequency used for power transfer; and
extracting, by post-processing elements, a communication provided by a digital wireless receiver from the filtered measurement voltage potential.

* * * * *